United States Patent [19]

Kley

[11] Patent Number: 4,561,731

[45] Date of Patent: Dec. 31, 1985

[54] ELECTRONIC ILLUMINATION CONTROL

[76] Inventor: Victor B. Kley, 1119 Park Hill Rd., Berkeley, Calif. 94708

[21] Appl. No.: 644,116

[22] Filed: Aug. 24, 1984

Related U.S. Application Data

[63] Continuation-in-part of Ser. No. 319,993, Nov. 9, 1981, abandoned, which is a continuation-in-part of Ser. No. 128,891, Mar. 10, 1980, abandoned.

[51] Int. Cl.$^4$ ............... G02B 21/20; G02B 21/08; G02F 1/13
[52] U.S. Cl. .................... 350/510; 350/516; 350/331 R
[58] Field of Search ............... 350/509, 510, 514, 515, 350/524, 525, 526, 331 R, 333, 336, 347 E, 352

[56] References Cited

U.S. PATENT DOCUMENTS

| | | |
|---|---|---|
| 2,388,858 | 11/1945 | MacNeille et al. ............... 350/132 |
| 2,516,905 | 8/1950 | Osterberg et al. . |
| 2,699,092 | 1/1955 | Rantsch . |
| 2,700,918 | 2/1955 | Osterberg et al. . |
| 3,052,152 | 9/1962 | Koester . |
| 3,060,808 | 10/1962 | Koester . |
| 3,161,717 | 12/1964 | Barabus et al. . |
| 3,450,480 | 6/1969 | Chitayat . |
| 3,531,179 | 9/1970 | Jaffe et al. . |
| 3,561,876 | 2/1971 | Hoffman . |
| 3,588,225 | 6/1971 | Nicastro . |
| 3,628,848 | 12/1971 | Nomarski . |
| 3,646,608 | 2/1972 | Rowland . |
| 3,658,405 | 4/1972 | Pluta . |
| 3,741,629 | 6/1973 | Kahn ............... 350/336 |
| 3,846,009 | 11/1974 | Courtney-Pratt et al. . |
| 3,851,949 | 12/1974 | Kraft et al. . |
| 3,876,287 | 4/1975 | Sprokel ............... 350/347 E |
| 3,914,057 | 10/1975 | Smith et al. . |
| 3,920,311 | 11/1975 | Tsuda et al. . |
| 3,955,208 | 5/1976 | Wick et al. ............... 350/336 |
| 4,062,619 | 12/1977 | Hoffman . |
| 4,127,318 | 11/1978 | Determann et al. . |
| 4,148,552 | 4/1979 | Suzuki et al. . |

*Primary Examiner*—Jon W. Henry
*Attorney, Agent, or Firm*—Bernard, Rothwell & Brown

[57] ABSTRACT

A light transmission unit, such as a liquid crystal cell, operated by an electronic control circuit is interposed in the illumination system of a viewing system for providing a plurality of selectable illumination or viewing conditions, such as transmissive illumination, incident illumination, oblique illuminations, differentially shaded illumination, dark field illumination, bright field illumination, phase contrast illumination, differential polarization illumination, and/or color illumination.

78 Claims, 113 Drawing Figures

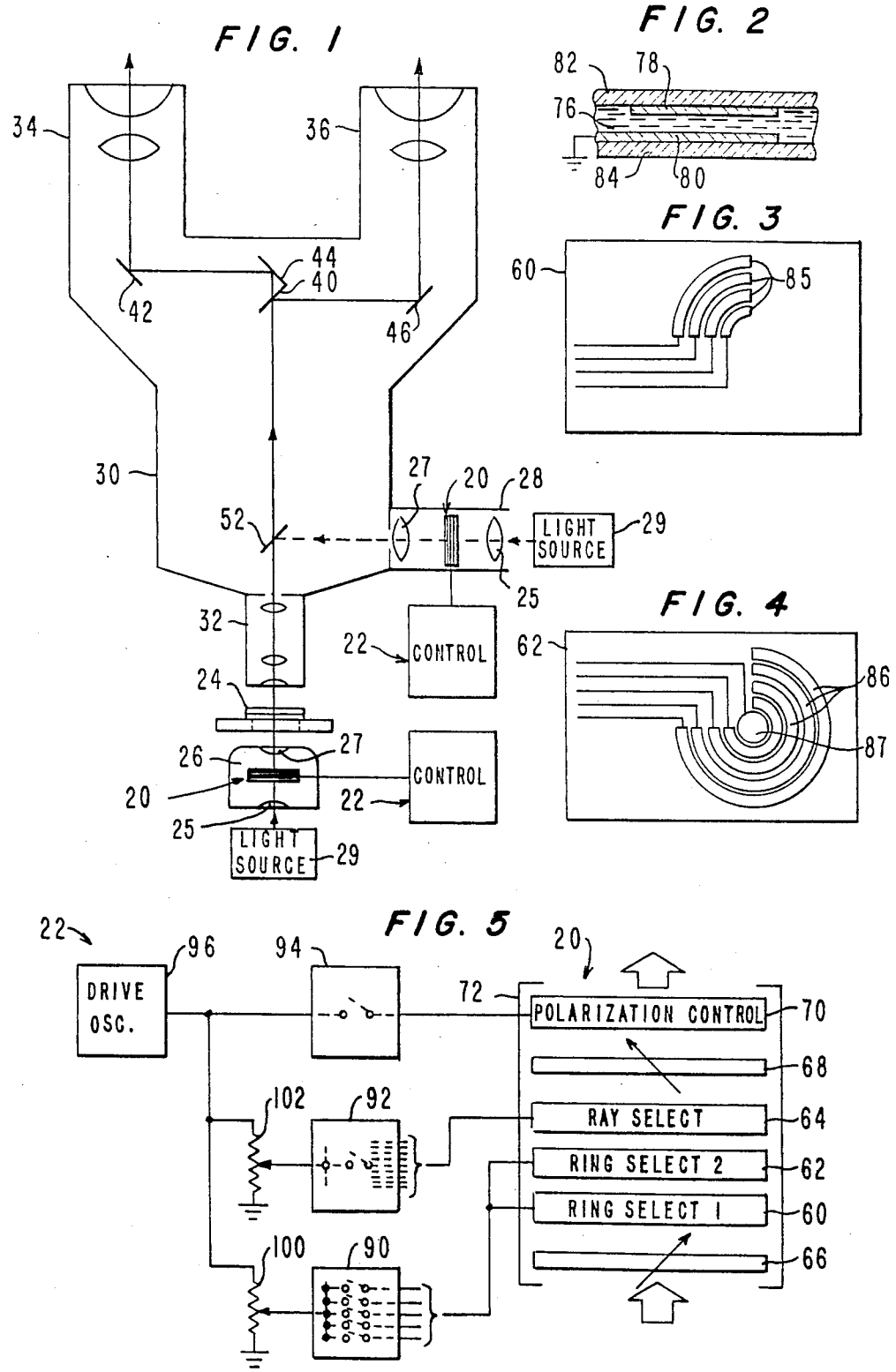

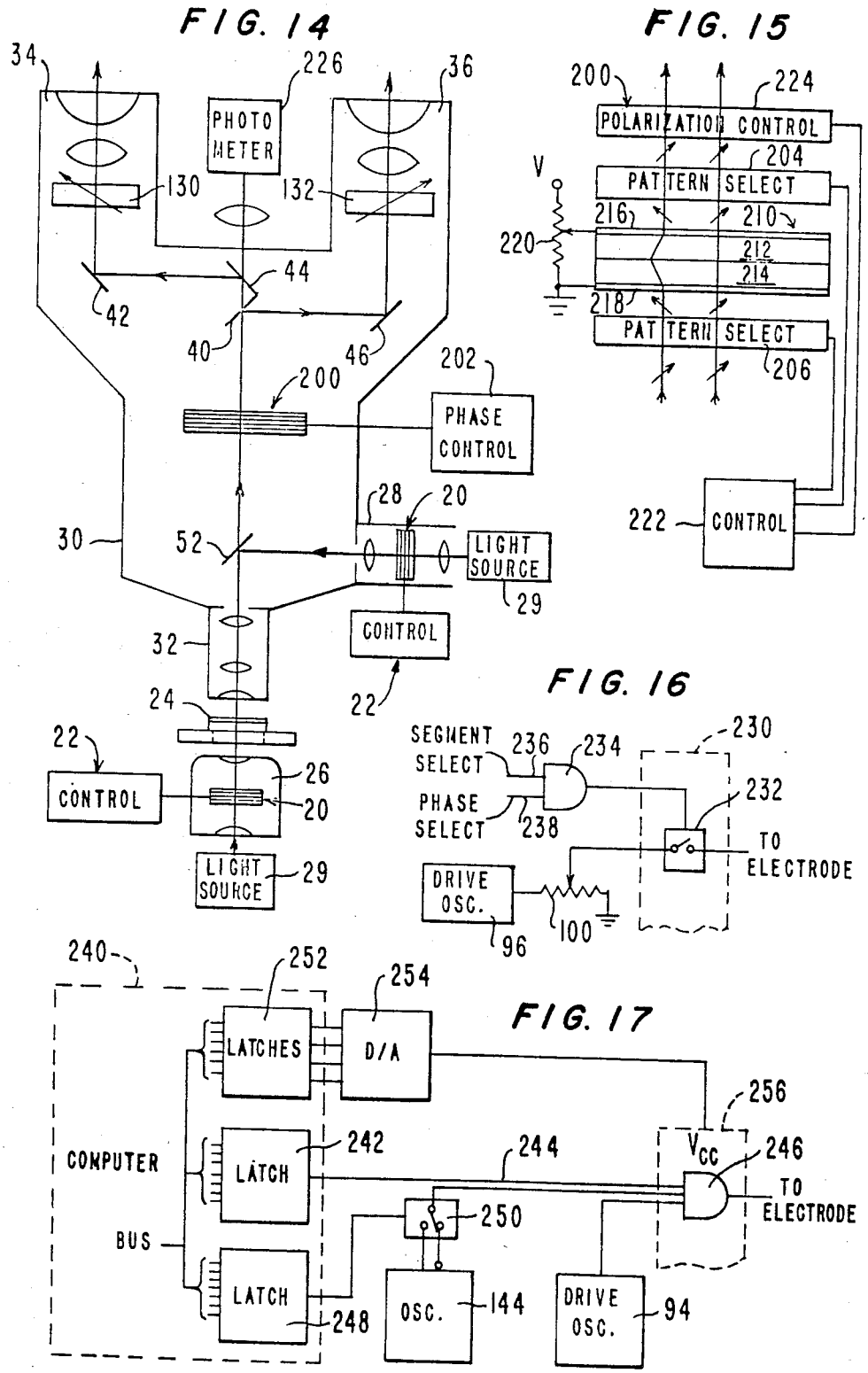

FIG. 23

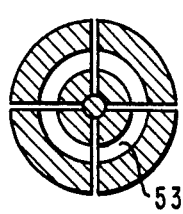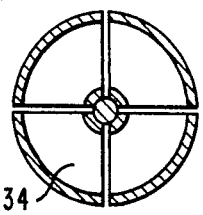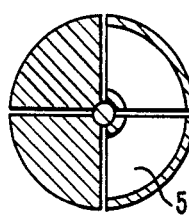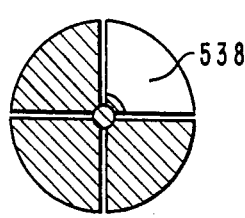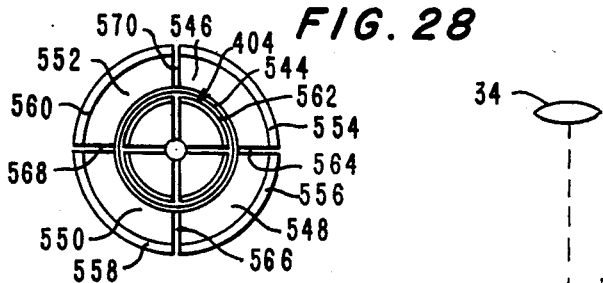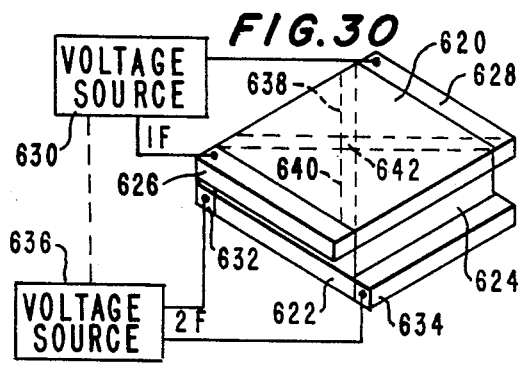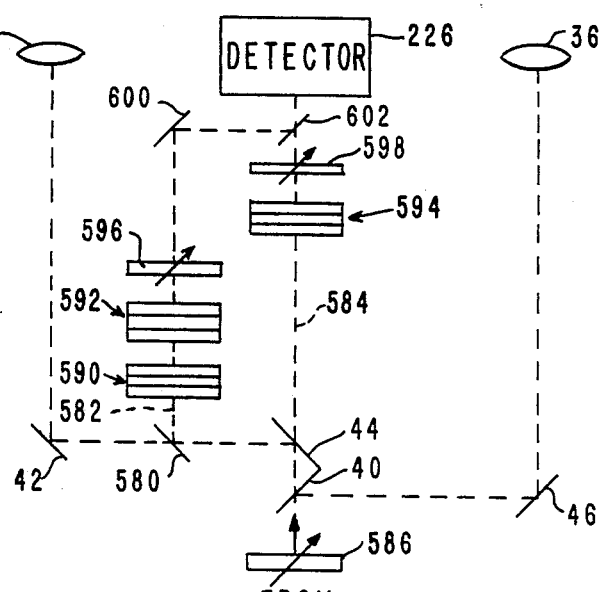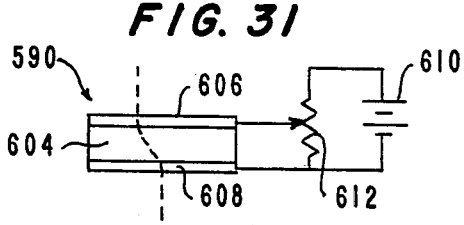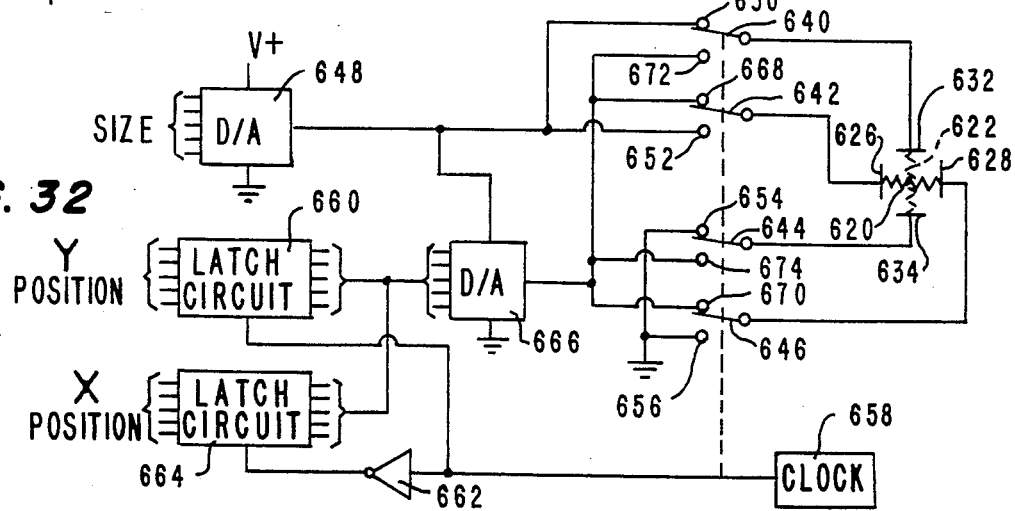

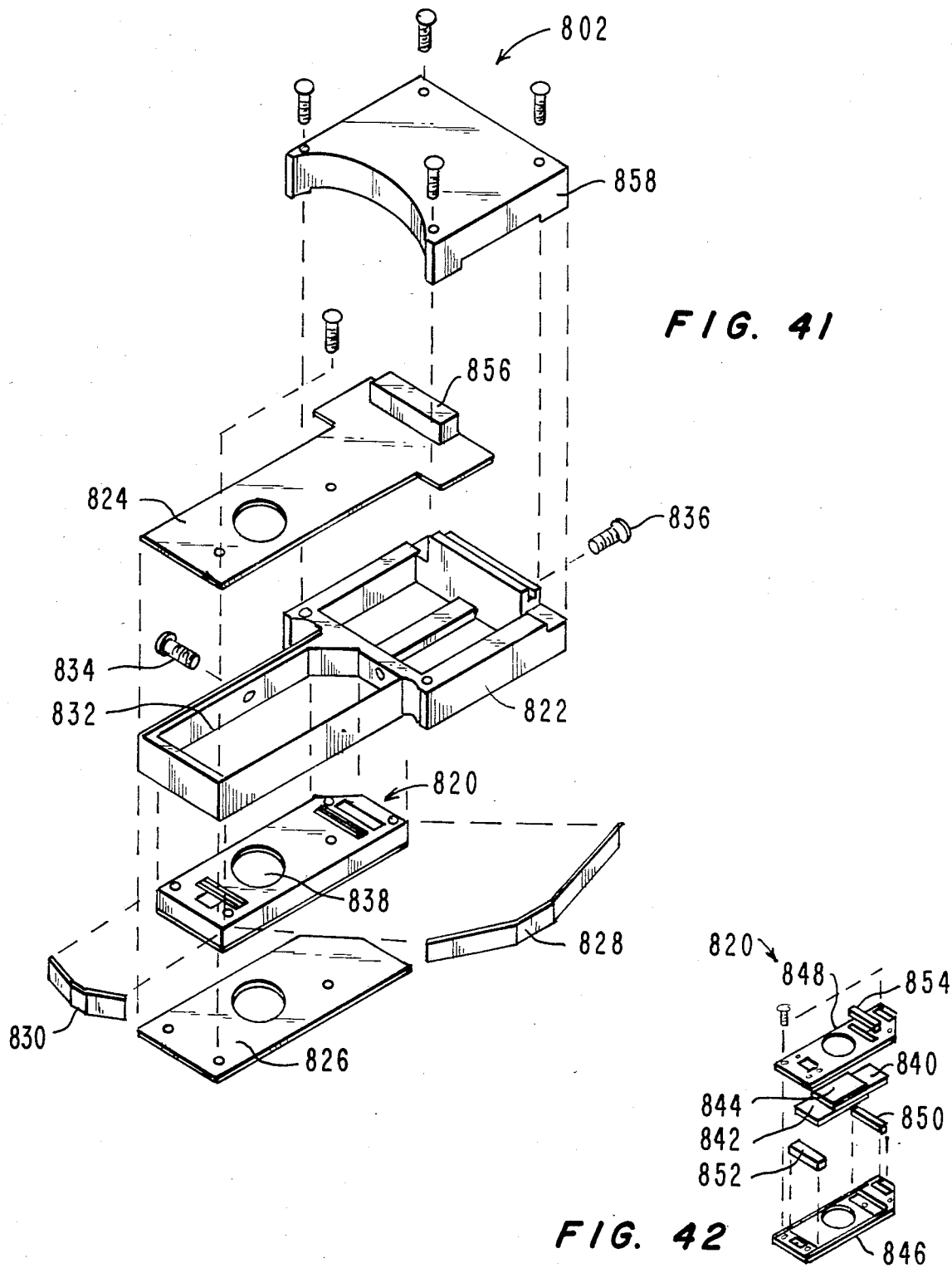

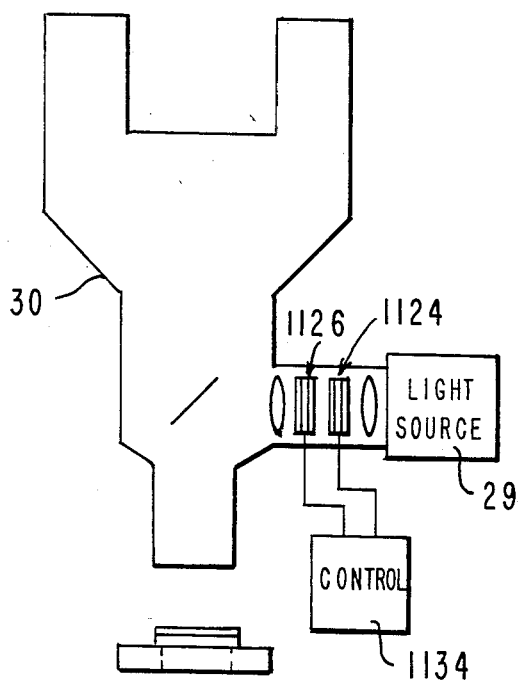
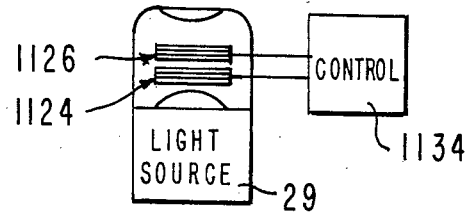
FIG. 58
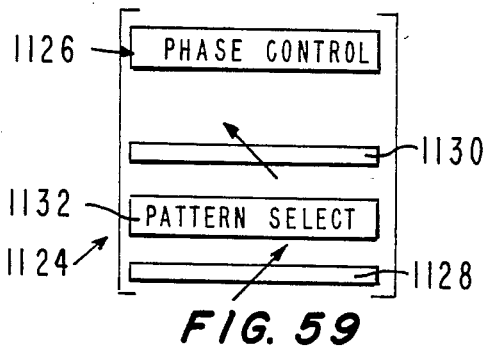
FIG. 59
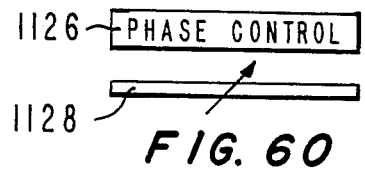
FIG. 60
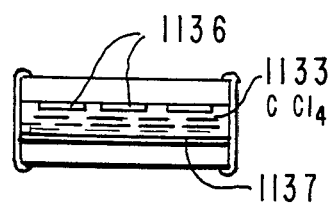
FIG. 61
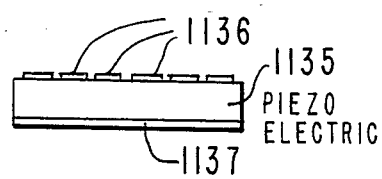
FIG. 62

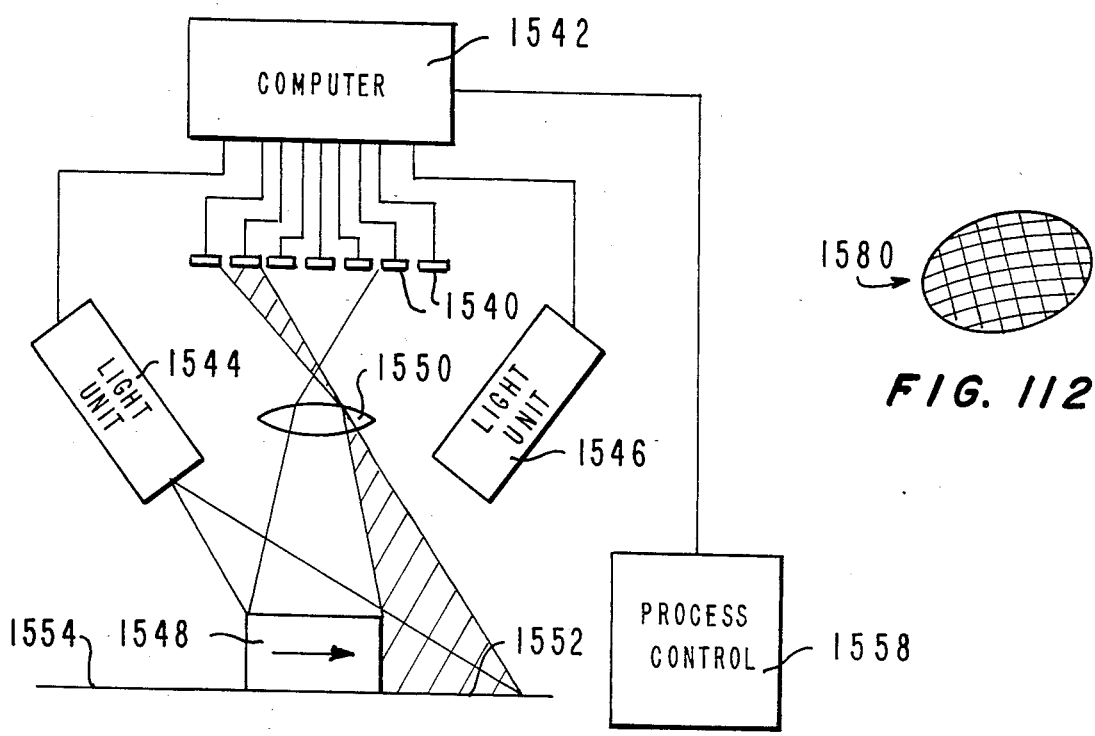
FIG. 108
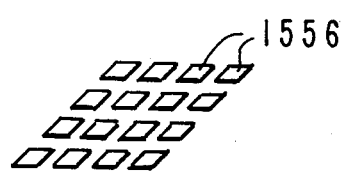
FIG. 109
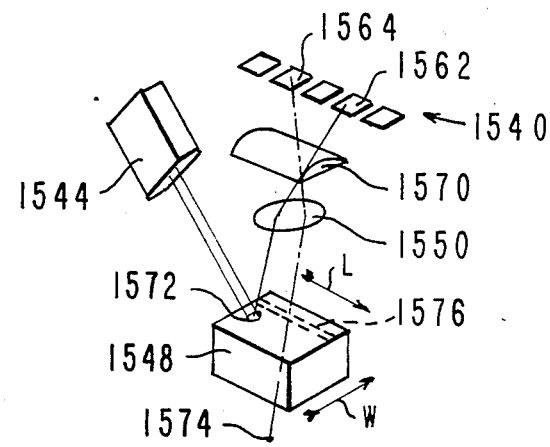
FIG. 111
FIG. 112
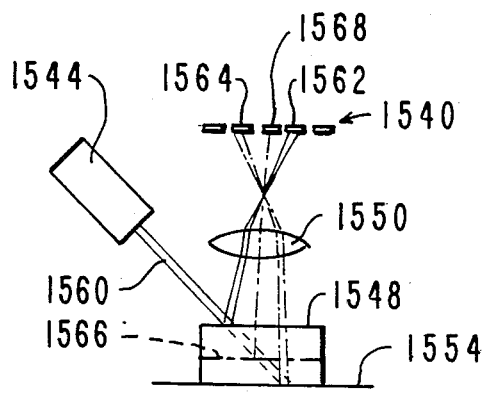
FIG. 110
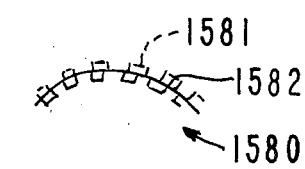
FIG. 113

ELECTRONIC ILLUMINATION CONTROL

CROSS-REFERENCE TO RELATED APPLICATION

This application is a continuation-in-part of my co-pending U.S. application Ser. No. 06/319,993, filed Nov. 9, 1981, now abandoned for Microscope With Electrically Selectable Illumination And Viewing, which in turn is a continuation-in-part of my U.S. application Ser. No. 06/128,891 (abandoned) filed Mar. 10, 1980; now abandoned both of these prior applications are incorporated herein in their entirety by reference.

TECHNICAL FIELD

The present invention relates to radiant energy illumination and light controls for viewing systems such as microscopes, cameras, object detecting systems, etc., wherein illumination and/or viewing can be changed.

DESCRIPTION OF THE PRIOR ART

The prior art as exemplified in U.S. Pat. Nos. 2,516,907, 3,161,717, 3,561,876, 3,628,848, 3,646,608, 3,658,405, 3,851,949, 3,846,009, 4,127,318 and 4,148,552, contains a number of microscopes wherein one or more elements are adjustable or changeable to vary the illumination or viewing properties of the microscope. However, such microscopes usually require some mechanical or physical part to be moved or replaced to effect the change. This greatly increases the mechanical complexity of the apparatus. Various prior art illumination techniques such as transmissive illumination, incident illumination, darkfield illumination, bright field illumination, oblique illumination, differentially shaded illumination, phase contrast illumination, differential polarization illumination, etc., have been employed for improving the visibility of various objects being examined by microscopes, cameras, and other devices.

A liquid crystal diaphragm arrangement for a photographic camera is illustrated in U.S. Pat. No. 3,955,208. The diaphragm is formed by two superimposed cells containing concentric ring-shaped electrodes with an electronic control circuit for selectively changing the area of transmissivity through the diaphragm.

An electro-optic device for portraying closed ring images is illustrated in U.S. Pat. No. 3,588,225 wherein semicircular electrodes forming complementary arcuate portions of the rings are located in respective superimposed liquid crystal cells.

Liquid crystal display devices utilizing resistive electrodes for producing variable patterns in light transmitted therethrough are disclosed in U.S. Pat. Nos. 3,675,988 and 4,139,278. These disclosures include individual devices with resistive electrode patterns for generating rings, wedges, spot, sectors, and other configurations.

U.S. Pat. No. 2,388,858 discloses a stereo trainer employing a Wollaston prism in front of an objective for dividing the image into two images polarized at right angles to each other. Polarizing filters oriented mutually at right angles to each other are positioned in front of the respective right and left eyepieces to pass only the respective images and produce a stereoscopic view. The similarity of the operation of Wollaston prism to a Ronchon prism and to a single birefringent crystal of quartz or calcite is also disclosed.

A comparison viewer illustrated in U.S. Pat. No. 3,450,480 discloses a mechanism which can be manipulated to provide either stereoscopic or monoscopic viewing through a binocular eyepiece arrangement.

SUMMARY OF THE INVENTION

The present invention is summarized in an apparatus for a viewing or electronic detecting system including an electrically controlled light transmission unit interposed in a path of light in an illumination system for an object station and/or in the path of light from the object station to enhance an image or portion thereof for viewing or electronic detection. Electrical control means selectively operates the light transmission unit or units.

An object of the invention is to construct an illumination apparatus for a viewing or electronic sensing system wherein one of a plurality of illumination conditions, such as transmissive illumination, incident illumination, oblique illumination, differentially shaded illumination, darkfield illumination, bright field illumination, phase contrast illumination, differential polarization illumination, color or spectral illumination, etc., can be selected by an electronic control system.

Another object of the invention is to construct an illumination apparatus for a viewing or electronic detector which produces substantially new and different illumination and/or viewing or detecting of an object.

One advantage of the invention is that an illumination condition is selected by electrical controls, and thus versatile electrical control circuits can be employed for selectively operating the illumination system.

Other objects, advantages and features of the invention will be apparent from the following description of the preferred embodiment taken in conjunction with the accompanying drawings.

BRIEF DESCRIPTION OF THE DRAWINGS

FIG. 1 is a diagrammatic sectional view of a microscope with an illumination control constructed in accordance with the invention.

FIG. 2 is a cross-section view of a broken-away portion of one light control cell in an electrically controlled light transmission unit of the microscope of FIG. 1.

FIG. 3 is a plan view of an electrode arrangement in one light control cell of a light transmission unit of FIGS. 1 and 5 for producing a portion of a ring pattern.

FIG. 4 is a plan view of an electrode arrangement in another cell of a light transmission unit of FIGS. 1 and 5 for producing a portion of a ring pattern complementary to the ring portion of FIG. 3.

FIG. 5 is a block diagram of an electrical control circuit and an electrically controlled light transmission unit of the microscope of FIG. 1.

FIG. 14 is a diagrammatical sectional view of a further modified microscope in accordance with the invention.

FIG. 15 is a block diagram of a variable phase adjusting cell in the modified microscope of FIG. 14.

FIG. 16 is a schematic of a portion of an electrical circuit variation which can be used in the control circuits of the microscopes of the invention.

FIG. 17 is a schematic of a portion of another electrical circuit variation which can be used in the control circuits of the invention.

FIG. 23 is a diagram of a transmission unit employing the cell of FIGS. 21 and 22 and a driving circuit for the transmission unit.

FIG. 24 is a diagram of one pattern generated by the transmission unit and circuit of FIG. 23.

FIG. 25 is a diagram of a second pattern generated by the transmission unit and circuit of FIG. 23.

FIG. 26 is a diagram of a third pattern generated by the transmission unit and circuit of FIG. 23.

FIG. 27 is a diagram of a fourth pattern generated by the transmission unit and circuit of FIG. 23.

FIG. 28 is a plan view of a variation of the electrode arrangement of FIG. 22.

FIG. 29 is a diagram of a still further modified broken-away portion of a microscope in accordance with the invention.

FIG. 30 is a diagrammatical perspective view of a pattern select cell in the microscope of FIG. 29.

FIG. 31 is a diagrammatical side view of a variable phase adjusting device in the microscope of FIG. 29.

FIG. 32 is a diagram of a modified circuit for operating the cell of FIG. 30.

FIG. 41 is an exploded view of an assembly forming an optical cell module for the control device of FIG. 39.

FIG. 42 is an exploded view of an LCD assembly unit of the module of FIG. 41.

FIG. 58 is a diagram of another modified microscope with illumination phase control in accordance with the invention.

FIG. 59 is a diagram of a light phase control unit or arrangement employed in the microscope of FIG. 58.

FIG. 60 is a diagram of an alternative phase control unit or arrangement for the microscope of FIG. 58.

FIG. 61 is a cross sectional view of a second phase control cell variation suitable for use in the microscope of FIG. 58.

FIG. 62 is a cross sectional view of a third phase control cell variation suitable for use in the microscope of FIG. 58.

FIG. 108 is a diagram of a detector system employing illumination control in accordance with the invention.

FIG. 109 is a perspective view of a two dimensional variation of the detector array of FIG. 108.

FIG. 110 is a diagram illustrating another application of the system of FIG. 108.

FIG. 111 is a diagram in perspective of a variation of the system in FIG. 108.

FIG. 112 is a perspective view of another detector variation.

FIG. 113 is a sectional view of the detector variation of FIG. 112.

DESCRIPTION OF THE PREFERRED EMBODIMENT

Figure 6:
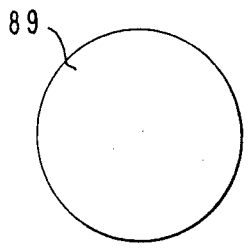
FIG. 6 is a plan view of an electrode structure in a polarization control cell of the light transmission unit of FIG. 5.

As shown diagrammatically in FIG. 1, a microscope including an illumination control in accordance with the invention includes an electrically controlled light transmission unit indicated generally at 20 and mounted in an illumination condenser system for the microscope together with an electrical control circuit indicated generally at 22 for operating the transmission unit 20 which selectively changes and passes light to illuminate an object 24. The microscope as illustrated includes both a substage illumination system 26 and a superstage illumination system 28; however, the microscope could include only one of the substage and superstage illumination systems. An electrically controlled light transmission unit 20 is included within each of the illumination systems 26 and 28. Respective control circuits 22 are illustrated for operating the units 20; however, the control circuits 22 could be combined into a single control circuit for operating both units 20. Conventional light sources 29 produce the light which is transmitted through the units 20 and directed toward the object 24. Preferably the units 20 are mounted between the field lens 25 and condenser lens 27 in the condenser systems of otherwise conventional microscopes without making other major changes to the housing and lens systems of the microscopes of their manufacturing processes.

Figure 56:
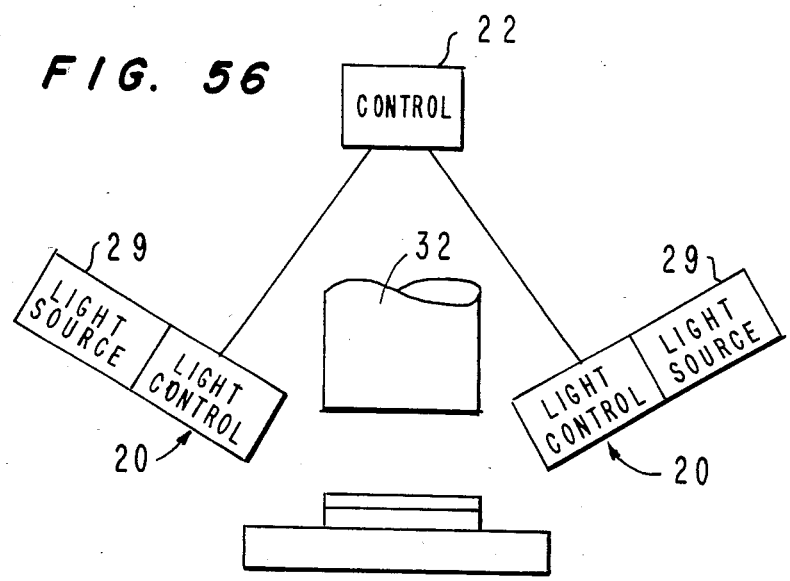
FIG. 56 is a diagram of a modified arrangement forming an illumination control for a microscope.

The microscope includes a conventional housing 30 in which is mounted an objective 32 and a pair of eyepieces 34 and 36. An arrangement of a half-transmissive reflector 40 and reflector 46 is provided for reflecting one-half of the light from the objective 32 toward the eyepiece 36 while an arrangement of reflectors 44 and 42 is provided to reflect the remaining light from the objective 32 toward the other eyepiece 34. For superstage or incident illumination, the telescope includes a partly transmissive reflector 52 for directing the incident light from the condenser system 28 through the objective to the object 24. The reflectors 40, 42, 44, 46 and 52 can be prism devices, mirror devices, and/or any other suitable conventional light deviating devices. Generally, either substage or superstage illumination can be used to provide both dark field and bright illumination as well as oblique illumination. As an alternative to passing incident illumination through the objective of the microscope, oblique incident illumination may be produced, as shown in FIG. 56, by one or more external light sources 29 controlled by light transmission units 20 or, alternatively, simple electro-optic light switches, or more elaborate pattern, color, phase, and/or polarization control units.

In one possible embodiment, each of the electrically controlled light transmission units 20 is designed to selectively modify one or more variable characteristics, such as pattern, color, and/or polarization, of the light passing therethrough from the source 29 and illuminating the object 24 in response to the electrical control circuit 22. One example of an electrically controlled light transmission unit is illustrated in FIG. 5. The unit 20 includes a plurality of superimposed pattern selecting cells 60, 62 and 64 positioned between polarizers 66 and 68 together with a polarization control cell 70 positioned on the exit side of the polarizer 68 which in turn is positioned on the exit side of the superimposed pattern selecting cells 60, 62 and 64 all secured together by holding means 72. If the light source 29 is selected to generate polarized light, then the input polarizer 66 can be eliminated. Each of the cells 60, 62, 64 and 70 are formed, as shown in FIG. 2, from a layer of electro-optic liquid crystal material such as a conventional nematic fluid 76 between transparent electrodes 78 and 80 which are configured into desired patterns on transparent substrates 82 and 84. The liquid crystal material 76 is selected to be anisotropic, i.e., to rotate the plane of polarization of light passing transversely therethrough, when a voltage is applied across the material 76 by the electrodes 78 and 80. When the electrodes 78 and 80 are unenergized, the liquid crystal material is isotropic, i.e., the plane of polarization of light passing therethrough is not rotated, or at least substantially less anisotropic. The polarizers 66 and 68 are shown oriented with their directions of polarization crossing at right angles so that light passes through the unit 20 only when one or more of the electrodes of the cells 60, 62 and 64 are energized. Alternatively, the polarizers can be oriented in the same direction so that light passes freely through the unit 20 when the cells 60, 62 and 64 are unenergized, and light is selectively blocked or shaded when one or more of the electrodes on the cells 60, 62 and 64 are energized. Also, the liquid crystal can be selected to be isotropic, or less anisotropic, when energized and anisotropic when unenergized; the relative orientation of the polarizers is reversed to produce selected passage or blockage of light.

As an alternative to nematic or liquid crystal material, the electro-optic material may be iron garnet, PLZT (lead lanthanum zirconate titanate), or any other material which has voltage, magnetic, or thermal dependent anisotropic and/or isotropic states or by use of other electro-optic techniques, such as electrostatic light switches described herein. Generally, electro-optic cells using nematic materials have white light contrast ratios, i.e., the ratio of light intensity passed when in the fully on or light transmissive state to the light passed when in the fully off or dark state, in the range from 10:1 to 20:1. When optimized for a single color, the contrast ratio of the nematic cells can be increased to 100:1 for light of that color. Even higher contrast ratios are possible from iron garnet (1000:1) and PLZT (10,000:1) so these materials can be used in applications where high contrast ratios are required.

Variation of voltages applied across electro-optic materials can be used to vary intensity, color, and/or phase. In some instances, the degree of rotation of the polarity of the transmitted light varies in accordance with the variation of the voltage. In an arrangement of the polarizers 66 and 68 and the pattern cells 60, 62 and 64 selected to pass maximum light intensity at a selected voltage, the application of voltages above and below the selected voltage will result in passage of reduced light intensity since a portion of the light, which has its polarity rotated to a different angle, will be blocked by the polarizer 68. Also, electro-optic materials generally rotate the polarity of different frequencies of light, i.e., different colors, by different degrees. Where the light to be transmitted is white, it is conventional to utilize a thickness of electro-optic material, polarizers, and voltages which minimize color selectivity. Conversely, the electro-optic material, polarizers and voltages can be selected to maximize color selectivity; and in this case, the variation of voltage can be used to select the color of the transmitted light. The phase of the light transmitted through electro-optic cells is also changed by changing the applied voltages; this phase change may result from a change in refraction or in the path of light through the electro-optic materials due to the voltage change.

In some variations of the microscope the light source 29 is monochromatic and the light transmission unit 20 is optimized for the light frequency of the light source. For example, the light source 29 may be filtered to produce only blue light and the unit 20 optimized to control blue light. With use of monochromatic light, higher contrast ratios with nematic electro-optic material and greater intensity control by voltage variations with reduced color change are possible.

Figure 7:
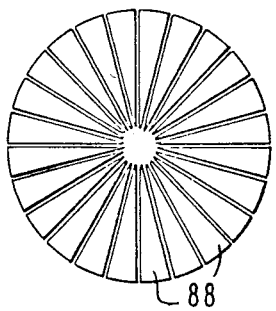
FIG. 7 is a plan view, enlarged relative to FIG. 6, of an electrode structure in a ray selecting control cell of the light transmission unit of FIG. 5.
Figure 8:
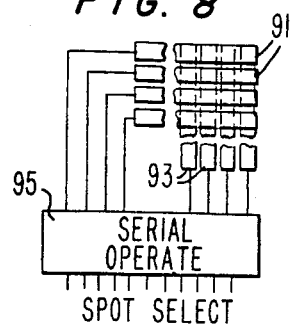
FIG. 8 is a plan view of an electrode arrangement in a spot selecting control cell which could be alternatively included in the light transmission unit of FIG. 5.

Examples of patterns of electrodes for the corresponding cells 60, 62 and 64 are shown in FIGS. 3, 4 and 7. The cells 60 and 62 have respective arcuate electrodes 85 and 86 which, when the cells 60 and 62 are superimposed, complement each other to form concentric annular strips surrounding a center circular electrode 87. The pattern cell 64 has radially arranged wedge-shaped electrodes 88 as shown in FIG. 7. Another example of a pattern of electrodes suitable for use in one or more pattern selecting cells of the unit 20 is illustrated in FIG. 8, wherein upper transparent spaced parallel strip electrodes 91 extend crosswise over lower transparent spaced parallel strip electrodes 93 so that energization of a pair of electrodes (one upper electrode 91 and one lower electrode 93) results in excitation of the liquid crystal material between the crossover areas of the selected electrodes. A conventional serial operating circuit 95 can be used to produce a plurality of spots or areas of liquid crystal material excitation only between the respective selected electrode pairs and not between upper and lower electrodes of different selected pairs. This circuit 95 takes advantage of the delay time required for the liquid crystal material to change from the excited state back to the unexcited state, and applies cyclical and sequential excitation voltages to the corresponding respective electrode pairs at a frequency great enough to prevent relaxation of the liquid crystal material. Many other arrangements of electrodes such as spaced dots, combinations of polar and radial strips, etc., could be employed to provide various patterns or spots of illumination. Also, the unit 20 could include more or less cells between the polarizers to provide any pattern or any combination of patterns.

The polarization control cell 70 has circular electrodes 89, as shown in FIG. 6, extending over the entire cross-sectional area of the light path through the unit 20 so that the angle of polarization of light passing through the unit 20 can be changed by energizing the cell 70.

An example of an electrical control circuit 22 suitable for operating a light transmission unit 20 is shown in FIG. 5 and includes a selector 90 having corresponding outputs connected to the electrodes of cells 60 and 62, a selector 92 having its corresponding outputs connected to the electrodes of cell 64 and a selector 94 having an output connected to an electrode of cell 70. A drive voltage source such as a 120 or 140 hertz oscillator 96 suitable for operating the liquid crystal cells 60, 62, 64 and 70 is connected to an input of the selector 94 and is connected by respective adjustable voltage dividers 100 and 102 to inputs of the selectors 90 and 92. The selectors 90, 92 and 94 are analog switching devices which can be selectively operated to apply drive voltages to the electrodes of the cells 60, 62, 64 and 70. In a simple embodiment, the selectors 90 and 92 are banks of manually operated switches and the selector 94 is a single manual switch. The voltage dividers 100 and 102 have variable ranges suitable for varying the intensity of illumination, relative phase shift between light and dark areas, and/or spectrum (color) of the transmitted light.

In employment of the microscope of FIG. 1 with the light transmission units 20 and electrical control circuits 22, one of the circuits 22 can be operated to selectively operate the corresponding unit 20 and illuminate the object 24 either with transmissive light from the substage system 26 or with incident light from the superstage system 28. By selecting an outer ring of the rings 85, 86 for transmission of light to illuminate the object 24, dark field illumination is obtained. Selecting inner rings and/or the center circle 87 results in bright field illumination. Oblique illumination or differentially shaded illumination is obtained by selecting one or more of the electrodes 88 in the ray select cell 64. The polarization control disc can be switched to view different polarization characteristics of the object 24. The potentiometers 100 and 102 may be adjusted to vary the intensity or phase or to produce different colors of illumination.

Figure 19:
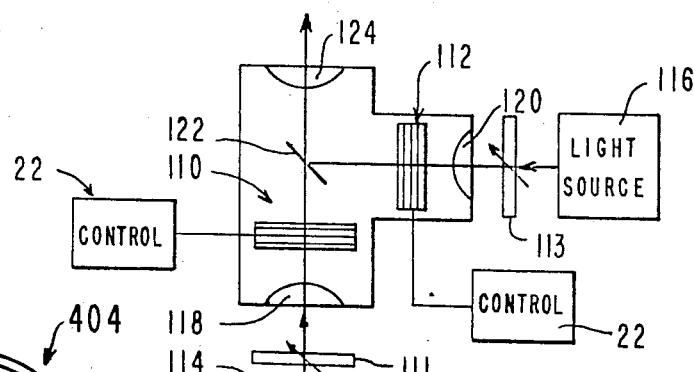
FIG. 19 is a diagram of a variation of an illumination control station in a microscope in accordance with the invention.

A modified illumination system, illustrated in FIG. 19 and which may be either superstage or substage, includes two electrically controlled light transmitting units indicated generally at 110 and 112 controlling light from respective sources 114 and 116 which include polarizers 111 and 113 to produce light polarized at right angles to each other. Input or field lenses 118 and 120 are provided for the respective sources while a partially reflective device 122 is positioned to pass light from the source 114 and unit 110 and to reflect light from the source 116 and unit 112 to the condenser lens 124. Electrical control circuits 22 operate the units 110 and 112. The units 110 and 112 are similar to the units 20, except that the initial polarizers 111 and 113 are positioned between the respective input lenses 118 and 120 and the light sources 114 and 116. Alternatively the units 110 and 112 can have pattern control cells which are similar or different from the other unit. The units 110 and 112 can be operated simultaneously to produce combined output light patterns, and/or can be used singularly to provide a greater variety of output patterns. Also, the units 110 and 112 need not include polarization control cells to produce differently polarized output light; the selection of the unit 110 or 112 selects the output polarization. Differential polarization illumination can be produced by simultaneous operation of the units 110 and 112 to illuminate different patterns or illuminate from different angles with respective polarities of light. It is noted that the oblique incident illumination system of FIG. 56, can also be operated to simultaneously illuminate the object with opposite polarities of light from two or more different directions.

Figure 9:
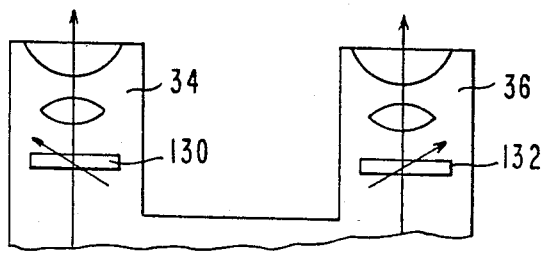
FIG. 9 is a diagrammatic sectional view of a modified broken-away portion of a microscope in accordance with the invention.

In another modification illustrated in FIG. 9, a pair of light switches or polarizers 130 and 132 are interposed in the light paths through the respective eyepieces 34 and 36. The polarization angles of the polarizers 130 and 132 are shown at right angles to each other, but could be made equal or adjustable. The polarizers 130 and 132 can be positioned on the entrance side of the eyepieces 34 and 36 as is shown, or can be positioned on the exit side or within the eyepiece lens system. Alternatively, any other suitable polarizing system can be used to restrict the light passing through or from the eyepieces to respective polarities. Pseudo stereoscopic effects can be produced when the polarizers 130 and 132 are employed with differential polarization illumination such as that which can be produced by the embodiments of FIGS. 19 and 56.

Figure 11:
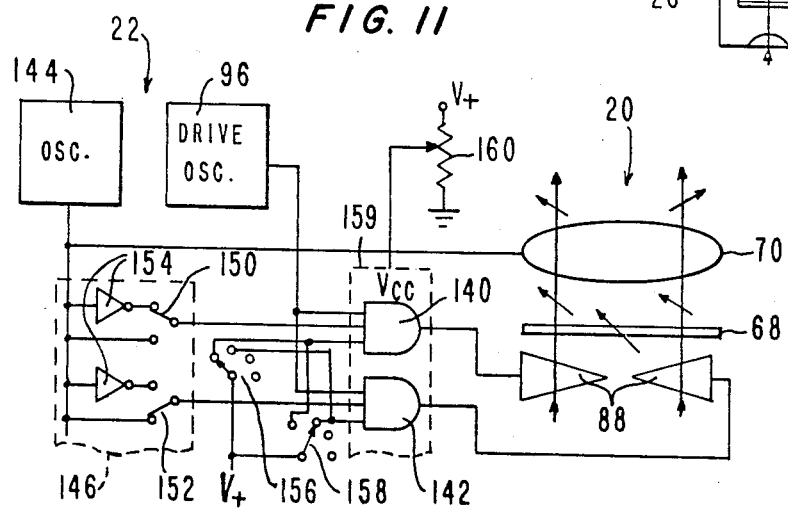
FIG. 11 is a block diagram of a portion of a modified electrical control circuit for operating a light transmission unit in a microscope according to the invention.

A variation of the control circuit 22 shown in FIG. 11 has gates, such as and-gates (only and-gates 140 and 142 shown), nand-gates, or the like, driving respective electrodes 88 in the light transmission control unit 20. First inputs of the gates 140 and 142 are connected to the drive voltage source 96. A square wave oscillator 144 drives the polarization control disc 70 and is connected by a polarization selecting device 146 to second inputs of the gates 140 and 142. The device 146 contains switches 150 and 152 for applying either non-inverted or inverted signals (through inverters 154) from the oscillator 144 to the second inputs of the gates 140 and 142. Third inputs of the gates 140 and 142 are connected to respective contacts of rotary switches 156 and 158 with wiper arms for selectively operating gates in the control circuit 22 to select a pair of electrodes 88 to be operated. Conveniently, the gates 140 and 142 are formed in a CMOS integrated circuit unit 159 which has its power input connected to the slider of a potentiometer 160 forming a voltage divider across a voltage source for producing a variable output voltage for varying intensity, phase, and/or color selection from the unit 20.

Figure 57:
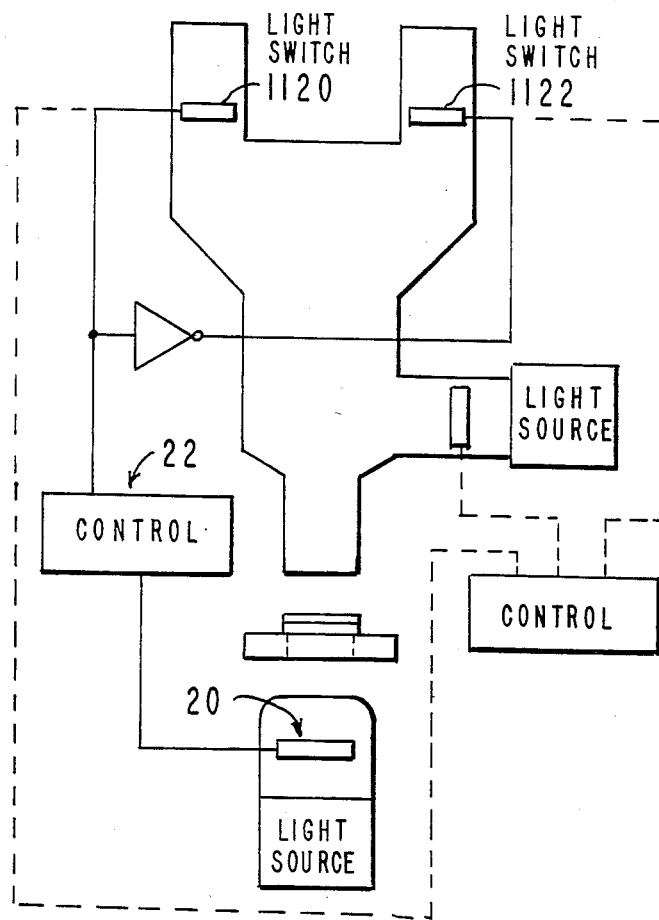
FIG. 57 is a diagram of a modified microscope with illumination control in accordance with the invention.

In operation of a microscope as modified in accordance with FIGS. 9 and 11, the electrodes 88 are alternately operated to pass light through the unit 20 in synchronism with the operation of the polarization control disc 70, i.e., the left electrode 88 is energized to pass light during the negative half cycle of the output of oscillator 144 which light passes through cell 70 without rotation of its polarization, and the right electrode 88 of FIG. 11 is energized to pass light through the unit during positive half cycles of the output of the oscillator 144, during which the polarization cell is energized to rotate the light 90° to thus produce alternating polarities of light from different directions which are applied to the object being examined. The polarizers 130 and 132 and the eyepieces 34 and 36 pass only the respective polarized light to thus produce a pseudo-stereoscopic effect to the left and right eyes of a person viewing through the eyepieces 34 and 36. Preferably, the oscillator 144 operates at a frequency in the range of 30 and above hertz to avoid flicker noticeable by a viewer. In the microscope variation of FIG. 57, light switches 1020 and 1122 are employed in place of the polarizers 130 and 132. The light switches 1120 and 1122 are operated by the control 22 to alternately pass and block light to the respective eyepieces in synchronism with alternating illumination patterns produced by the transmission unit 20 to produce stereoscopic effects. With light switches 1020 and 1122, the polarities of the light through the switches 1020 and 1122 may be the same.

Figure 10:
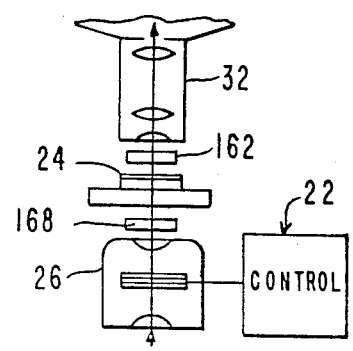
FIG. 10 is a diagrammatic sectional view of a second modified broken-away portion of a microscope constructed in accordance with the invention.
Figure 12:
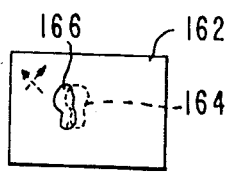
FIG. 12 is a plan view of a birefringent plate in the modified microscope of FIG. 10 illustrating the displacement of the light ray image of one polarization.

A stereoscopic view can be produced by the modification of FIG. 10, wherein a birefringent plate, such as a quartz or calcite plate 162, is inserted between the objective 32 and the object 24. As shown in FIG. 12, the image 164 of one polarity is shifted laterally with respect to the image formed by the polarity normal thereto, and with the polarizers 130 and 132, of FIG. 8 selected to pass only the polarities of the respective images 164 and 166, a true stereoscopic view of the object 24 is obtained through the single objective 32. Where substage lighting 26 is used, a second birefringement plate 168 oppositely oriented with respect to plate 162 is positioned between the substation 26 and the object 24 for offsetting the light of one polarity illuminating the object 24 in order to maintain proper illumination.

Figure 13:
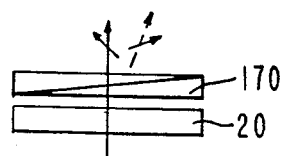
FIG. 13 is a diagram of a third modification which can be included in a microscope in accordance with the invention.

In the modification of FIG. 13, a birefringement prism, such as a Ronchon or Wollaston prism 170, is positioned on the exit side of the light from the unit 20. The birefringement prism separates the two orthogonally polarized light beams corresponding to the energized or unenergized state of the polarization control cell 70, FIG. 5, in the unit 20. Light rays of one polarity have a different angle than light rays of the other polarity so that a different angle of illumination is obtained by changing the excitation state of the polarity control cell.

The modified microscope of FIG. 58 includes, in the substage or superstage light control, a pattern selecting unit 1124 and a phase control unit 1126. The pattern selecting unit 1124 includes, as shown in FIG. 59, a pair of polarizers 1128 and 1130 between which is sandwiched a pattern select cell unit 1132, which may be a single cell or a combination of cells similar to cells 60 (FIG. 5), 62, 64, and/or 400 (FIG. 21), spot or ring selecting cells such as those in FIGS. 8, 28 and 33, and/or any other pattern selecting cell or cell arrangement. The phase control unit 1126 is an electro-optic unit similar to the unit 1124 or any cell or combination of pattern cells employing electro-optic materials; in FIGS. 61 and 62 there are illustrated examples of alternative phase control cells with a carbon tetrachloride layer 1133 and a piezoelectric plate 1135, respectively, disposed between upper electrode patterns 1136 and lower common electrodes 1137. Control circuit 1134 operates each of the units 1124 and 1126 separately in a manner similar to the control circuit 22 operating the cells 60, 62 and 64 or similar to any other herein described control circuit of pattern cells to select excitation patterns in the units 1124 and 1126 and select the voltages applied thereto. Alternatively, the pattern unit 1124 may be eliminated, as shown in FIG. 60, or the units 20 of FIG. 1 may be used for phase control. It has been found that a phase change introduced in one portion of a light pattern with respect to another portion of the light pattern can produce phase contrast enhancement of an image or portion thereof. In the case of incident or superstage lighting, this enhancement may enhance visualization of relatively small, height features of the object being viewed. Light from the differently phased portions of a light pattern impinging upon some points of an object may be refracted, diffracted, or reflected differently from light at adjacent points so that relative phase changes in the different light pattern portions can produce destructive and constructive interference in the image at respective adjacent points to enhance the image. The arrangement of FIG. 59 permits independent light pattern selections and phase pattern selection, whereas only phase pattern selection is available in the arrangement of FIG. 60. Where a pattern control unit 20 of FIG. 1 is used in phase control, the phase contrast depends upon the dark portions of the pattern passing sufficient light that phase adjustment between the light passed by the light and dark pattern portions can produce interference to enhance the image.

A modified microscope illustrated in FIG. 14 includes a modified electrically controlled light transmission unit such as an electrically responsive phase unit indicated generally at 200 which is operated by a phase control circuit 202. The unit 200 is positioned at either the diffraction image plane and/or the real image plane, depending upon whether the microscope is used for phase contrast microscopy or the microscope is used for measuring height or relative phase shift between spaced spots of the object 24, respectively. The unit 200 or a portion thereof may be positioned within the housing for the objective. The phase unit 200, as shown in FIG. 15, includes a pair of similar pattern selecting cells 204 and 206, each of which can be a combination of cells such as the ring selecting cells 60 and 62 of FIGS. 3, 4 and 5, or can be a spot selecting cell such as illustrated in FIG. 8 or any other desired pattern selecting cell or cells. A phase adjusting unit indicated generally at 210 is positioned between the pattern select cells 204 and 206 and includes a pair of oppositely oriented birefringement piezoelectric plates 212 and 214 lying face to face and having transparent electrodes 216 and 218 applied to the outside surfaces or faces thereof. The plates 212 and 214, for example, may be quartz or calcite plates. A potentiometer 220 is connected across a voltage source with one of the electrodes 216 being connected to the slider of the potentiometer 220 and the other electrode 218 being connected to the one end of the potentiometer 220 for applying an adjustable voltage across the electrodes 216 and 218 to selectively adjust the thickness of the plates 212 and 214. The pattern select cells 204 and 206 are operated by a control circuit 222, also part of the phase control 202, which is similar to the circuitry of the control 22 previously described for operating pattern selecting cells. The plates 212 and 214 are oriented to delay the light which has its polarization rotated by the pattern select cell 206 and to pass without delay the light which passes through the cell 206 with its polarization unchanged. Alternatively, the plates 212 and 214 can be oriented to delay the light which is passed with its polarity unrotated by the cell 216 and to pass without delay the light which has its polarization rotated by the cell 206. The unit 200 can optionally include a polarization control cell 224 which is substantially the same as the polarization control cell 70 of the unit 20 and can be used with the optional crossed eyepiece polarizers 130 and 132, FIG. 4, to produce stereoscopic effects. As an alternative to the polarization cell 224, repetively complementing of the pattern control cells 204 and 206 can be used to produce stereoscopic effects. Also, the modified microscope of FIG. 14 includes a photometer 226 mounted to receive a portion of the light passing through the unit 200. Conveniently, both of the reflectors 40 and 44 are partially transmissive and the photometer is mounted to receive light passing through both of the partly transmissive reflectors 40 and 44.

In use of the microscope of FIG. 14 in phase contrast microscopy, the unit 200 is positioned at the diffraction image and the pattern selecting cells 204 and 206 include an electrode pattern which can be selected to phase shift one portion of the light pattern generated by the unit 20 relative to the remaining portion to produce phase contrast interference similar to that of the microscope of FIG. 58. Also, the pattern selecting cells may be used to select an electrode pattern, such as a ring or circular pattern, which is either complementary or the same as an electrode pattern in the transmission unit 20 of the substage 26 or the superstage 28. The transmission unit 20 is operated to pass a circle or an annular pattern of light and the pattern select cells 204 and 206 are operated to rotate the plane of polarization of either the undeviated bundle of rays corresponding to the pattern of light from the unit 20 or to rotate the plane of polarization of the deviated light corresponding to the defracted light conjugate to the pattern selected by the unit 20. The potentiometer 220 is adjusted to operate the phase adjusting unit 210 to adjust the phase of one polarity of the light; the voltage applied across the plates 212 and 214 adjusts the thickness of the plates to selectively delay the light rays which have been rotated in polarization by the cell 206. After the cell 204 rotates the beam which was rotated by the unit 206 back to its original orientation, the light is then passed to the eyepieces 34 and 36 and viewed in a normal manner. The adjusting of the phase of the deviated bundle of light relative to the undeviated bundle of light results in interference when the deviated and undeviated light bundles are recombined, producing greater contrast in the image of the object.

In use of the microscope of FIGS. 14 and 15 to measure height or relative phase shift between spaced spots of the object 24, a respective one of the units 20 of the superstage 28 or substage 26, respectively, is operated to illuminate the spaced spots of the object 24. The pattern select cells 204 and 206 are positioned at the real image and are designed and operated to rotate the plane of polarization of the light corresponding to one of the spots. The light from the two spots can be combined and applied to the photometer 226 so that adjustment of the potentiometer 220 will result in a nulling or peaking of the photometer 226 depending upon destructive or constructive interference of the light. When the superstage 28 is selected as the illuminator, such phase nulling is used to measure relative height between the illuminated spots of the object. When the substage 26 is selected as the illuminator, the microscope is used to detect the relative delay or phase shift imparted to the spaced light beams by the respective spaced illuminated spots of the object 24.

Figure 63:
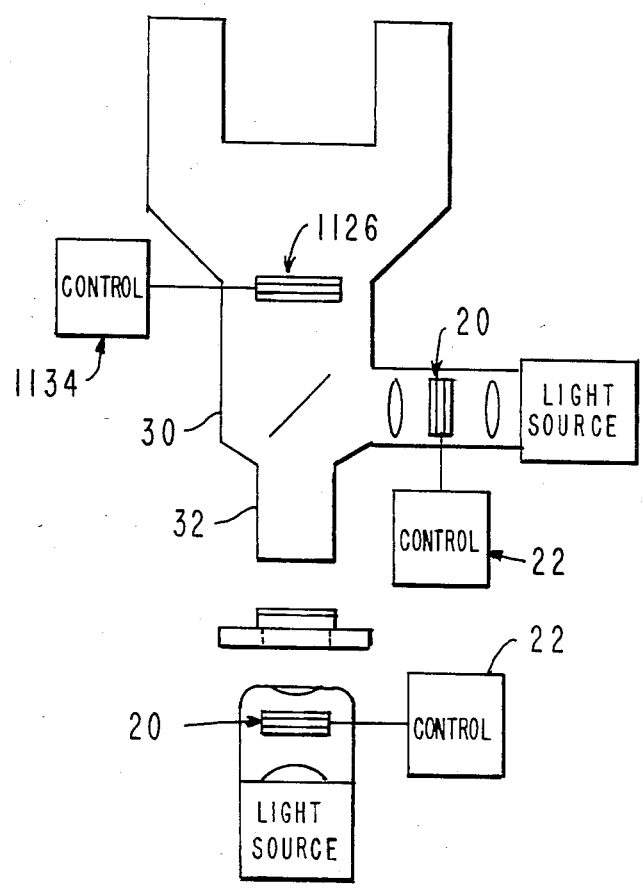
FIG. 63 is a diagram of still another modified microscope with illumination phase control.

In an alternative to the microscope of FIGS. 14 and 15, the phase control unit 1126 may be alternatively located in the diffraction or image plane of the microscope downstream from the objective 32, as shown in FIG. 63. The unit 1126 in the diffraction plane may be used in a manner similar to that of FIGS. 14, 15, and 58, to change the relative phase between different portions of a light pattern to enhance an image. Unit 1126 may also be energized with a pattern similar or conjugate to the light pattern generated by the unit 20, and operated to introduce relative phase shift between the diffracted or conjugate portion of light and the non-diffracted or non-deviated portions of light in the diffraction image. When located in the real image plane, the unit 1126 may be utilized to change phase of light from one spot relative to another in measuring relative height or phase shift in a manner similar to the microscope of FIGS. 14 and 15.

In a modified microscope of FIG. 29 for measuring height or relative phase shift between spaced spots of an object, a partial reflector 580 is positioned in the path of light reflected by reflector 44 to reflect a portion, for example 10%, of the light. Additionally, the reflector 44 is modified to transmit a portion of the light, similar to the portion reflected by the reflector 580 to form two additional beams 582 and 584. The illumination light of the microscope, substage for relative phase measurement and superstage for relative height measurement, is monochromatic light. The light is also polarized for use with polar phase cells, or unpolarized for use with non-polar dependent cells. With polar phase cells, there is included, for example, the polarizer 586 upstream from the reflectors 40 and 44; alternatively, the light may be initially polarized during the illumination stage or polarizers may be positioned in the light paths 582 and 584 immediately after the reflectors 580 and 44. Disposed in the light path 582 are a phase adjusting unit indicated generally at 590 and a pattern selecting cell indicated generally at 592 while a similar pattern cell 594 is positioned in the light path 584. The pattern selecting cells 592 and 594 are postioned at the real image plane of the object being viewed. The electrically controlled pattern selecting cells 592 and 594 are such that they select the respective spots of the object which are to be compared for height or relative phase shift. Analyzers 596 and 598 are positioned downstream from the pattern selecting cells 592 and 594 for eliminating the non-selected light. Reflectors 600 and 602 are provided for recombining the light path 582 with the light path 584, which recombined light is received by detector 226.

The phase adjusting unit 590 can be similar to the phase control 1126 or can, as shown in FIG. 31, include a piezoelectric crystal plate 604 with transparent electrodes 606 and 608 on opposite faces thereof, wherein the plate 604 produces a phase shift in the light transmitted therethrough in accordance with the voltage applied across the electrodes 606 and 608. A DC voltage source, such as a battery 610 and potentiometer 612, is utilized to selectively apply a voltage across the electrodes 606 and 608.

In operation of the microscope modification of FIG. 29, portions of the light from the objective are reflected and passed into the respective paths 582 and 584. Initially the cells 592 and 598 are operated to select the same spot on the object. The phase adjust unit 590 is adjusted until a null or peak is detected by the detector 226. Then the pattern select cells 592 and 594 are operated to select the respective spots which are to be compared for relative height or for relative phase shift. Further adjustment of the voltage on the phase shift unit 590 is then made to again produce the null or peak in the detector 226. The change in voltage on the phase shift unit 590 required to bring about a null or peak corresponds to the difference in phase shift or height of the two spots. It is noted that for a single frequency of light, the measuring system of FIG. 29 cannot detect relative phase shifts greater than 360° or relative differences in height greater than one wave length. However, by using two or more different wave lengths of light in successive tests, or by using an electronic system which counts each full wave shift as it occurs and tallies full wave count with measured partial wave shift, changes in phase shift greater than 360° and relative height greater than one wave length can be calculated.

Figure 20:
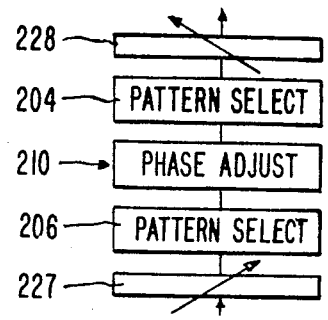
FIG. 20 is a block diagram of a variable phase adjusting and pattern filtering unit suitable for substitution for the variable phase adjusting unit of FIGS. 14 and 15.

An electrically controlled light transmission unit and an electrical control circuit, similar to the unit 20 and the circuit 22 decribed above, can be substituted for the unit 200 and the circuit 202 of FIG. 14; or a modified electrically controlled light transmission unit with phase control, shown in FIG. 20, can be substituted for the unit 200 of FIG. 14 and positioned in the diffraction image to enable spatial or fourier filtering of the light from the object. For some spatial filtering functions the light transmission units 20 in the illumination systems are not necessary. The modified unit of FIG. 20 includes polarizers 227 and 228 positioned on opposite sides of the serial arrangement of the pattern select cell 206, the phase adjusting unit 210, and the pattern select cell 204. Where the light source 29 is selected to produce polarized light, or where the unit 20 is included in the illumination system, the input polarizer 227 is not necessary and can be eliminated. Spatial filtering, such as fourier transform filtering, etc., of the light from the objective can be used to enhance the image contrast or to detect selected structures within the image.

In operation of the modified unit of FIG. 20, the pattern select cells 204 and 206 are operated to only pass selected patterns of light. The phase adjusting unit 210 is operated to change the phase of the pattern selected by the pattern select cell 206 relative to the phase of the pattern selected by the cell 204 to produce image enhancement or interference between selected image portions suitably for detection of a selected object or objects.

A modified control circuit portion is illustrated in FIG. 16 and includes an integrated circuit 230 which has analog switches 232 (only one shown) for connecting the slider of the potentiometer 100 to the respective electrodes of the pattern selecting cells of polarization control cell. Each analog switch is operated by a gate 234 which has its inputs operated by an element control select line 236, for example from one of the selectors 90, 92 or 94 of FIG. 5, and a phase control line 238, such as from phase selector 146 of FIG. 11. The switch 232 is operated during the positive half cycles of the phase control signal on line 238 when the element select line 236 is energized.

Figure 18:
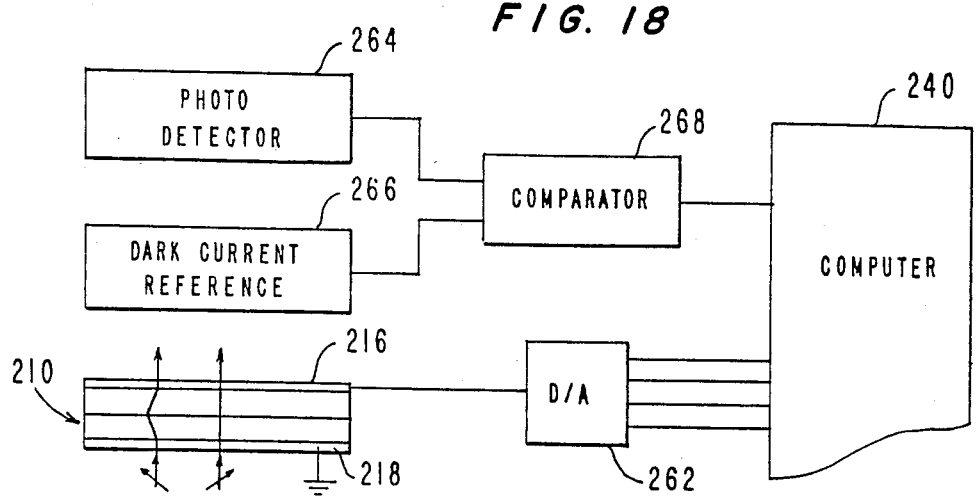
FIG. 18 is a block diagram of a portion of an electrical circuit variation for controlling the phase adjusting cell of FIG. 15.

As shown in FIG. 17, the controls for the electrodes of the pattern select cells as well as the polarization control cell can be operated by a computer 240. The computer 240 includes a latch 242 which controls the select line 244 to one input of a gate 246 driving the electrode. A second latch 248 of the computer 240 controls a switch 250 which selects the phase of the oscillator 144 applied to the phase select input of the gate 246. The drive oscillator 94 is connected to the third input of the gate 246. Optionally latches 252 can be connected to a digital-to-analog converter circuit 254 which operates the power input voltage to a CMOS unit 256 containing the gate 246 to enable intensity, phase, and/or color selection where the cell being operated can be used for such selection. Alternatively, the computer 240 can be operated to operate the latch 248 at the frequency of one or both of the oscillators 94 and 144 and the output of the latch 248 can be directly connected to an input of gate 246 eliminating the need for oscillator 94 and/or oscillator 144 and switch 250. Also, height measurement, as well as phase shift measurements performed by the microscope of FIG. 14 containing the phase cell 200, can be automated by the computer 240 as shown in FIG. 18, wherein the computer operates a digital-to-analog converter 262 to control the voltage across the electrodes 216 and 218 of the phase adjusting unit 210 in the unit 200. A unit containing a photodetector 264 and a dark current sensor 266 replaces the photometer 226 of FIG. 14. The output of the photodetector 264 is compared by a comparator circuit 268 with the output of the dark current reference circuit 266. The computer 240 senses a null condition of the light applied to the photodetector 264 while changing the digital-to-analog output 262 to determine height or phase shift measurement. The computer 240 can also be used to scan the object 24 where appropriate pattern control cell or cells are provided with spaced scanning spot electrodes or other electrodes suitable for scanning.

Figure 39:
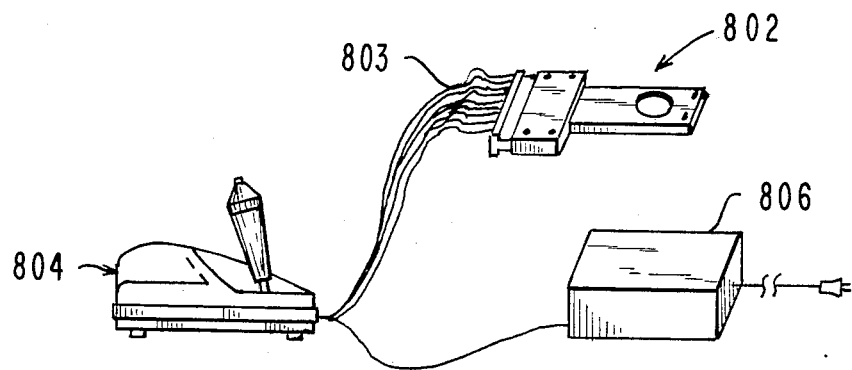
FIG. 39 is a view, partly in perspective, of embodiment of an illumination control device designed for insertion in a microscope in acordance with the invention.
Figure 40:
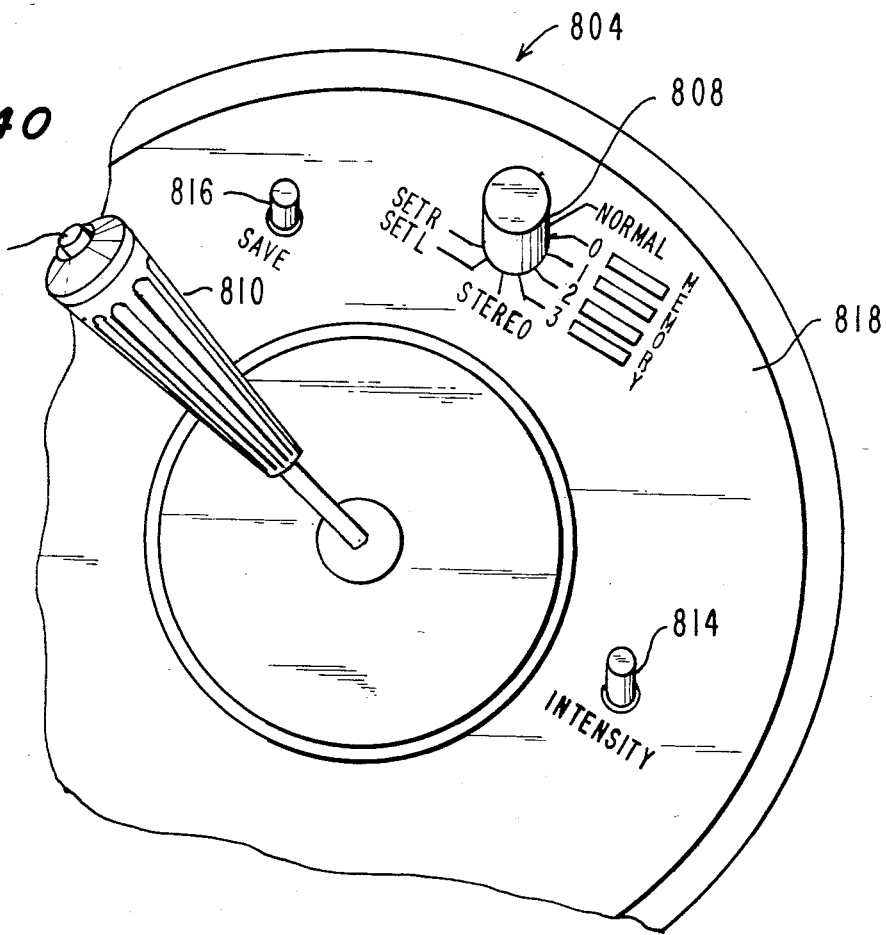
FIG. 40 is a plan view of a broken-away portion of an electrical controller of the control device of FIG. 39.

In a further modification illustrated in FIG. 39, an illumination control device for a microscope includes an optical cell module indicated generally at 802, which is connected by a multi-conductor cable 803 to a controller indicated generally at 804. A power supply 806 provides suitable voltages for operating micro-computer circuitry in the controller 804. The optical cell module 802 has a flat plate-like configuration for being inserted between the condenser and field lenses in an illumination system of a conventional microscope, which includes, or has been modified to include, a slot (not shown) in the microscope housing for receiving the module 802. The controller 804, as shown in FIG. 40, has a ten-position rotary function select switch 808, a joy stick 810 with a mode select push-button switch 812, an intensity push-button switch 814, and a save push-button switch 816, all mounted on a housing 818 ergonomically designed to present the joy stick in a convenient position for handling by an operator.

The optical cell module 802 as shown in FIG. 41 includes an LCD assembly unit indicated generally at 820 which is contained within a frame 822 by an upper printed circuit board 824 and a lower plate 826. The LCD assembly 820 is biased by springs 828 and 830 in a cavity 832 of the frame 822 against adjusting screws 834 and 836 so that the window 838 of the LCD assembly 820 may be accurately aligned with the optial axis of the light path for illuminating the stage of the microscope. The LCD assembly 820 as shown in FIG. 42 includes an upper LCD pattern cell 840, a lower LCD pattern cell 842, and a polarity control cell 844 contained within a housing 846 which is closed by a cover 848. Conectors 850, 852, and 854 provide for connection of the circuit patterns on the cells 840, 842 and 844 to the printed circuit boards 824 and 826, FIG. 41. The printed circuit board 824 has a connecter 856 for connecting to the cable 803. A cover 858 is adapted to enclose the connector end of the board 824.

Figure 43:
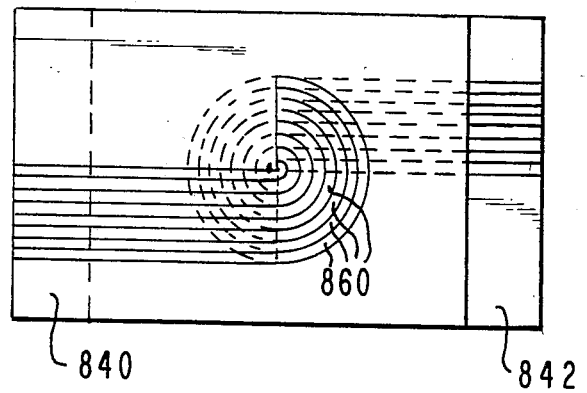
FIG. 43 is a plan view of a pair of superimposed LCD cells of the unit of FIG. 42 superimposed for forming circular or semi-circular patterns.

Each of the pattern generating cells 840 and 842, as shown in FIG. 43, includes a plurality, such as eight, concentric semi-circular electrodes 860 for selectively energizing corresponding semi-circular patterns of electro-optic material such as liquid crystal material sandwiched between the semi-circular electrodes and an opposing electrode. Conveniently, the cells 840 and 842 are made identical so that the cells 840 and 842 are superimposed with the semi-circular patterns on one of the cells 840 forming the right half of circular rings and the semi-circular patterns on the other cell 842 forming left portions of the circular rings. The electrodes of the cells 840 and 842 may be selectively energized to form left or right semi-circular patterns, full circle patterns, or patterns with both right and left semi-circles of different diameters and/or sizes.

Figure 49:
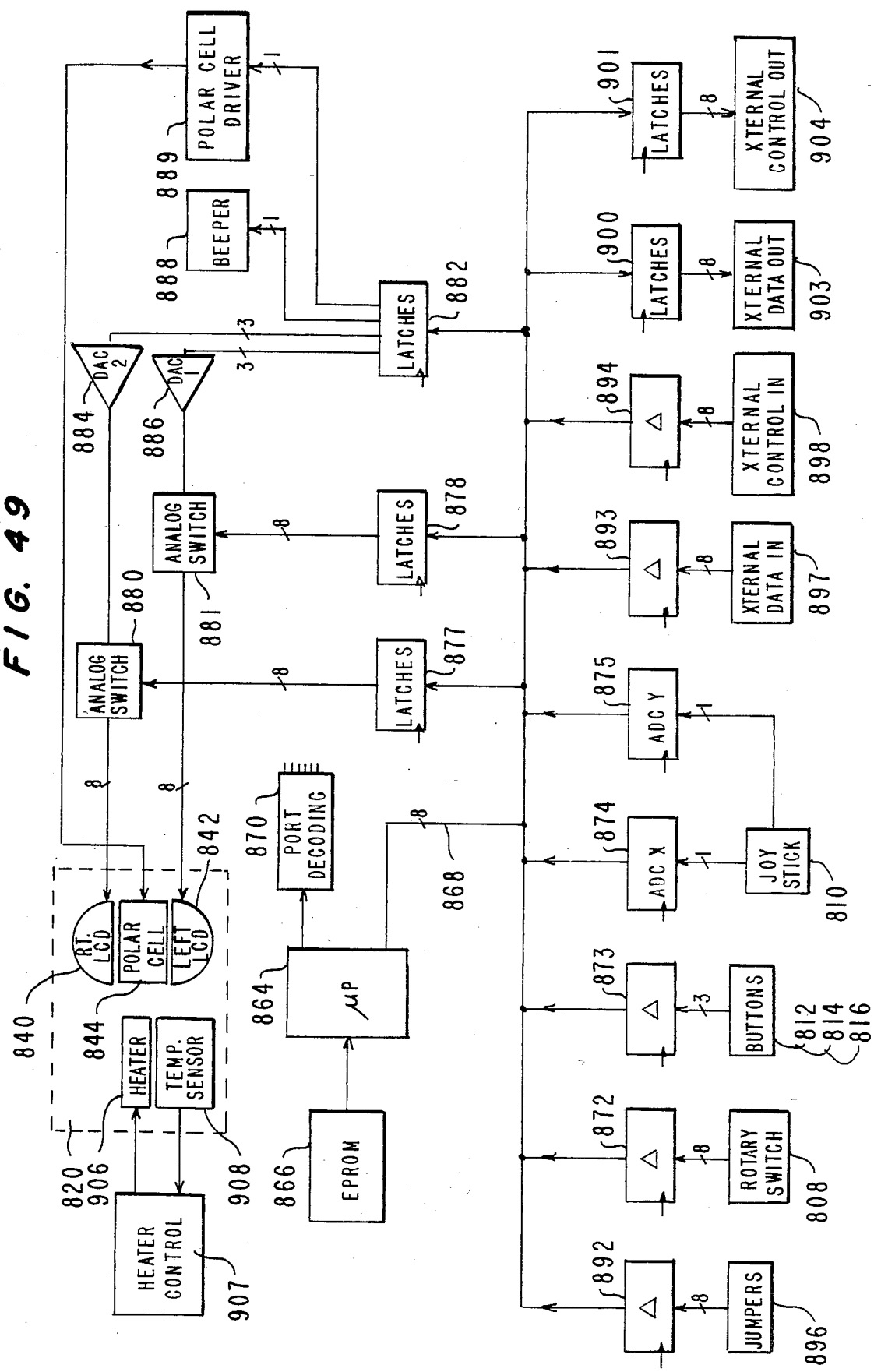
FIG. 49 is a functional block diagram of an electrical circuit in the electrical controller of FIG. 39.

A computerized circuit for selectively energizing the cells 840, 842 and 844, as shown in FIG. 49, includes a microprocessor 864 which is operated in accordance with a program stored in an EPROM 866. Input and output data or control signals are passed to and from the microprocessor 864 on a data bus 868. Input data for the microprocessor 864 is applied to the bus 868 when decoding or address circuitry 870 selects one of the bus driver/receivers 872 or 873, to read the rotary switch 808 or push button switches 812, 814 and 816, or analog-to-digital converters 874 and 875 to read the joy stick 810. Outputs from the microprocessor 864 operate latch circuits 877 and 878 when sequentially selected by the decoder 870 to operate respective analog switch circuits 880 and 881 to select the electrode or electrodes on the cells 840 and 842 to be energized. Similarly, an output from microprocessor 864 on bus 868 operates latch 882 when selected by the decoder 870 to operate digital-to-analog converter circuits 884 and 886 applying correspondingly magnitudes of analog signals to inputs of the switch circuits 880 and 881 to control the intensity of energization of the cells 840 and 842 to thus control the intensity, phase, and/or color of light passed therethrough. Additionally, the latch circuits 882 operate a beeper 888 and a polar cell driver 889 which controls the polar cell 844.

Optional bus driver/receivers 892, 893 and 894 may be selected by the decoder 870 to input data from jumpers 896, external data source 897, and external control 898. Optional latch circuits 900 and 901 may be selected by the decoder 870 to pass data to an external data user 903, such as another computer, and to an external control 904, such as other light controls, cameras, etc.

Liquid crystal material switches or operates at a faster rate when at an elevated temperature. Accordingly, a heater 906, such as a transparent resistance pattern on the polar cell substrate, is operated by a heater control circuit 907 in response to the temperature sensed by a temperature sensor 908 on the cell assembly 820.

Figure 50:
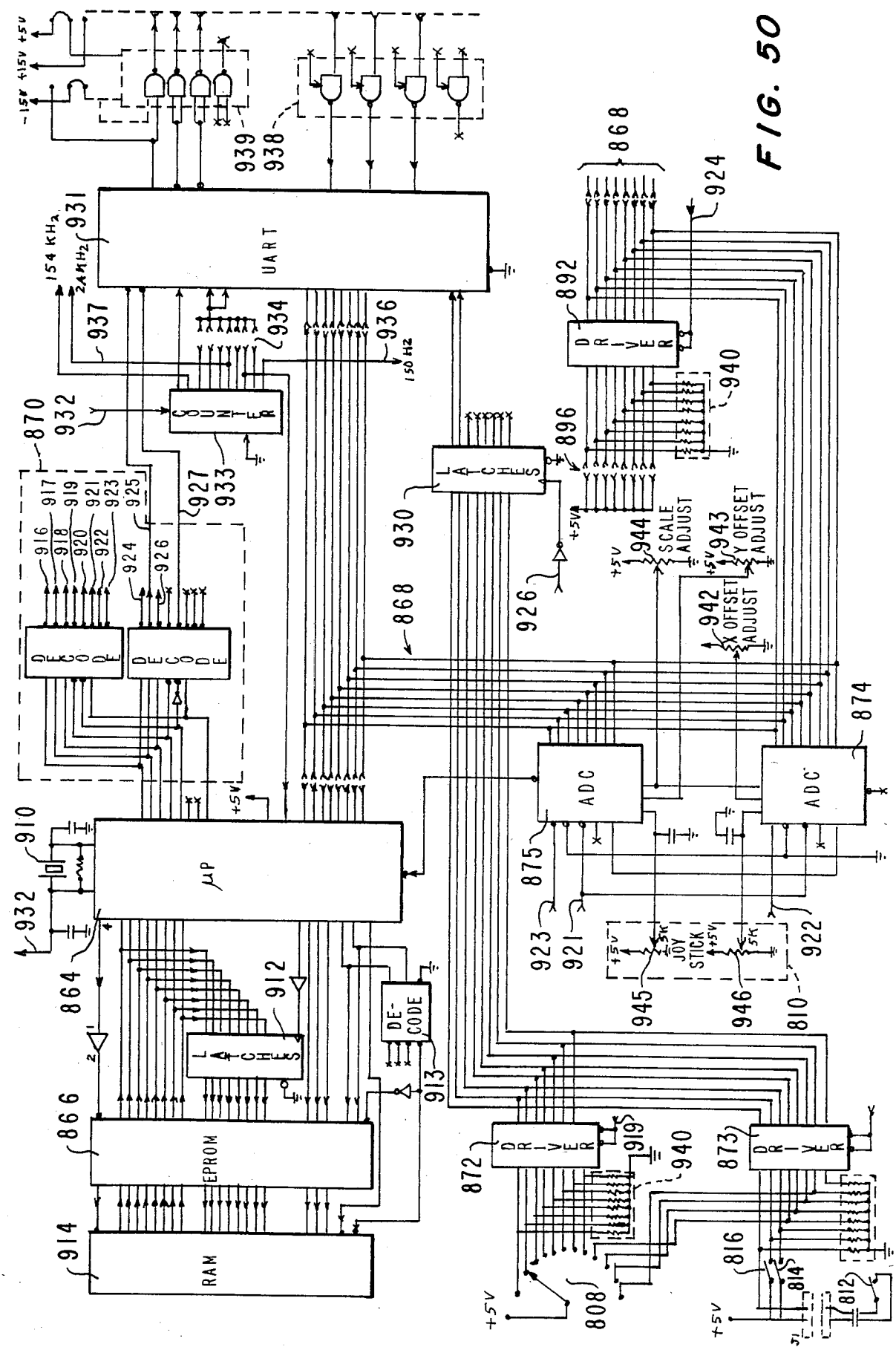
FIG. 50 is a detailed electrical schematic of a first portion of an electrical circuit in accordance with FIG. 49.
Figure 51:
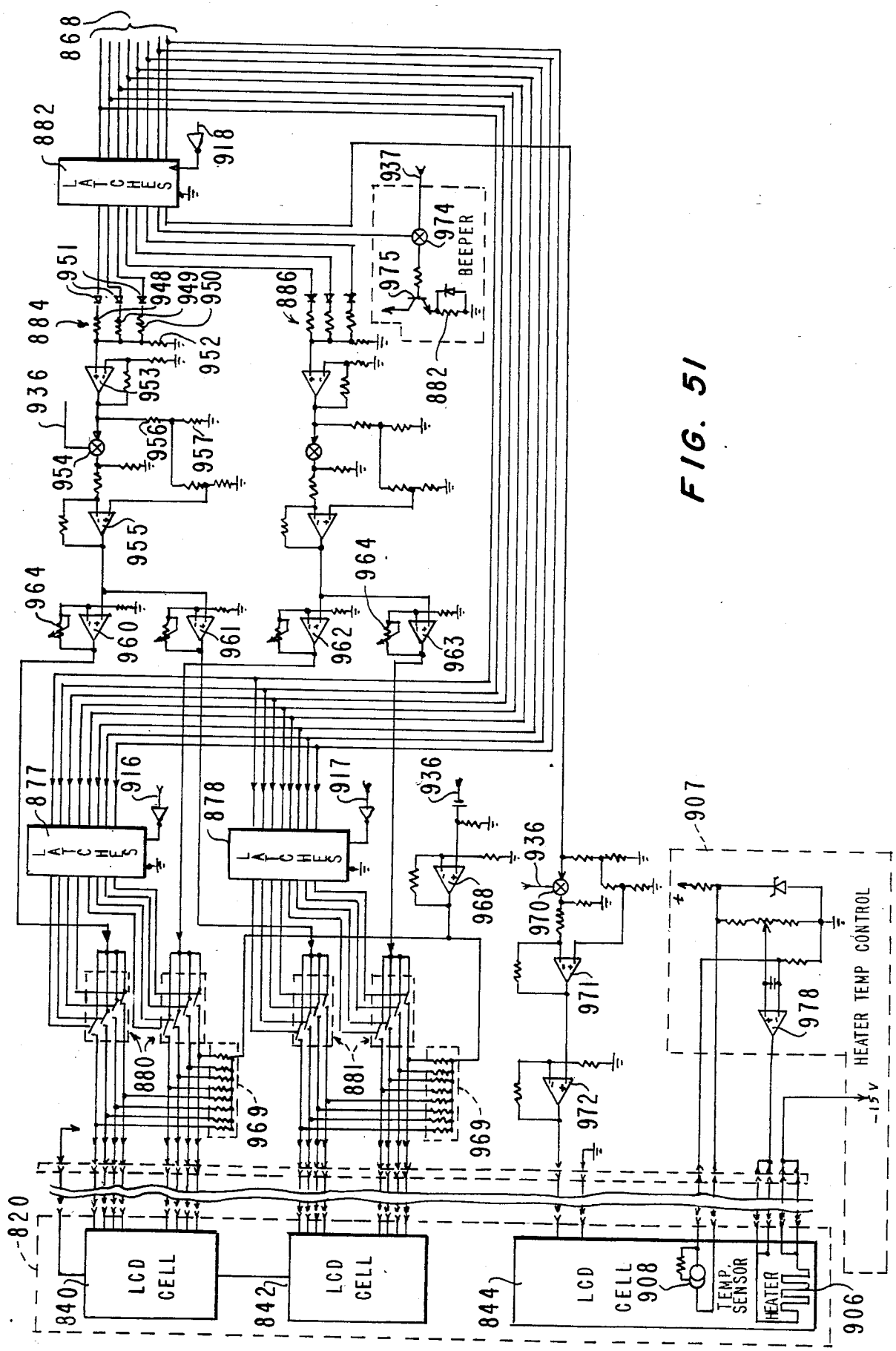
FIG. 51 is a detailed electrical schematic of a second portion of an electrical circuit in acordance with FIG. 48.

A variation of the circuit of FIG. 49 is illustrated in FIGS. 50 and 51, wherein the same reference numerals are used to identify similar parts. The microprocessor 864 such as a 146805 utilizes a crystal resonator, such as a 2.4576 megahertz crystal 910, and a conventional octal latch circuit 912 and decoder 913 to address the (EPROM) 866, and additional RAM 914. The bus 868 is connected to the B port, while the decoder 870 consisting of a pair of three-to-eight line decoders is connected to the A port of the microprocessor 864 for producing select signals on lines 916-927 to control input and output from the chips 877, 878, 882, 872, 873, 875, 874, 892, 930, and 931, respectively. The chips 930 and 931 are an octal latch circuit and UART, respectively, which are substituted for the drivers 893, 894 and latch circuits 900 and 901 of FIG. 49. The oscillator signal on line 932 is also applied to a counter 933 which, via a jumper connector 934, is connected to determine the baud rate of the UART 931 as well as to produce a 150 hertz signal on line 936 and a 2.4 kilohertz signal on line 937. The input and output of the UART 932 are connected by respective gating circuits 938 and 939 to suitable connectors for communicating with external equipment. Resistances in resistance pads 940 bias the inputs of the drivers 872, 873 and 892 to ground. Potentiometers 942, 943 and 944 enable adjustment of the response of the analog-to-digital converters 874 and 875 to correspond to the range produced by the X and Y axis potentiometes 945 and 946 in the joy stick 810.

In FIG. 51, the digital-to-analog converters 884 and 886 each consist of appropriately scaled resistors 948, 949 and 950, coupled in parallel by diodes 951 to respective outputs of the latch chip 882 and across a resistance 952 to the plus input of an operational amplifier 953. The output of the amplifier 953 is coupled through a bilateral switch 954 to the negative input of an operational amplifier 955 and through a voltage divider (divided by two) consisting of resistances 956 and 957 to the plus input of the operational amplifier 955. The bilateral switch 954 is driven by the 150 hertz signal on line 936. This results in the voltage output from the opamp 953 being subtracted from one-half of the voltage output of opamp 953 during alternate cycles when the switch 954 is closed to thus generate a square wave AC voltage from opamp 955 which swings between $+\frac{1}{2} V_D$ and $-\frac{1}{2} V_D$. The output of the amplifier 955 is applied by respective buffer amplifiers 960 and 961 to the respective single pole single-throw analog switches 880 and 881 connected to the right outside electrodes and connected to the left outside electrodes. Similar operational amplifiers 962 and 963 connect the AC output of the digital-to-analog converter 886 to the respective switches 800 and 881 to the right inside and left inside electrodes of the cells 840 and 842. Conveniently, the amplifiers 960-963 include respective variable feedback resistances 964 so that the level of voltage excitation of the liquid crystal displays can be selected.

In the specific embodiment of FIG. 51, the liquid crystal cells are such that they are normally driven black or opaque when energized. An operational amplifier 968 driven by the 150 hertz signal drives the electrodes 860 through resistances 969 when the corresponding switches 880 and 881 are open. When the corresponding switches 880 and 881 are closed, the voltages on the electrodes 860 are controlled by the outputs of the amplifiers 960–963. Thus, the transparency or degree of light transmission through the optical cell patterns is an inverse function of the digital signal applied to the digital-to-analog converters 884 and 886.

The circuitry for energizing the polar cell 844 includes an AC generating circuit including a bilateral switch 970 and an operational amplifier 971 with associated resistances substantially similar to the circuit including switch 954 and operational amplifier 955 used to generate square waves for the LCD cells 840 and 842. The AC generating circuit is energized by an output of the latches 882 connected to the switch 970. The output of the amplifier 971 is applied by a buffer amplifier 972 to the electrodes of the polar cell 844.

Another output of the latches 882 controls a bilateral switch 974 which energizes a transistor driver 975 operating the beeper 882. The bilateral switch 974 connects the 2.4 kilohertz line 937 to the transistor 975 to provide the proper operating signal for the beeper 882.

The heater temperature control 907 is a conventional heater control circuit utilizing an operational amplifier 978 controlled by the temperature sensing element 908 to generate current applied to the heater 906. Conveniently, the heater 906 is a transparent resistance pattern deposited on the glass substrate of the LCD cell 844. The temperature sensing element 908 is likewise connected or deposited on the cell 844.

Figure 44:
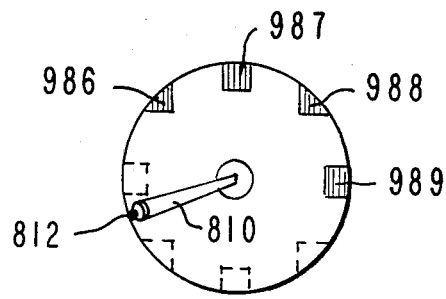
FIG. 44 is a plan view of a joystick of FIG. 40 illustrating joystick positions to select different patterns and different modes.
Figure 45:
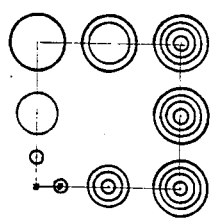
FIG. 45 is a diagram of several possible patterns which can be formed by the cells of FIG. 43 during a first mode wherein each of the patterns is illustrated in a position generally corresponding to the joystick position producing such pattern.
Figure 46:
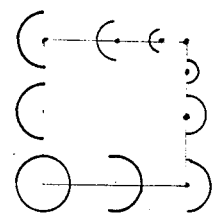
FIG. 46 is a diagram similar to FIG. 45 but of a second mode of operation of the illumination control device.
Figure 47:
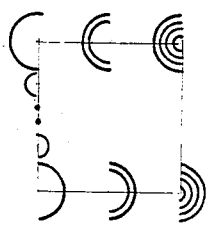
FIG. 47 is a diagram similar to FIG. 45 but of a third mode of operation of the illumination control device.
Figure 48:
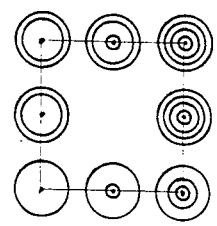
FIG. 48 is a diagram similar to FIG. 45 but of a fourth mode of operation of the illumination control device.

In operation of the control of FIG. 40, operation of the rotary switch 808, the mode switch 812 and the intensity switch 814 determine one of the various modes of operation for the illumination control. These modes include a pattern control mode and an intensity control mode wherein the position of the joy stick 810 determines the pattern and intensity, respectively, of the LCD light control patterns. The control is toggled between the pattern and intensity modes by the pushbutton switch 814. While in the pattern mode and with the rotary switch 808 in the normal position, several pattern modes may be selected by positioning the joy stick 810 and depressing of the mode switch 812. As shown in FIG. 44, if the joy stick 810 is positioned in one of the positions as indicated by the darkened areas 986, 987, 988 and 989, and the mode button 812 is depressed, the control will enter a respective pattern mode 0, 1, 2 or 3. FIGS. 45, 46, 47 and 48 illustrate the respective pattern modes 0, 1, 2 and 3. In mode 0, FIG. 45, movement of the joy stick 810 in the X direction (right and left) determines the number of circles or rings which are activated to pass light beginning with one ring on the extreme left. Positioning of the joy stick 810 in the Y direction while in the left position determines the size of the outer ring. In mode 1, FIG. 46, positioning of the joy stick determines various combinations of single left and right semi-circular patterns. In mode 2, FIG. 47, patterns on only semicircular patterns, right or left as determined by the joy stick being below or above the center position, are produced. The X direction determines the number of half ring patterns, while the displacement of the joy stick 810 above or below the central position in the Y direction determines the size of the outside ring. In mode 3, FIG. 48, various dark field and bright field illumination patterns are presented by starting with a single outside circle in the left bottom corner. The mode patterns in FIGS. 45–48 are only illustrative of many possible different combinations and patterns that can be produced by movement of the joy stick 810. Additional patterns may be provided by providing additional locations, as indicated by the dashed lines for entering various modes.

In addition to the normal position, the rotary switch 808 has four memory positions, set L and set R positions, and a stereo position. When the rotary switch 808 is in one of the memory positions, or the set R position or the set L position, then depressing of the save button 816 results in storing in a corresponding RAM memory location, the last pattern produced when the rotary switch 808 was in the normal position prior to a turning to the memory, set L or set R position. The pattern previously saved in the respective memory is used to energize the optical pattern cells 840 and 842 when the switch 808 is in the corresponding memory, set L or set R positions. Additionally, the polar cell 844 is operated when the switch is in the set R position so that light is only passed by the polarizer 132, FIG. 9, on the right eyepiece and is blocked by the polarizer 130 on the left eyepiece when the polarizers are in position on the eyepieces, and vice versa in the set L position. When the switch 808 is in the stereo position, the patterns previously saved in the corresponding set L and set R positions are alternately recalled and used to energize the pattern cells at a rate of about 30 HZ or above the flicker rate noticeable by eye. Simultaneous with the recall of the set L and R patterns, the polarizer cell 844 is turned off and on, respectively, to thus enhance stereo viewing.

Figure 52:
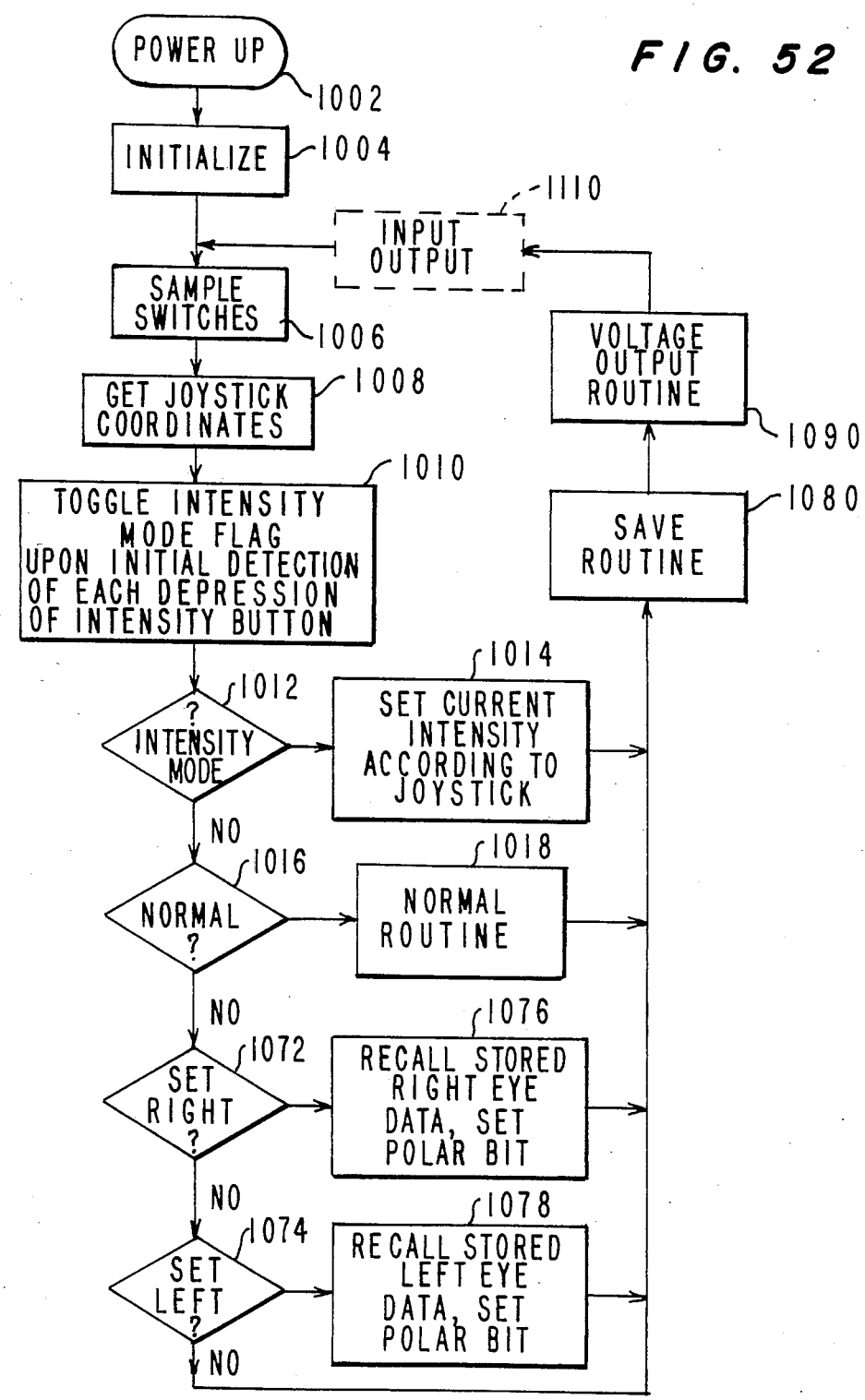
FIG. 52 is a flow diagram of a program for operating a microprocessor in the electrical circuit of FIGS. 49-51.

In the program for operating the illumination control system, as shown in FIG. 52, the program upon powerup begins at point 1002 and proceeds to an initialization step 1004 wherein the microprocessor port control registers are set, and various flags and designated RAM storage locations are cleared.

In the next step 1006, which is the first step of the continuous cycle of operation, the switches are read by sequentially operating the drivers 872 and 873 and storing the outputs of these drivers in suitable memory locations. Similarly, in the next step 1008, the coordinates of the joy stick 810 are read by operating the analog-to-digital converters 874 and 875; this involves applying a write signal on line 921, waiting for an interrupt, and then sequentially reading the converters 874 and 875.

In step 1010, the position of the intensity push button 814 is utilized to toggle an intensity mode flag. When a depression of switch 814 is first detected, the intensity mode flag is changed from 0 to 1 or 1 to 0, and a second flag is set to prevent subsequent toggling while the switch remains depressed. The second flag is cleared when the button is released. The presence of an intensity mode flag in step 1012 results in the program branching to step 1014 where the current intensity is set according to the present position of the joy stick. In step 1014, the position of the joy stick determines an offset in reading a memory table which contains intensity values in accordance with the joy stick position. The current intensity control may be different for different pattern modes of the apparatus. For example, in pattern mode 0, the intensity control may be determined by the Y direction of the joy stick and the X direction would have no effect on the intensity. In another mode, the Y condition may set the intensity of the inside rings of the pattern, while the X position will set the intensity of the outside rings of the pattern.

Figure 53:
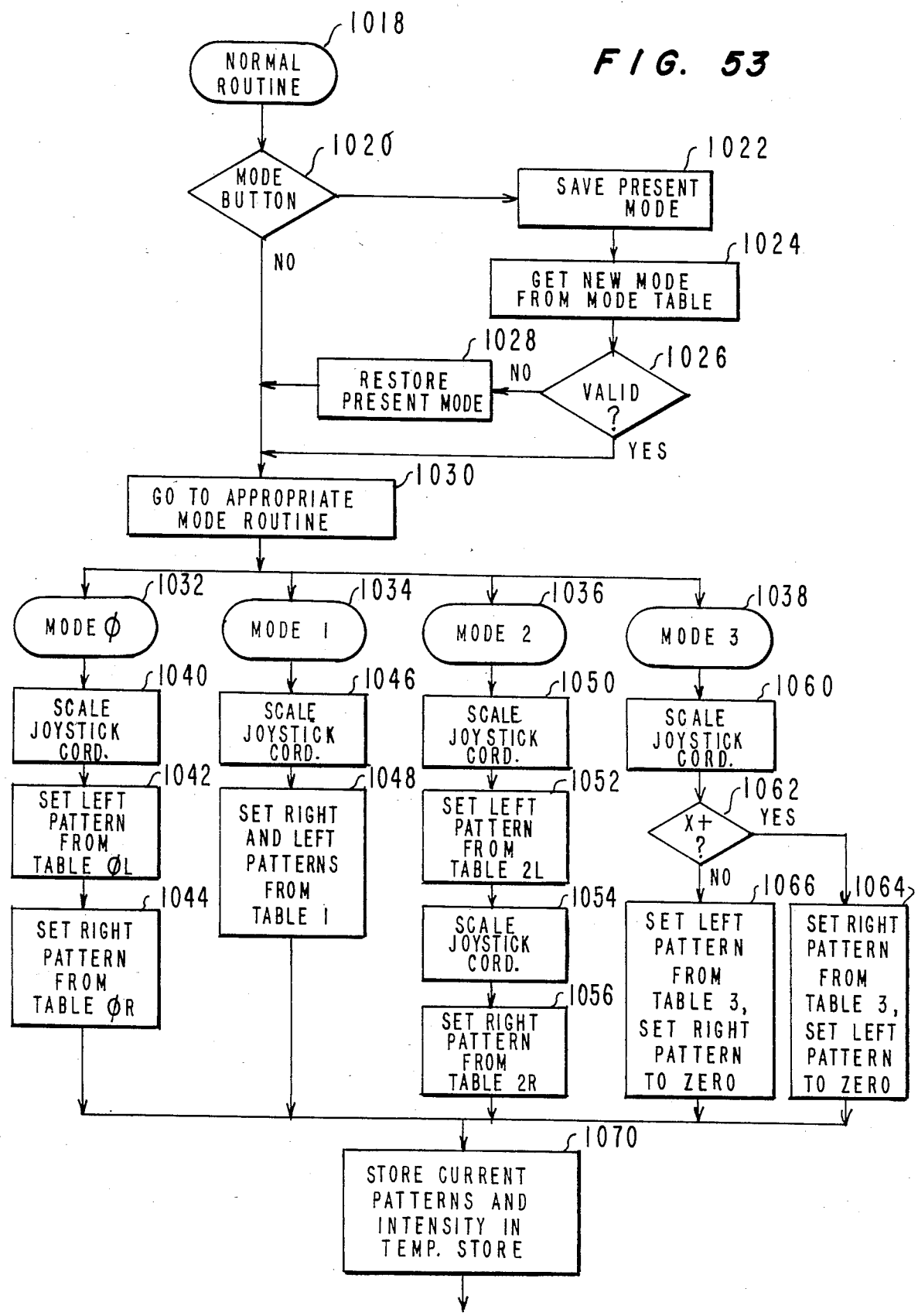
FIG. 53 is a flow diagram of a normal routine employed in the program of FIG. 52.

If the program is not in the intensity mode in step 1012, the program proceeds to step 1016 where the program will proceed to a normal routine 1018 if the rotary switch 808 is in the "normal" position. The normal routine is shown in FIG. 53 and begins with a step 1020 where the present condition of the mode button 812 is sensed, and if depressed, the program proceeds to step 1022 where the existing software mode is saved within a memory location so that it may be reestablished. From step 1022, the program proceeds to step 1024 where the position of the joy stick, i.e., the joy stick coordinates, are utilized to address a mode table. The particular joy stick coordinates may be scaled, i.e., divided by 32, to enable use of a relatively small table. Only when the addressed location of the table corresponds to one of the desired positions, such as positions 986, 987, 988 and 989 in FIG. 44, does the table contain a value corresponding to the selected mode; other table locations contain a value, such as $FF, which indiates to the program in step 1026 that the sensed mode is not valid and to proceed to step 1028 where the present mode saved on step 1022 is restored. From step 1020 if the mode button is not depressed, from step 1026 if the mode change is valid, or from step 1028, the program proceeds to step 1030 where an indexed jump is performed to the mode corresponding to the last valid mode entered or a default mode. Examples of mode routines are set forth beginning at points 1032, 1034, 1036 and 1038. For the mode 0, the program first scales the joy stick coordinates in step 1040 to a desired scale corresponding to the sizes of tables OL and OR, and then in steps 1042 and 1044 selects the appropriate left pattern and right pattern from the respective tables OL and OR for the corresponding cells 840 and 842. In the mode 1 routine, the program after scaling the joy stick coordinates in step 1046 proceeds to step 1048 where a single pattern is selected for the right and left patterns from table 1. In the mode 2 routine, the program scales the joy stick coordinates in 1050 and uses this scaling result to select a left pattern from a table 2L in step 1052. The joy stick coordinates again are scaled in a step 1054, and the mode 2 routine in step 1056 then selects the right pattern from the scaled coordinates from step 1054. In the mode 3 routine, the joy stick coordinates are scaled in the step 1060, and then the program proceeds to step 1062 where the positioning of the joy stick on the right or left side is detected. If this X coordinate is plus, i.e., the joy stick is positioned to the right of center, the program proceeds to step 1064 where the right pattern is selected from table 3 and the left pattern is set to 0. If the joy stick is to the left of center, as indicated by the scaled joy stick coordinate value from step 1060, the program proceeds to step 1064 where the selected value from table 3 sets the left pattern and the right pattern is set to 0. As noted above, the program may contain additional mode routines which are called in step 1030. From the mode routines, the program proceeds to step 1070 where the current patterns set in the previously selected mode 1032, 1034, 1036 or 1038 together with the intensity set previously set in step 1014 or a program default intensity are stored in a temporary memory location for possible subsequent use.

Referring back to FIG. 52, if the rotary switch 808 is in the set right or set left position, the program will proceed from step 1016 to the corresponding step 1072 and 1074 where the program will branch to the corresponding procedure 1076 or 1078. In step 1076, the right and left patterns, as well as intensity data, previously stored or saved in a set R memory location are recalled, while in step 1078 such data saved in a set L memory location are recalled. In step 1076, a polar bit will be set, while in step 1078 this polar bit will be cleared so that the polarizer cell 844 in cooperation with polarizers in the respective right and left eyepieces will direct the light to the corresponding right and left eyes.

Figure 54:
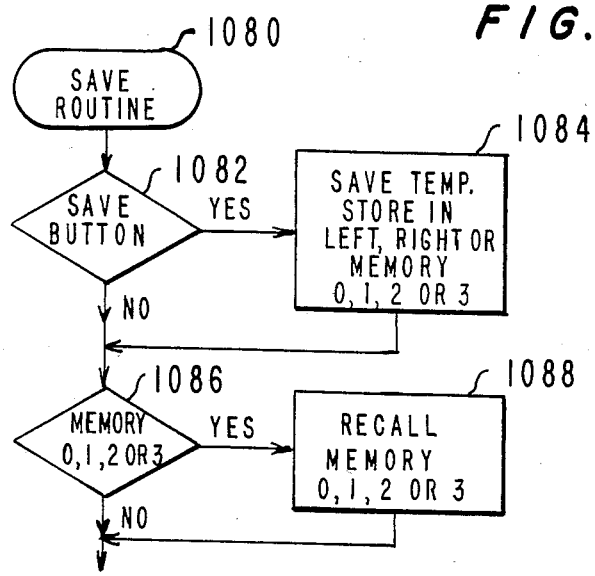
FIG. 54 is a flow diagram of a save routine employed in the program of FIG. 52.

From step 1014, 1018, 1076, 1078 or 1074, the program proceeds to a save routine 1080, which as shown in FIG. 54, proceeds to a step 1082 where the detection of the depression of the save button 816 causes a branch to step 1084. In this step 1084, when the rotary switch 808 is in one of the memory, set L or set R positions, the values which have been previously saved in the temporary memory location in step 1070 is stored in the corresponding memory, set L or set R memory locations. From step 1082, if the save button is not depressed, or from step 1084, the program proceeds to step 1086 where the positioning of the rotary switch 808 in one of the memory 0, 1, 2 or 3 positions results in the program branching to step 1088 where the corresponding stored data is recalled in a manner similar to that for steps 1076 or 1078.

Figure 55:
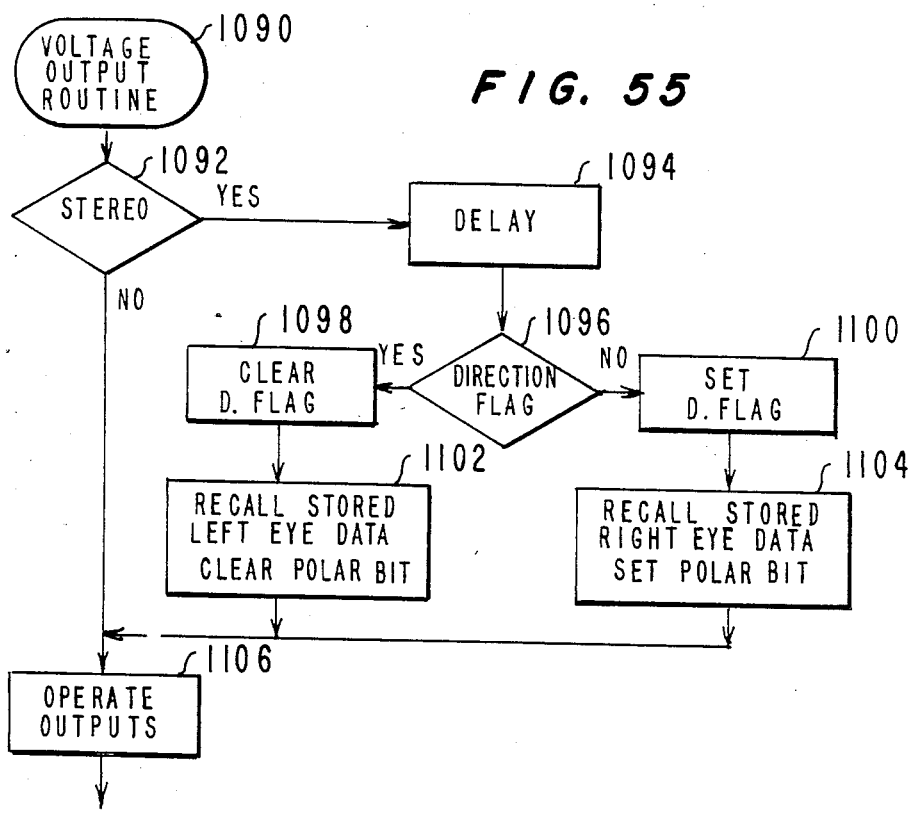
FIG. 55 is a flow diagram of a voltage output routine employed in the program of FIG. 52.

After the save routine 1080, FIG. 52, the program proceeds to the voltage output routine 1090 shown in FIG. 55. In this routine, the program in step 1092 will branch to a delay step 1094 if the rotary switch 808 is in the stereo position. The delay 1094 is selected to delay operation of the program for a sufficient time to enable the LCD cells 840, 842 and 844 to operate but less than that time period at which noticeable flickering will occur to the eye. From the delay 1094, the program proceeds to step 1096 where a direction flag is detected and the program branches to either step 1098 or to step 1100 where the direction flag is reversed for the next routine. From steps 1098 and 1100, the program proceeds to the corresponding steps 1102 and 1104, where the respective left eye data or right eye data is recalled, and the polar bit is cleared or set so as to direct the light to the corresponding left or right eye of the viewer. From steps 1102 and 1104 or from step 1092 if stereo is false, the program proceeds to a step 1106 where the previously recalled data or set data from the routines 1014, 1018, 1076, 1078 or recalled in step 1080 or 1090 for stereo operation are passed to the latches 877, 878 and 882 to operate the LCD cells 840, 842 and 844.

There is optionally shown an input/output step 1110 following the voltage output routine 1090 where the input and output units 893, 894, 900 and 901 or the UART 931 of FIG. 50 may be operated. From the optional step 1110, the program returns to step 1006 in the program to restart another program cycle.

Figure 22:
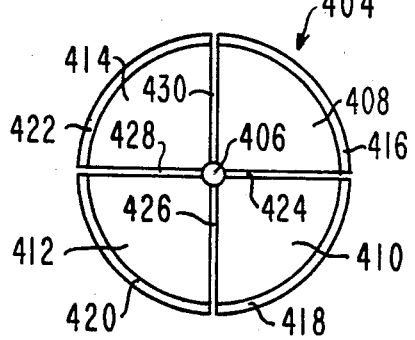
FIG. 22 is a plan view of one electrode arrangement in the cell of FIG. 21.
Figure 21:
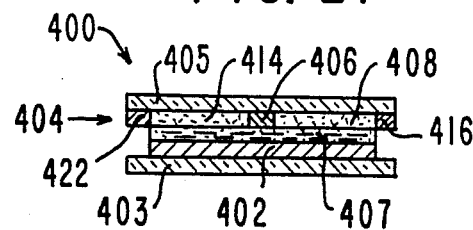
FIG. 21 is a cross-sectional view of a modified pattern selecting cell which can be used in the invention.

In FIG. 21, a pattern selecting cell, indicated generally at 400, for selectively generating ring patterns and sector patterns, can be used in place of the cells 60, 62 and 64 of the transmission unit 20 in FIG. 5 and can be used in place of the cells 60 and 62 in each of the pattern selecting cells 204 and 206 of the electrically responsive phase unit 200 in FIG. 15. The cell 400 includes a transparent conductive electrode 402 and a transparent resistive electrode arrangement indicated generally at 404 on respective transparent substrates 403 and 405. A layer of liquid crystal material 407 is sandwiched between the electrodes 402 and 404. The electrode 402 covers the entire face of the substrate 403 engaging the liquid crystal material 407. The electrode arrangement 404, as shown in FIG. 22, includes a circular transparent center conductor 406, four sector-like transparent resistive members 408, 410, 412 and 414 joined to the center conductor 406 and extending radially outward, and four arcuate transparent conductor segments 416, 418, 420 and 422 extending in a common circle and joined with the outer edges of the respective sector resistances 408, 410, 412 and 414. The sector resistances 408, 410, 412 and 414 and the outer conductors 416, 418, 420 and 422 are separated by spaces 424, 426, 428 and 430 extending along radial lines from the center conductor 406 so that the sector resistances and outer conductors are separated and insulated from each other except at the center conductor 406. Preferably, the spaces 424, 426, 428 and 430 are relatively narrow so that lines produced thereby in the pattern do not produce any significant effect in the pattern.

Figure 23:
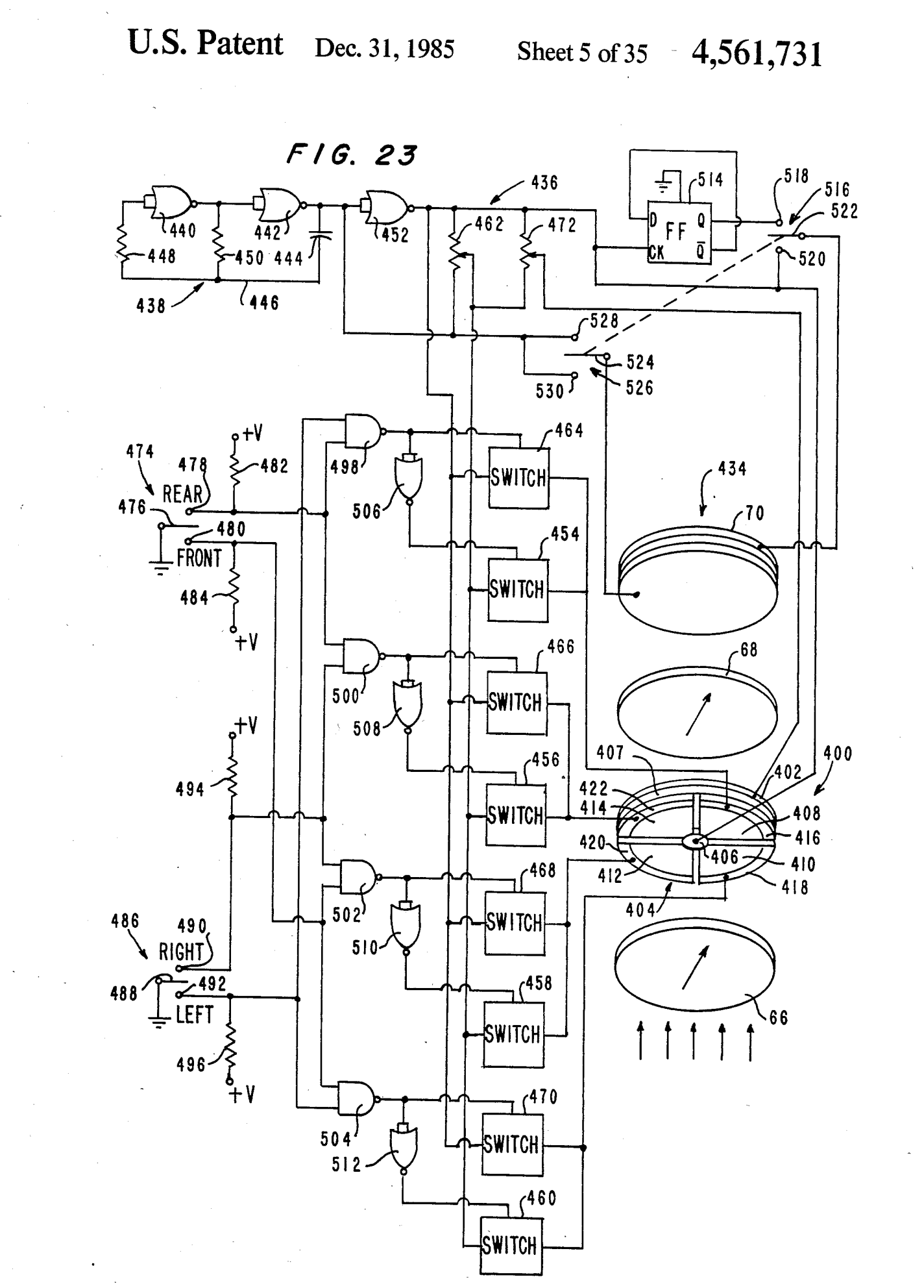

As illustrated in FIG. 23, a modified electrically controlled light transmission unit indicated generally at 434 includes the pattern generating cell 400 inserted between the polarizers 66 and 68 in place of the pattern selecting cells 60, 62 and 64 of the unit 20 of FIG. 5. A circuit indicated generally at 436 for operating the pattern cell 400 as well as the polarization control cell 70 includes an oscillator indicated generally at 438. The oscillator 438 includes a nor-gate 440 which has its output connected to both inputs of a nor-gate 442 with a capacitance 444 coupled between the output of the nor-gate 442 and a junction 446 which is coupled by resistances 448 and 450 to the inputs of the respective nor-gates 440 and 442. The output of the oscillator 438 is coupled to both inputs of a nor-gate 452 which has its output connected to the center conductor 406 of the pattern generating cell 400. The output of the nor-gate 452 is also connected to inputs of electronic switches such as bilateral switches 464, 466, 468 and 470 which have their outputs connected to the respective conductors 416, 422, 420 and 418. A potentiometer 462 is connected across the input and output of the nor-gate 452 and has its slider connected to inputs of electronic switches such as bilateral switches 454, 456, 458 and 460 which have their outputs also coupled to the respective conductors 416, 422, 420 and 418. A potentiometer 472 is connected, on one side, to the output of the nor-gate 452, and on the other side, to the slider of the potentiometer 462. The slider of the potentiometer 472 is connected to the conductor plane 402 of the pattern generating cell 400. A three-position switch indicated generally at 474 has a contact arm 476 connected to a ground potential and a pair of contacts 478 and 480 which are biased by respective resistances 482 and 484 to a +V voltage; the contact arm 476 has a first position engaging the contact 478, a second position (as shown) disengaged from both of the contacts 478 and 480, and a third position engaging the contact 480. A similar three-position switch indicated generally at 486 includes a contact arm 488 connected to ground and a pair of contacts 490 and 492 biased by respective resistances 484 and 496 to +V voltage. The contact 478 is connected to inputs of nand-gates 498 and 500, the contact 480 is connected to inputs of nand-gates 502 and 504, the contact 490 is connected to inputs of the nand-gates 500 and 502, and the contact 492 is connected to the inputs of the nand-gates 498 and 504. The outputs of the nand-gates 498, 500, 502 and 504 are connected to control electrodes or inputs of the respective switches 464, 466, 468 and 470, and are connected by respective nor-gates 506, 508, 510 and 512 operating as inverters to control electrodes of the respective switches 454, 456, 458 and 460.

The output of the nor-gate 452 is also connected to the clock input of a D-type flip-flop 514 which has its data input connected to its inverted output to form a frequency divider. A three-position switch indicated generally at 516 has one contact 518 connected to the normal output of the flip-flop 514, another contact 520 connected to the output of the nor-gate 452, and a contact arm 522 connected to one of the electrodes of the polarization control cell 70. The other electrode of the polarization control cell 70 is connected to a contact arm 524 of a three-position switch indicated generally at 526. Contacts 528 and 530 of the switch 526 are connected to the output of the nor-gate 442. The contact arm 524 of the switch 526 is ganged with the contact arm 522 of the switch 516 so that the contact arms 522 and 524 are operated simultaneously. The capacitance 444 and resistances 448 and 450 are selected to operate the oscillator 438 at a frequency just above the frequency at which the liquid crystal material remains in its excited state and so that, at the frequency of the divider 514, the polarization control cell is switched on and off when connected to the flip-flop 514.

In operation of the electrically controlled light transmission unit 434 of FIG. 23, the switches 474 and 486 are left open when it is desired to pass an annular or ring pattern of light through the light pattern cell 400. The voltage on the slider of the potentiometer 462 is applied by the switches 454, 456, 458 and 46 to the outer conductors 416, 418, 420 and 422 to generate a radially varying voltage gradient in the sector resistive electrodes 408, 410, 412 and 414; the magnitude of the voltage gradient is determined by the position of the slider on the potentiometer 462. The voltage on the upper planar electrode 402 is determined by the position of the slider of the potentiometer 472 and is selected to be within the voltage range generated between the center and outer conductors of the resistant electrode arrangement 404. Thus, the voltage on the electrode 402 is equal to the value of the voltage on the resistive electrodes 408, 410, 412 and 414 only along a circular line extending concentric and intermediate the center conductor 406 and outer conductors 416, 418, 420 and 422. A zero voltage across the liquid crystal material is generated along this circle. The liquid crystal material 407 is excited by the voltages generated between the electrodes 402 and 404 except for a circular band or annulus 532 as shown in FIG. 24, where the voltages between the electrodes 402 and 404 are less than the threshold value needed to excite the liquid crystal material. Polarized light passing through the excited portion of the liquid crystal material is rotated relative to light passing through the non-excited portion and is subsequently blocked by the polarizer 68 to only pass light in the annulus pattern 532. The width of the band 532 is decreased by moving the slider of the potentiometer 462 downward to increase the voltage gradient in the electrode 404, and the width of the band is increased by moving the slider upward to decrease the voltage gradient. Two different sizes and widths of the rings are shown at 532 and 532 in FIGS. 24 and 25, respectively. The position of the rings, i.e., the diameter of the rings, is determined by the position of the slider of the potentiometer 472 which can vary the position of the ring from the center conductor 406 to the outer conductor 416. The entire pattern can be made non-excited by reducing the voltage gradient to a value less than twice the threshold voltage of the liquid crystal material and centering the slider of the potentiometer 472.

Operation of one of the switches 474 or 486 operates a selected pair of the nand-gates 498, 500, 502 and 504. This deenergizes the corresponding switches 464, 466, 468 and 470 and energizes the corresponding switches 454, 456, 458 and 460. For example, if the switch 486 is operated to engage the contact arm 488 with the contact 490, the nand-gates 500 and 502 are operated to disconnect the switches 456 and 458 and to operate the switches 466 and 468, thus connecting the conductors 420 and 422 to the output of the nand-gate 452 which is the same voltage as the center conductor 406. Thus, the left side of the pattern generator as shown in FIG. 26 is excited when the voltage produced on the slider of the potentiometer 472 is greater than the threshold voltage relative to the output of the nor-gate 452. Operation of the sliders of the potentiometers 462 and 472 determine the width and position of the arcuate on-excited portion 536 shown in FIG. 26 for the right side of the pattern. It is noted that operation of a single one of these switches 474 and 486 can select rear, front, right, or left portions of the pattern.

Operation of both of the switches 474 and 486 selects a single sector or quadrant of the pattern to produce an arcuate portion of unexcited liquid crystal material. For example, operating switch 474 to connect the contact arm 476 with the contact 480 and operating switch 486 to connect the contact arm 488 with the contact 490 results in nand-gates 500, 502 and 504 opening the switches 456, 458 and 460 and closing the switches 466, 468 and 470 to connect the outer conductors 418, 420 and 422 to the output of the nand-gate 452 to thus render the voltage on the resistances 410, 412 and 414 uniform and equal to the voltage on the center conductor 406. Thus, the potentiometers 462 and 472 only control the voltage gradient in the resistance sector 408 to produce a non-excited arcuate portion 538 as shown in FIG. 27 in the front right sector.

When the switches 516 and 526 are in their open position, as shown in FIG. 23, the polarization control 70 is unexcited to thus not effect the light passing therethrough if the liquid crystal material in the cell 70 is normally isotropic, or to rotate the polarization plane if the material is normally anisotropic. When the switches 516 and 526 are operated so that the contact arms 522 and 524 engage contacts 520 and 530, respectively, the cell 70 is operated to change the output polarization by 90 degrees. When switches 516 and 526 are operated to engage contact arms 522 and 524 with contacts 518 and 528, the output of the flip-flop 514 is connected to the polarization control cell to alternately energize and deenergize the cell. When used in combination with the polarizers 130 and 132 of FIG. 9 in the path of light through the left and right oculars 34 and 36, the left and right eyes will view the response of the object to respective different polarities of light, or if used with the plates 162 and 168 of FIG. 10, a true stereoscopic view of the object can be obtained.

A variation of the resistive electrode arrangement, shown in FIG. 28, includes the arrangement 404 disposed in the center surrounded by an annular conductor 544, resistive arcuate members 546, 548, 550 and 552, and outer arcuate strip conductors 554, 556, 558 and 560. A space 562 surrounding the inner pattern 404 spaces the annular conductor 544 from the inner pattern 404 sufficiently to electrically insulate the annular conductor 544 from the outer conductors of the pattern 404. The resistance members 546, 548, 550 and 552 are connected to the annular conductor 544 at curved inner edges thereof and are connected to the respective outer arcuate conductors 554, 556, 558 and 560 at outer curved edges thereof; the arcuate resistive members 546, 548, 550 and 552 having a substantial width between the inner and outer edges. Narrow spaces 564, 566, 568, and 570 extend radially from the annular conductor 544 between the corresponding resistive members 546, 548, 550 and 552 and outer conductors 554, 556, 558 and 560 to insulate the resistive members and outer conductors from each other. The annular conductor 544 forms the center conductor of the outer portion of the resistive pattern of FIG. 28. This outer portion can be operated by circuitry substantially similar to the circuitry of FIG. 23 operating the inner resistive pattern 404 to produce other possible patterns as well as enabling the production of narrower ring patterns provided that the size of the pattern of FIG. 28 is less than twice the size of the pattern of FIG. 22. The liquid crystal material can only withstand a maximum voltage (for example 100 volts) before breaking down and conducting. Since the voltage between the inner and outer conductors cannot exceed this maximum voltage, the voltage gradient in the resistive members has an upper limit which thus limits the thinness or narrowness of the ring pattern which can be produced. By employing concentric patterns such as in FIG. 28, each concentric pattern can have the maximum voltage gradient thereacross, thus enabling the production of narrower ring patterns. In an example of a liquid crystal material having a threshold voltage of 2 volts and a maximum voltage of 100 volts, the ring width would equal a distance corresponding to 4 volts or about 1/25 of the distance between the inner and outer conductors. With two concentric patterns as shown in FIG. 28, the width of the ring pattern can be reduced to 1/50 of the total width of the concentric patterns. It is noted that dividing the pattern even further into additional concentric patterns can produce a corresponding decrease in the minimum width of a ring pattern.

An example of a pattern selecting cell suited for use as the cells 592 and 594 is shown in FIG. 30 and includes upper and lower transparent resistive electrodes 620 and 622 with a liquid crystal layer 624 sandwiched therebetween. Conductors 626 and 628 are connected to opposite terminals of a voltage source 630 and are joined to opposite sides of the upper resistive electrode 620 producing a voltage gradient in the resistive electrode in a first direction. Conductors 632 and 634 are connected to opposite terminals of a second voltage source 636 and are joined with opposite sides of the lower resistive electrode 622 for producing a voltage gradient in the electrode 622 in a second direction which is orthogonal to the direction of the voltage gradient in the upper electrode 620. The voltage sources 630 and 636 are synchronized, and the voltage source 636 has a frequency exactly twice the frequency of the voltage source 630. Also, the voltages on both output terminals of one of the voltage sources 630 and 636 can be adjusted or varied relative to the voltages on the output terminals of the other voltage source.

During a first portion of the cycle from the voltage source 630 and 636 the voltages generated in the resistive electrodes 620 and 622 produce a resultant voltage between the electrodes less than the threshold exciting voltage for the liquid crystal material along one diagonally extending strip shown at 638. During a second portion of each cycle of the voltage sources 630 and 636, the voltage of the source 636 is changed so as to produce a second diagonal strip 640 in the liquid crystal material where the voltage thereacross is less than the threshold voltage required to excite the liquid crystal material. Only at one spot 642 where the strips 638 and 640 cross is the voltage less than the threshold voltage during a whole cycle. The position of the spot 642 is selected by selecting the relative voltages of the source 630 and 636. The liquid crystal material 624 has a turn-off time which is at least twice its excitation time so that in the portions of the strips 638 and 640 outside of the spot 642, the liquid crystal material is excited and remains excited. Thus, only in spot 642 is the liquid crystal unexcited and, with a pair of polarizers such as polarizers 586 and 596, only light passing through spot 642 in the real image of the object is passed to the detector 226.

In a modified electronic circuit shown in FIG. 32 for operating the pattern selecting cell of FIG. 30, contact arms 640, 642, 644 and 646 of respective electronic double throw switches are connected to the respective conductors 632, 626, 634 and 628. A digital-to-analog converter 648 supplies analog voltages to a normally closed contact 650 of the switch 640 and a normally open contact 652 of the switch 642. Normally closed contact 654 of switch 644 and normally open contact 656 of switch 646 are connected to ground. The output of a clock or pulse generator 658 is connected to the output enable input of a plural latch circuit 660 and is connected by an invertor 662 to an output enable input of a second plural latch circuit 664. The outputs of the latch circuits 660 and 664 are connected to a bus which is also connected to inputs of a digital-to-analog convertor 666 having its input reference voltage connected to the output of the digital-to-analog convertor 648. The analog output of the digital-to-analog convertor 666 is connected to normally closed contacts 668 and 670 of the respective switches 642 and 646 and is connected to normally open contacts 672 and 674 of the respective switches 640 and 644. The output of the clock 658 is also connected with operating inputs of the respective electronic switches 640, 642, 644 and 646 to operate the switches in synchronism with operation of the latch circuits 660 and 664. A suitable computer or other data source provides digital information inputs to the digital-to-analog convertor 648 and the latch circuits 660 and 664 corresponding to the size of the spot to be generated, the Y position of the spot and the X position of the spot.

In operation of the electronic circuit of FIG. 32, the switches 640, 642, 644 and 646 during a first phase of the clock 658 connect the conductors 632 and 634 across the output of the digital-to-analog convertor 648 to produce a voltage gradient in the resistance electrode 622 while connecting the conductors 626 and 628 to the output of the digital-to-analog convertor 666 which produces an analog output corresponding to the desired Y position stored in the latch circuits 660. This will define a horizontal band, as viewed in FIG. 32, having a width corresponding to the output of the digital-to-analog convertor 648. During the second phase of the clock 658, the switches 640, 642, 644 and 646 connect the resistance electrode 620 across the output of the digital-to-analog convertor 648 and connect the electrode 622 to the output of the digital-to-analog convertor 666 which now has its input controlled by latch circuit 664 wherein the X position of the latch circuit is stored to define a vertical band. The combination of the horizontal band and the vertical band determine a spot having the X and Y position.

Figure 33:
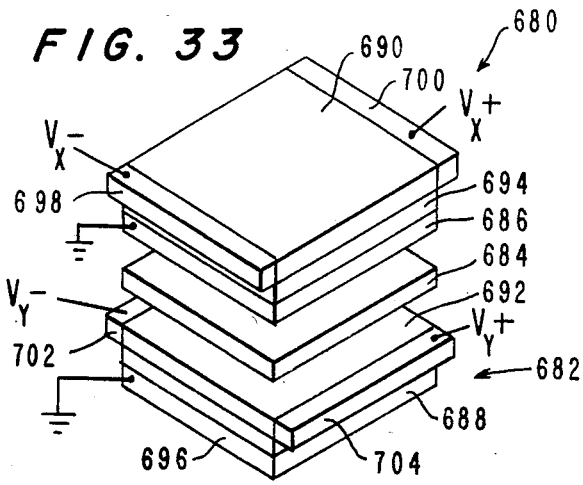
FIG. 33 is a diagram of a modified pattern select cell arrangement for substitution in the microscope of FIG. 29.
Figure 34:
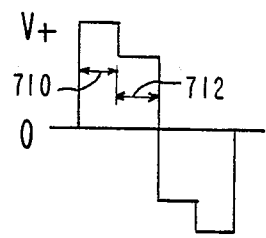
FIG. 34 is a wave form diagram of electrical signals used to operate one of the cells in FIG. 33.
Figure 35:
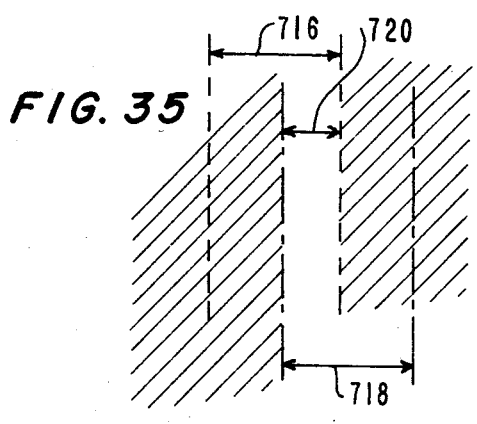
FIG. 35 is a diagram of a broken-away portion of a pattern generated by the operation of one of the cells of FIG. 33 by the electrical signals of FIG. 34.

A modified cell arrangement illustrated in FIG. 33 can be substituted for the cell of FIG. 30 and includes a pair of cells 680 and 682 each designed for producing a polarity rotated band or strip. A polarizer 684 is positioned between the cells 680 and 682 for blocking background light (all light except for the selected strip) from the upstream cell 682. The cells 680 and 682 include transparent conductor electrodes 686 and 688 which are connected to ground or a zero reference voltage, transparent resistive electrodes 690 and 692, and layers of liquid crystal material 694 and 696 sandwiched between the conductive and resistive electrodes. Edge conductors 698 and 700 are joined to opposite edges of the resistance electrode 690 and connect the resistance electrode to respective terminals $Vx-$ and $Vx+$ of a variable voltage source, and edge conductors 702 and 704 are joined to opposite edges of the resistance electrode 692 and are connected to respective terminals $Vy-$ and $Vy+$ of a second variable voltage source. The conductors 698 and 700 are orthogonal to the conductors 702 and 704 so that a strip produced by the pattern generator 680 is orthogonal to the strip produced by the generator 682. The cell 680 rotates polarity of only one spot of the strip image passing through the polarizer 684 so that the remaining portion of the strip image can be blocked by a subsequent polarizer passing only the spot as defined by the intersection of the orthogonal strips produced by cells 680 and 682. An example of a voltage wave form $V+$ and its complement $V-$ which may be used for either one of the $Vx$ or $Vy$ voltages is illustrated in FIG. 34. A first portion 710 of each phase has a magnitude which is offset from the magnitude of the second portion 712. As shown in FIG. 35, the portion 710 of the voltage generates a region 716 wherein the voltage in the resistive electrode 690 or 692 does not exceed the threshold value relative to the conductive electrode 686 or 688 required to excite the liquid crystal material 694 or 696. The offset voltage in the portion 712 produces a region 718 wherein the voltage in the resistive electrode relative to the conductive electrode does not exceed the excitation threshold value. The magnitudes of the voltages in the portions 710 and 712 are selected to produce an overlapping region 720 wherein the voltage during neither portion of the phase exceeds the excitation threshold voltage. The time required for the liquid crystal material to return from its excited state back to its unexcited state is greater than twice the time required to excite the crystal from its unexcited to its excited state. The duration 710 and 712 are thus selected to be longer than the excitation time but less than one-half of the extinguishment time. Thus, the liquid crystal material remains unexcited only in the overlapped region 720 and remains excited in the regions outside of the overlapped region 720. Since the overlapping region 720 is substantially narrower than the width of one of the regions 716 or 718, a much narrower band is possible. The liquid crystal material has a threshold voltage cutoff, i.e., the difference between the voltage at which the liquid crystal material becomes substantially excited and the voltage at which the liquid crystal material becomes substantially nonexcited, less than one-third the total threshold voltage, i.e., corresponding to width 716. Where the threshold voltage cutoff is greater than about one-third of the threshold strip width, the application of alternating regions does not produce significant reduction in width of the band output.

Figure 37:
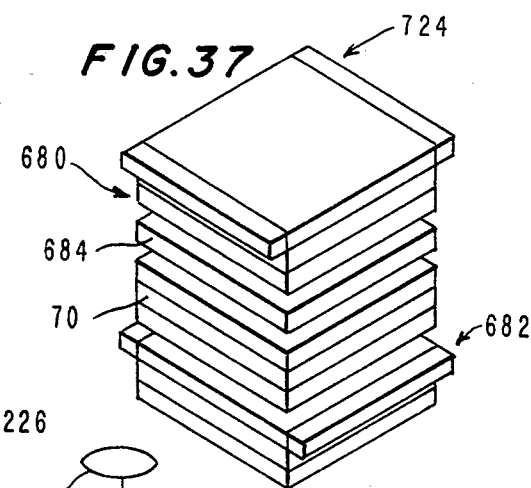
FIG. 37 is a diagrammatical perspective view of a pattern select unit in the variation of FIG. 36.
Figure 36:
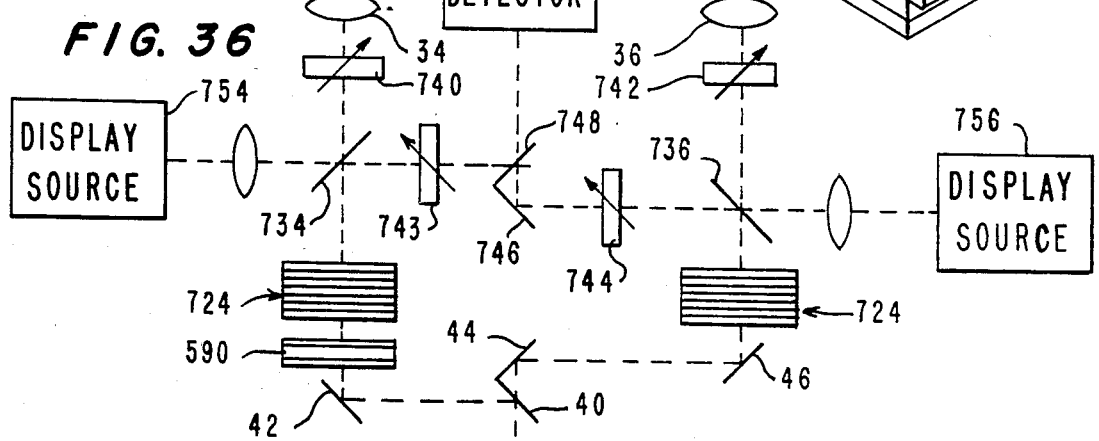
FIG. 36 is a diagram of a variation of the microscope portion of FIG. 29.

A variation of the microscope portion of FIG. 29 is shown in FIG. 36 and includes modified pattern select units 724 disposed in the respective paths of lights from the mirrors 42 and 46 to the oculars 34 and 36. The modified spot generating unit 724, as shown in FIG. 37, is similar to the unit shown in FIG. 33 except that an electronically operated polarization control cell 70 is interposed between polarizer 684 and the upstream cell 682. Referring back to FIG. 36, the units 724 are positioned in the real image planes of the light paths to the oculars 34 and 36 and the phase adjusting unit 590 is positioned in series with one of the light paths. Partial reflectors 734 and 736 are positioned in the respective ocular paths between the unit 724 and the oculars to reflect portions of the light through respective polarizers 743 and 744 and thence to respective reflectors 746 and 748 which combine and reflect the beam portions to the detector 226. Polarizers 740 and 742, having their polarizations crossed relative to the polarizers 743 and 744, are positioned in the output light path for the oculars 34 and 36. Additionally there are shown display sources 754 and 756 which are suitably directed toward the reflectors 734 and 736 for being superimposed on the image viewed through the oculars.

In operation of the variation of FIG. 36, the cells 682 define strip-like image portions which are polarized to be passed by the polarizers 684, and the cells 680 further define second strip-like images crossing the first strip-like images to define intersection spots which are polarized to be passed by the polarizers 742 and 744 which are then combined and applied to the detector 226. When the polarization cells 70 are operated the polarizers 684 pass the images outside of the strips selected by the cells 682 but block the light portions within the strips. The image portions within the strips generated by the cell 680 are blocked by the polarizers 740 and 742 to thus generate respective dark cross hairs in the images viewed through the oculars 34 and 36; thus, the positions of the spots selected in the image for measurement of relative height or relative phase shift can be easily viewed. The polarization control 70 of the unit 74 may be switched at a rate exceeding the visible flicker rate, i.e., about 30 cycles, to thus present a continuous display to the viewer of the cross hair illustrating the position of the selected spots for measuring relative height or phase shift.

Figure 38:
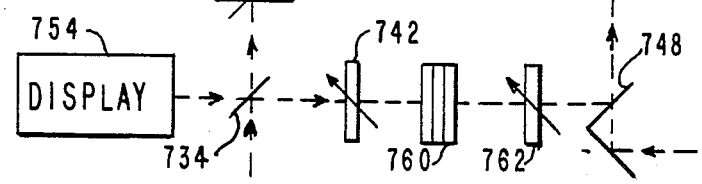
FIG. 38 is a diagram of a modification of the variation of FIG. 36.

A modification of the microscope of FIG. 36 is shown in FIG. 38 and includes a light switch formed by a polar switching cell 760 and polarizer 762 interposed between the polarizer 742 and the reflector 748. Similarly, a light switch (not shown) is interposed between polarizer 744 and the reflector 746. The light switches can be utilized to turn on and off the light to the detector 226 to provide a zero or dark current reference for the detector.

Figure 64:
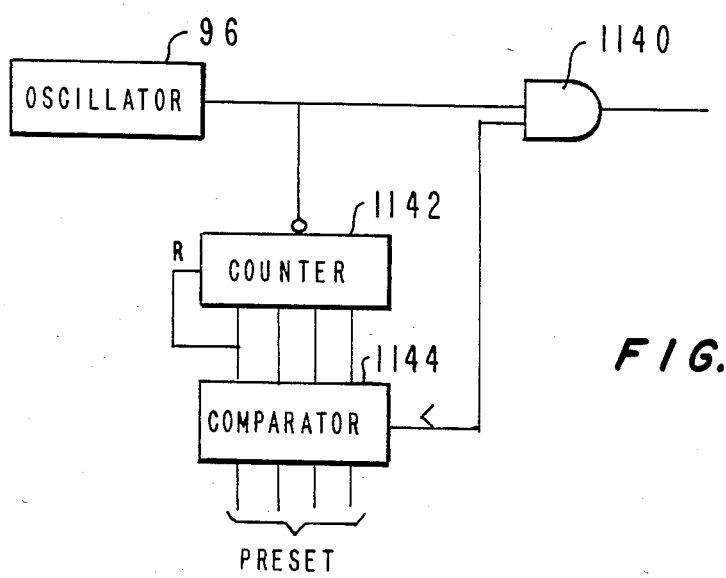
FIG. 64 is a schematic of an electrical circuit modification for controlling light intensity in the control of the invention.

One problem in connection with control of light intensity by variation of the voltage magnitude across an electro-optic material between polarizers or control of current to a light source such as a tungsten filament is that the light is subject to change in spectral content or color upon change in intensity. This can be overcome by the intensity control circuit of FIG. 64 wherein a gate 1140 is in series with the output of the oscillator 96 for producing voltages which are selectively applied across the electro-optic material to produce a variable duty cycle pulsed excitation time for the electro-optic material. The oscillator output is also applied to the input of a counter 1142 which has its outputs connected to a comparator 1144 with preset inputs controlled by a computer, BCD switch, or other device. The less than output of the comparator 1144 is connected to the second input of the gate 1140 so that when the pulses counted by the counter 1142 is less than the preset value, the gate 1140 is enabled to pass pulses. As shown in FIG. 63 for the waveform 1146 of the ouput of the gate 1140, pulses are produced during the time period 1148 while the count in the counter 1142 is less than the preset value. During the time 1150 that the count in the counter 1142 is equal or greater than the preset value, the gate 1140 does not pass the pulse output of the oscillator 96. The waveform 1152 illustrates the light intensity passed by the electro-optic material, and during the period 1154, the electro-optic cell passes full light intensity, while during time period 1156 the electro-optic cell is in its fully off state. It is noted that electro-optic materials generally have on time delays and slightly larger off time delays so that the time periods 1154 and 1156 do not exactly coincide with the time periods 1148 and 1150. As shown by the dashed lines in FIG. 65, the number of pulses passed by the gate 1140 and thus the relative on and off time of the electro-optic cell can be varied by changing the preset value in the comparator 1144. The human eye and many detectors such as video cameras respond closely to changes in light intensity, the response generally being an integral of the light. The response time of a human eye or a light detector is illustrated by time line 1158. Since the integral of the light intensity over the response period changes proportionally with the change in duty cycle, the detector responds the same as if the magnitude of light intensity were changed. The cycle time for the electro-optic cell, i.e. the sum of the times 1154 and 1156, is selected to be less than the detector response time which may be, for example, about 1/30 of a second. Thus, the pulsing of the electro-optic switch does not produce noticable flicker. The light being passed during the on time of the electro-optic cell is white and not altered in spectral content. Thus it is possible to change the apparent light intensity by reducing the pulsed duty cycle of an electro-optic switch without any tendency to introduce coloration or change in spectral content.

Figure 66:
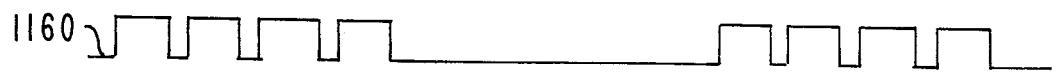
FIG. 66 is a waveform diagram of a waveform response when employing high speed material in the electro-optic cell.

In FIG. 66, there is illustrated the response of an alternative electro-optic material which has a much faster response time than the material having the response 1152. As shown by the waveform 1160, the electro-optic cell then turns on and off in response to each of the pulses from gate 1140. Changing of the count and number of pulses from gate 1140 will produce a corresponding change in the number of pulses on times of the electro-optic switch which produces a corresponding change in the integral of the light passed by the electrically optical switch over the detector response time 1158 in a manner similar to that for the electro-optic response 1152 in FIG. 63.

Figure 67:
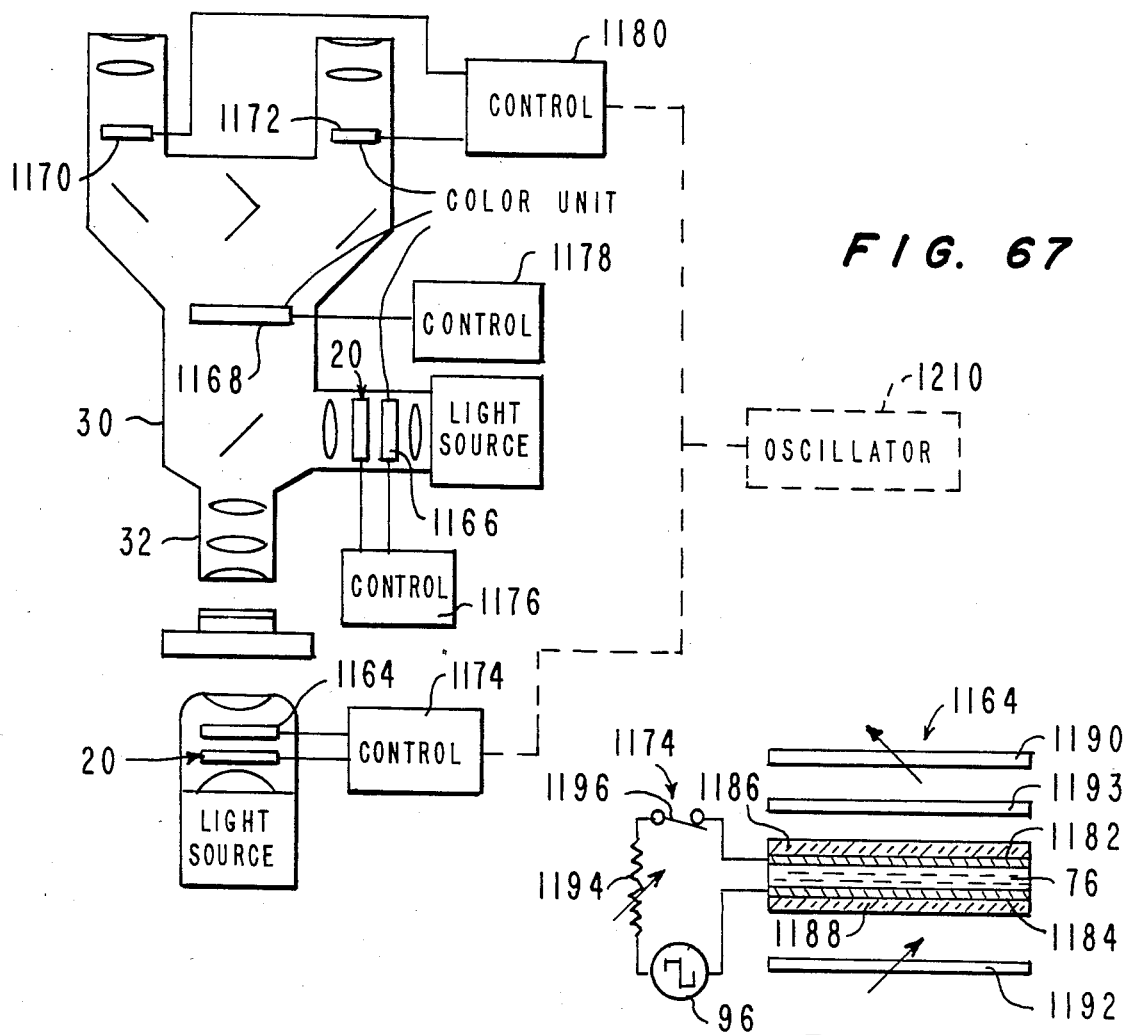
FIG. 67 is a diagram of a microscope including light color controls in accordance with the invention.
Figure 68:
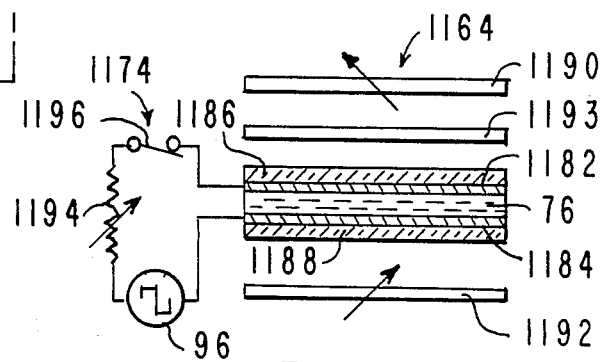
FIG. 68 is a sectional view of a color control cell in the microscope of FIG. 67.

As shown in FIG. 67, a microscope includes color control units, such as color control unit 1164 in the path of substage lighting, unit 1166 in the path of superstage lighting, unit 1168 in the downstream path of light from the microscope objective and units 1170 and 1172 in the respective left and right eye pieces of the microscope. The units 1164, 1168, 1170 and 1172 are operated by respective electrical control circuits 1174, 1176, 1178 and 1180. As shown in FIG. 68, the color control unit 1164 includes a layer of electro-optic material, such as nematic fluid material 76 between transparent electrodes 1182 and 1184 mounted on transparent substrates 1186 and 1188. Crossed polarizers 1190 and 1192 are located on opposite sides of the cell structure. A retarder 1193 is interposed between the analyzer 1190 and the electro-optic cell for increasing the dispersion or the differential between angular rotations of different colored light to enable the analyzer to be more color selective. In a simplified version of the electrical control circuit 1174, the voltage source 96 is connected in series with a variable resistance 1194 and a switch 1196 across the electrodes 1182 and 1184. When the magnitude of the voltage applied across the electrodes 1182 and 1184 is at a normal or selected voltage as determined by the position of the potentiometer 1194, light of one frequency or color of light passing through the polarizer 1192 is rotated through a polarity angle such that is passes through the polarizer 1190. Other frequencies or colors of the light are rotated to different angles by the electro-optic material 76 such that they are substantially blocked by the polarizer 1190. By changing the voltage across the electrodes 1184 and 1186 by means of the potentiometer 1194, the angle of rotation of the polarity of light passing through the electro-optic material 76 is changed so that a different frequency or color of light is now passed through the polarizer 1190. In this manner the color of the light transmitted through the cell 1164 is controlled.

Figure 69:
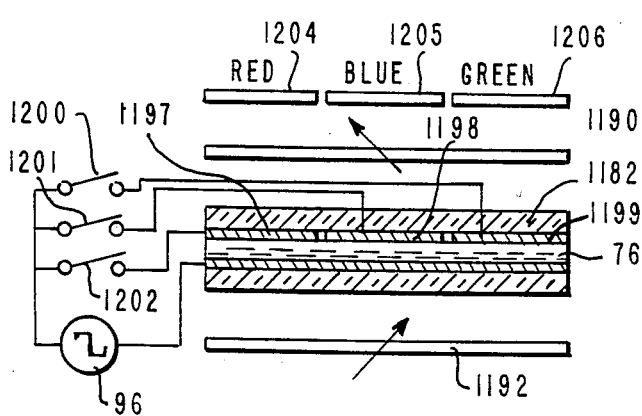
FIG. 69 is a sectional view of an alternative color control cell for the microscope of FIG. 67.

In an alternative color selection unit illustrated in FIG. 69, the electrode 1182 is replaced by three strip electrodes 1197, 1198 and 1199 which are energized by respective switches 1200, 1201 and 1202 from one side of the source 96. Respective red, blue and green color filters 1204, 1205 and 1206 are superimposed over the respective electrodes 1196, 1198 and 1199. The polarizers 1190 and 1192 as well as the electro-optic material 76 are selected to pass white light when the corresponding electrode or electrodes 1197, 1198 and 1199 are energized. When a single electrode 1197, 1198 or 1199 is energized, only that cell passes light through the corresponding red, blue or green filter 1104, 1105 and 1106. The color unit of FIG. 69 has the advantage that white light or other light colors can be generated by operating all three or any two of the cells 1197, 1198 and 1199.

Figure 70:
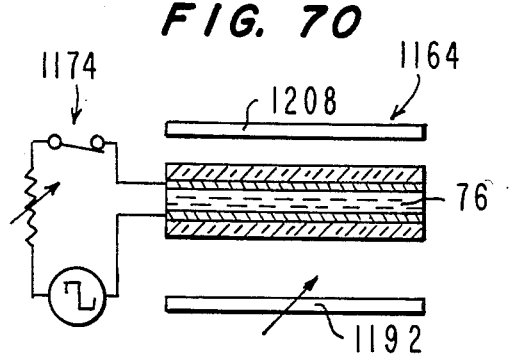
FIG. 70 is a sectional view of another alternative color control cell for the microscope of FIG. 67.

In a color control unit modification shown in FIG. 70, the polarizer 1190 of FIG. 66 is replaced by a commercial variable color polarizer 1208 which passes different colors of light from incident light of different polarity angles. Thus, when the voltage applied across the electrodes 1182 and 1184 is varied to change the rotation of the angle of polarization of light passing through the unit 76, the color of light passed by the variable color polarizer 1208 changes to thus select different frequencies or colors of light.

Figure 65:
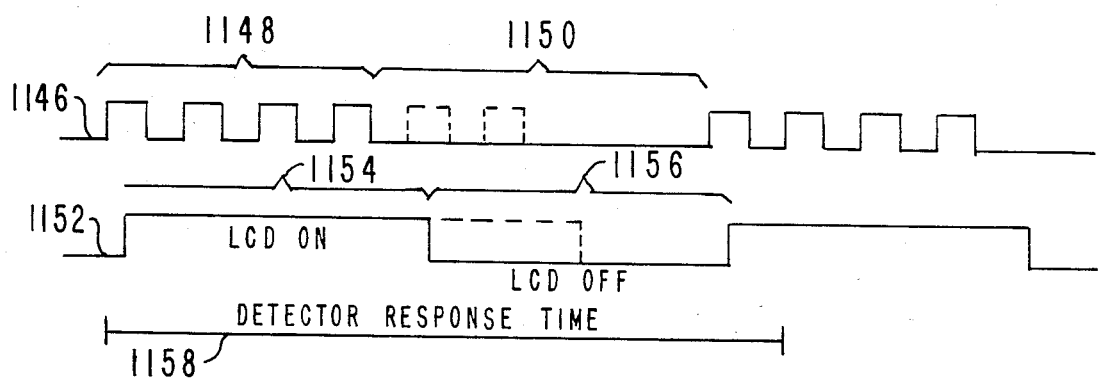
FIG. 65 is a waveform diagram showing output of the circuit of FIG. 64 and associated electro-optic cell response periods.

While a microscope may include the five color control units 1164, 1166, 1168, 1170 and 1172 as shown in FIG. 65, most practical microscopes utilizing electronic color control will include only one, two or three of the color control units wherein the color of the light is controlled. For example, in a microscope used mainly for examining translucent specimens, the microscope would include only one color control unit 1164 in the substage lighting; operation of the cell 1164 can subject the object being examined to varying colors of light to visualize portions thereof which absorb or pass different frequencies of light. Similarly, a microscope with a superstage light control can utilize the color cell 1166 to subject an object to incident light of different colors. A microscope with the color cell 1168 positioned downstream or above the objective 32 can produce similar effects as the cells 1164 and 1166 by passing only the selected color of light. The cells 1170 and 1172 may be operated in a manner similar to the cell 1168 to pass a single or different colors of light. The circuit may also include an oscillator such as that shown in dashed lines 1210 to operate the eye piece color control units 1170 and 1172 in syncronism with operation of one or both of the substage and superstage color controls 1164 and 1166 as well as the pattern control cells 20 to produce stereoscopic or other controlled lighting effects. If the oscillator 1210 is operated above the flicker rate, i.e., 30 Hz, the on and off switching of the color units can be made relatively nondiscernable by the human eye.

In one particular application of the microscope, the light directed to the object, or the light from the object passing through the objective 32 is color filtered to eliminate one color of light therethrough. The object being observed, such as an electronic unit or chip which has a portion which develops a distinctive color during processing, to indicate a condition such as either acceptable or defective manufacture; by subjecting the chip to a selected color of light, or by color filtering the light from the chip, the contrast of the colored area to enable the operator to more clearly identify the acceptable defective chip. Thus the operator or inspector can more readily determine the condition of the object being examined.

It is noted that where appropriate, the pattern cell units themselves may be designed for color selection in accordance with the invention and thus a single pattern control cell 20 may be utilized in place of the separate pattern control cell and color control cell.

In certain applications, it is desirable to utilize nonpolarized light. In such applications, the electro-optical material 76, FIG. 2, may be a liquid crystal or nematic material which is dye-loaded; such known materials can control light passage without use of polarizers. Thus, the polarizers 66 and 68 of FIG. 5 and the polarizers of the other embodiments would be eliminated where such light control device is utilized.

Figure 71:
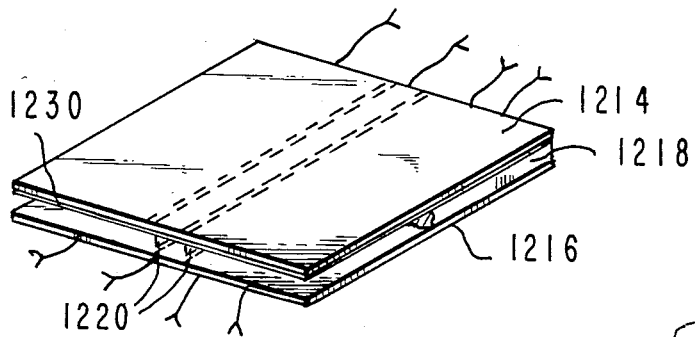
FIG. 71 is a perspective view with portions cut away of an alternative light control which is electrostatically operated.
Figure 72:
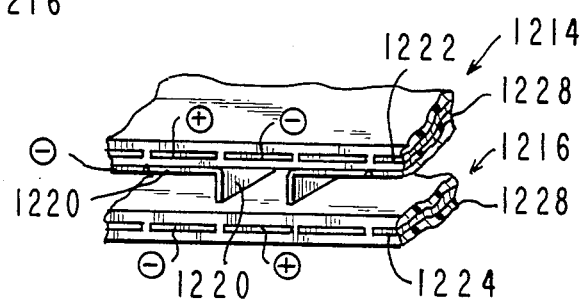
FIG. 72 is an enlarged perspective view of a broken-away portion of the light control switch of FIG. 71.

Further, in some applications it is desirable to avoid attenuation of the light which is produced by the electro-optic cells utilizing liquid crystal or nematic and other electrically-controlled birefringent materials. Light control cells which operate by control of polarized light can at a maximum pass about 40% of the incident nonpolarized light due to the polarization and other losses. An electrostatic switch, as shown in FIGS. 71 and 72, includes a pair of parallel electrode structures 1214 and 1216 which are mounted in spaced relationship by a spacer 1218. Conductive opaque hinged flaps 1220 are mounted between the electrode structures 1214 and 1218 at hinge points to one of the electrode structure for being pivoted between open and closed positions. As shown in FIG. 72, the electrode structures 1214 and 1216 are formed by parallel superimposed arrays of transparent strip conductors 1222 and 1224 sandwiched between transparent layers 1228 of transparent plastic. The opaque flaps 1220 may be formed of a metal-coated flexible plastic material or a carbon-filled plastic material suitable for receiving an electrical charge and for being opened and closed a large number of times without breaking or failure. The flaps 1220 run longitudinally between respective pairs of the electrodes 1222 and 1224. Preferably the flaps 1220 have relatively narrow widths and can be arranged with two or more flaps between each pair of electrodes. Facilities for applying voltages to the individual electrodes 1222 and 1224 and to the flaps 1220 such as by a common connecting border 1230 are illustrated by the connector symbols in FIG. 71 and the circled charge signs in FIG. 72. As noted in FIG. 72, the flaps 1220 may be charged negatively with the upper electrodes 1222 being positive and the lower electrodes 1224 being negative to force the flaps 1220 to a closed position preventing passage of light. The negative charge on the flaps 1220 will cause the flaps to be attracted to the upper electrodes 1222 and repelled by the lower electrodes 1224 to pivot the flaps 1220 upward against the bottom of the upper electrode structure 1214 to close the flaps. When the voltages on one or more selected pairs of superimposed electrodes 1222 and 1224 is reversed, the flaps 1220 therebetween will now be repelled by the negative charge on the upper electrode 1222 and attracted by the positive charge on the corresponding lower electrode 1224 to pivot the flap or flaps 1220 downward causing the opening of a window permitting light to pass through the corresponding window in the cell.

Figure 73:
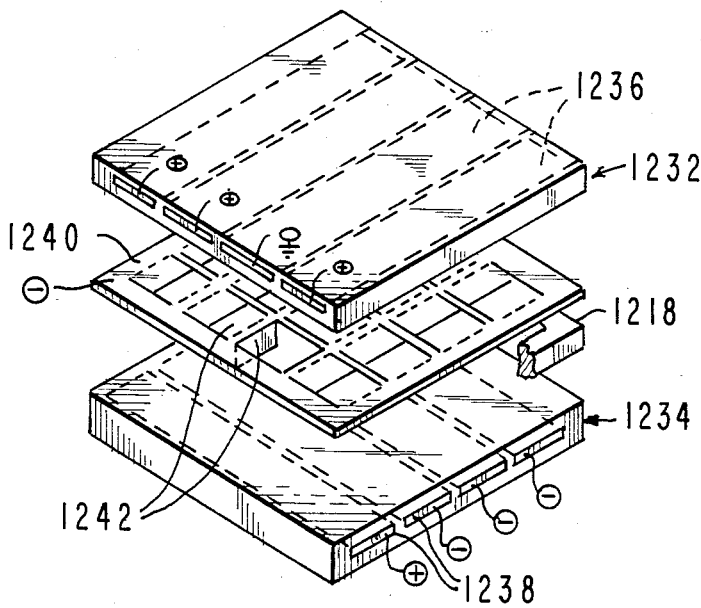
FIG. 73 is a perspective exploded view of another variation of the electrostatic light control.
Figure 74:
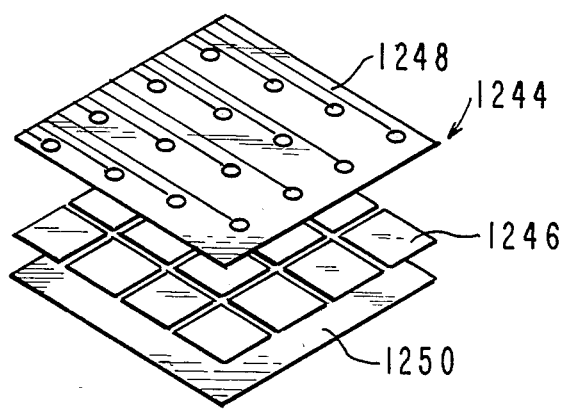
FIG. 74 is a perspective exploded view of a modified electrode structure for the electrostatic light control of FIG. 73.

In a modification of the electrostatic light control as illustrated in FIG. 73, upper and lower electrode assemblies 1232 and 1234 have respective parallel arrays of electrodes 1236 and 1238 wherein the electrodes 1236 are orthogontal with respect to the electrodes 1238. A conductor sheet 1240 mounted on the underside of the upper electrode assembly 1232 has hinged flaps 1242 therein forming windows between intersections of the electrodes 1236 and 1238. Similar to the light control of FIGS. 71 and 72, the flaps 1242 are charged negatively, and when the upper electrodes 1236 are charged positive and the lower electrodes 1238 are charged negative, the flaps 1242 are held in a closed position by the electrostatic forces between the flaps and the electrodes. Application of a ground potential to a selected upper electrode 1236 and a positive charge to a lower electrode 1238 results in the flaps 1242 at the intersection of the selected upper and lower electrodes being forced downward into an open position to open the corresponding window and pass light therethrough. The structure of FIG. 73 with orthogontally-arranged electrodes is generally limited to operation of a single window, a row of windows, or limited combinations of 4, 6, 8, windows at one time since application of operating voltages to two or more electrodes in both the upper and lower arrays will result in operation of the windows at each intersection of the operated electrodes. For example, selection of two upper electrodes 1236 and two lower electrodes 1234 will result in four of the windows formed by flaps 1242 being operated. In an electrode assembly variation 1244 shown in FIG. 74 the transparent conductive electrodes 1246 occupy small areas or spots corresponding to each of the windows formed by the flaps 1242. Electrical connections are provided to each of the electrodes by throughhole connections in an upper transparent plastic sheet from transparent conductor patterns deposited on top of the sheet. The electrodes 1246 are embedded between the upper sheet 1248 and a lower sheet 1250. When electrode assemblies 1244 are substituted for the assemblies 1232 and 1234 (the lower electrode being inverted from FIG. 27) any combination of the electrodes 1246 may be energized to open windows formed by the flaps 1242 of FIG. 73.

Figure 75:
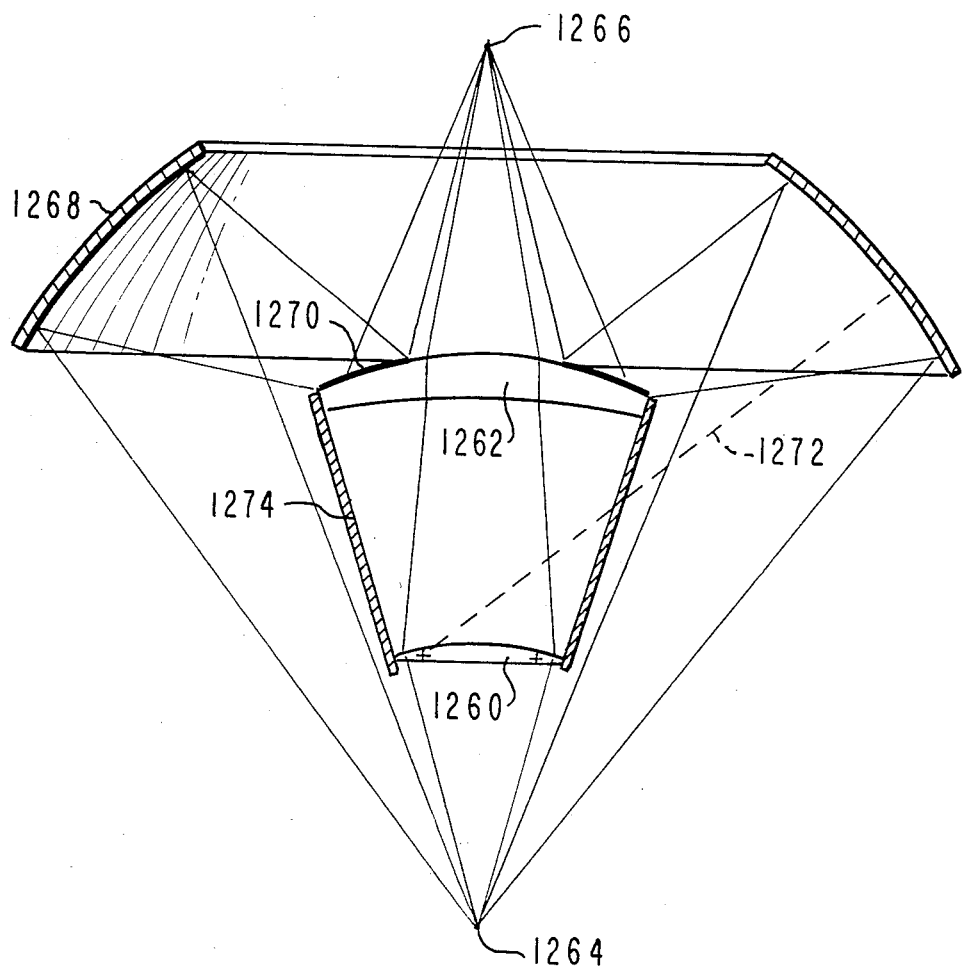
FIG. 75 is a sectional view of a lens-reflector system for use in devices in accordance with the invention.

Conventional lens systems for microscopes, cameras, and other applications are generally limited in working distance and/or numerical aperature. For example, high necessary magnification objectives for microscopes generally require relatively short working distances in order to obtain the magnification. Substitution of larger lenses to increase working distance introduces increasing degrees of lens aberrations. Reflector systems can produce high performance in compactness, but suffer from a substantial loss of light due to the secondary mirror. A combination lens-reflector system is shown in FIG. 75 wherein the losses associated with the secondary mirror are substantially overcome by the inclusion of a co-focal lens system. The system includes a lens system formed by lens 1260 and 1262 which focus an inner cone of rays from an object point 1264 to an image point 1266. Co-focal with the lens system is a mirror system including primarily annular mirror surface 1268 and a secondary annular mirror surface 1270 which focus a hollow outer cone of rays from the object point 1264 to the image point 1266. The secondary mirror 1270 is formed on the outer annular portion of the rear or downstream face of the lens 1262 leaving the center portion free to pass light from lens 1260. The primary mirror 1268 has a reflecting curvature which is selected to produce converging rays at the surface of mirror 1270 which, when reflected from the surface 1270 have the same magnitude of convergence and are co-focal with the light rays emerging from the center portion of the lens 1262. The radius of curvature of the primary mirror 1268 is shown by dashed line 1272 which extends from a circle of revolution. It is noted that by providing the apparent image point of the mirror 1268 at the central axis of the lens system (by providing the proper reflecting curvature to the mirror 1270) the radius 1272 can be made to have its center on the axis of the lens system so that the mirror surface 1268 is spherical. This combination lens-mirror system has the advantage that loss of light due to the secondary mirror is substantially eliminated. The only light lost can be attributed to the lens mounting annulus 1274 which greatly reduces the losses which are normally associated with the secondary mirror blocking the path of light through the center of the cone of rays from the object. Thus, there is made possible an objective system, or other lens system associated with microscopes, cameras, or telescopes which provides greatly improved working distance and numerical aperature.

Figure 76:
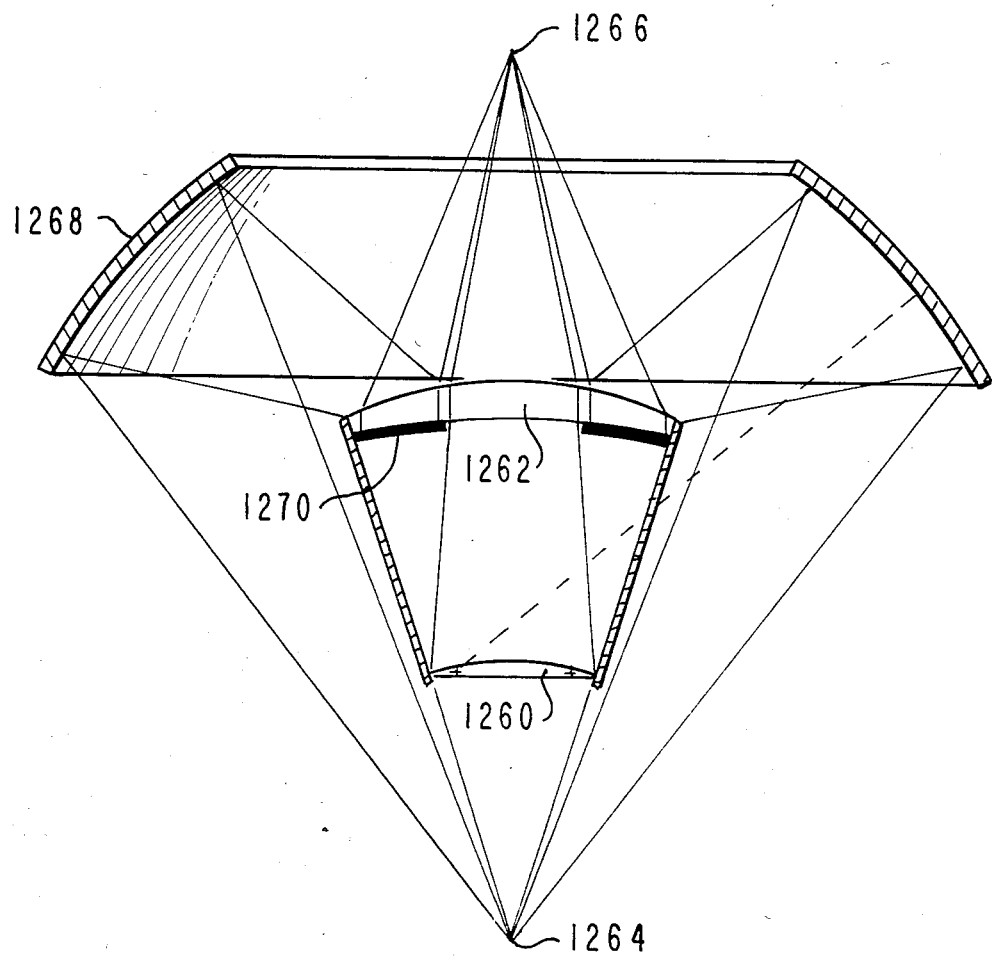
FIG. 76 is a sectional view of a variation of the lens-reflector system of FIG. 75.

In a variation of the lens-mirror system shown in FIG. 76, the secondary mirror 1270 is formed on the outer annular portion of the front or upstream surface of the lens 1262. The reflecting curvature of mirrors 1268 and 1270 in FIG. 76 must also account to refraction that occurs in the lens 1262 of the outer hollow cone of light rays.

Figure 77:
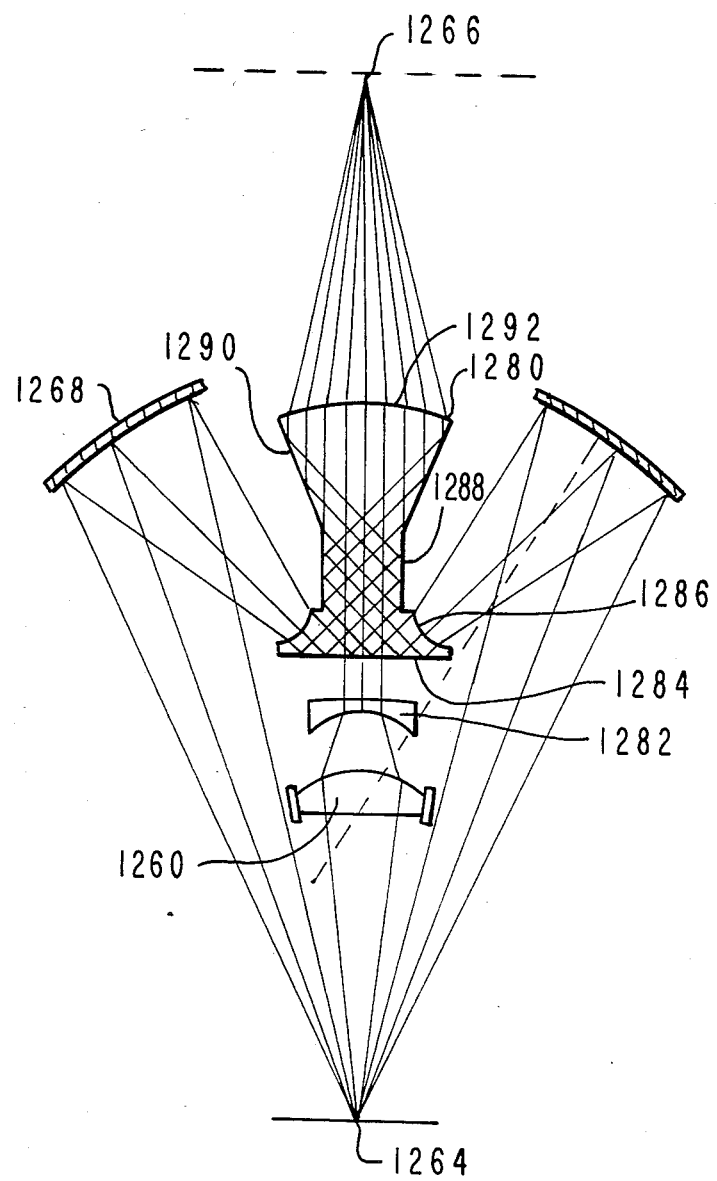
FIG. 77 is a sectional view of another variation of the lens-reflector system.

In a further variation of the lens-mirror system in FIG. 77, the secondary mirror is replaced by a combining lens 1280 which utilizes total internal reflection to recombine the outer hollow cone of rays from the primary mirror 1268 co-focal with the inner core of rays. In the illustrated system the center cone of rays converged by the leading lens 1260 are converted to parallel rays by the diverging lens 1282 so that the center cone of rays enter as parallel rays in the flat leading surface 1284 of the combining lens 1280. The converging rays from the primary mirror 1268 are refracted at annular concave lens surface 1286 of the combining mirror 1280 into parallel rays which are then reflected by total internal reflection at the surface 1282, at cylindrical surface 1288 and at diverging conical surface 1290 to properly orient and produce parallelism of the outer rays co-focal with the internal rays from lenses 1282 and 1260. The forward refracting surface 1280 then brings about the convergence of the inner and outer rays at the image point 1266. The lens-mirror system of FIG. 77 has the advantage that internal reflection of the combining lens 1280 upon flat, cylindrical and conical surfaces replaces the secondary mirror of the embodiments of FIGS. 75 and 76.

Figure 78:
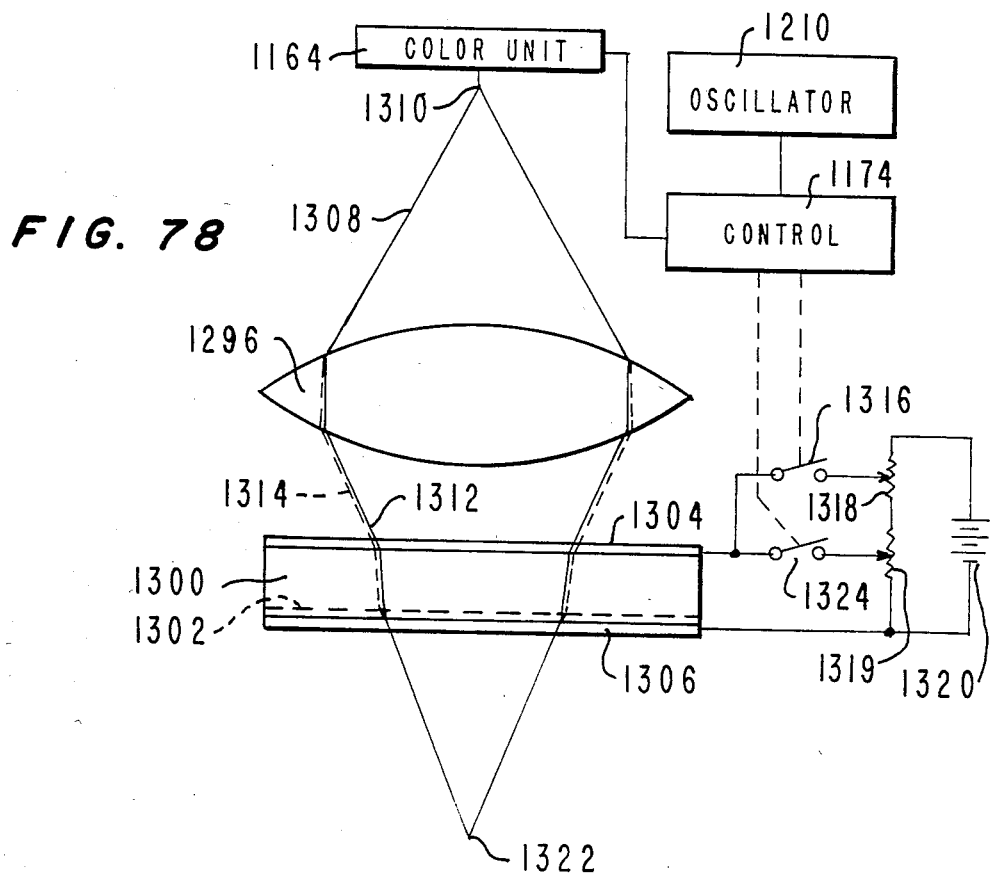
FIG. 78 is a sectional view of an electronic focus control in accordance with the invention.

In microscopes, cameras, and other devices wherein refractive lens are utilized to focus light rays from objects and/or images to present an image suitable for viewing or electronic reproduction, the lens system must include facilities for correcting color aberrations when the light covers a broad frequency spectrum since the different frequencies of light will be refracted differently. In FIG. 78 there is illustrated a system for being utilized in conjunction with the color control system of FIG. 67 for compensating for color aberrations wherein the microscope or camera lens system such as an objective lens is illustrated by a single lens 1296; in practical applications the lens system 1296 will be a conventional compound lens system designed to correct for spherical aberrations or other nonchromatic aberrations as desired by the designer. A piezo-electric plate 1300 is cut so as to change its physical thickness, as illustrated by the dashed line 1302, when energized by a voltage applied across transparent electrodes 1304 and 1306 on opposite sides of the plate 1300. The plate 1300 is placed normal to either a converging or diverging cone of rays; as shown in FIG. 78 the plate is placed in a converging cone of rays from the object. A ray of light 1308 containing both red and blue light from object point 1310 impinges upon the lens system 1296, and the blue portion of the light ray represented by solid line 1312 is refracted more than the red portion of the light ray illustrated by the dashed line 1314 so that the red and blue portions of the light from point 1310 will not focus at the same image point. However, if a voltage is applied across the electrodes 1304 and 1306, such as by closing switch 1316 to apply a voltage from voltage divider 1318 and source 1320, the thickness of the piezo-electro plate 1300 is changed. It is seen that when the piezo-electro crystal is in its thinner state as shown by the dashed line 1302, the red rays 1314 will focus at the same image point 1322 as the blue rays 1312 when the plate 1300 is in its thicker state as shown by the solid lines. In a similar manner switch 1324 may be operated to apply a different voltage from voltage divider 1319 to the electrode 1304 and provide for compensation for a different color, such as green. The control 1174, is sequentially operated by the oscillator 1210 to control color unit 1164 to produce successive blue, green and red colors impinging upon object 1310, and operates the switches 1316 and 1324 in synchronism with the color unit 1164 so that the successive blue, green and red images are all co-focal at point 1322. The cycling of the control 1174 to present the different colors can occur at a rate above the flicker rate where employed in a microscope for viewing by the human eye, or the switching of the colors may be synchronized with successive scans, or selected numbers of scans of a television camera to produce successive frames of electronic video signal which contains information on the respective color images. By electronically changing focal lengths in correspondence with the sucessive colors of illumination, a substantial improvement can be made in the clarity and sharpness of the resulting color image.

Figure 79:
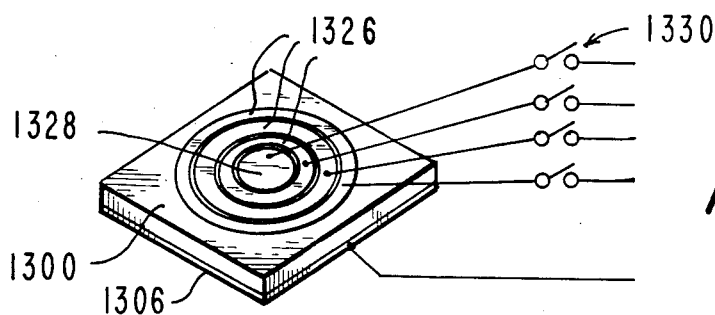
FIG. 79 is a perspective view of a variation of the focus control of FIG. 78.
Figure 80:
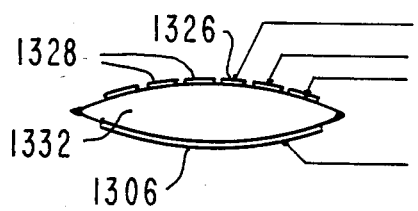
FIG. 80 is a sectional view of still another focus control variation.

In a variation illustrated in FIG. 79, concentric annular electrodes 1326 surrounding a central circular electrode 1328 replace the upper electrode 1304 on the piezo-electric plate 1300. These electrodes 1326 and 1328 may be selectively energized by switches 1330 from variable selective voltage sources (not shown) to compensate for chromatic, spherical, coma, and other aberrations. As shown in the variation of FIG. 80, the piezo-electric element may be in the form of a lens 1332 with electrodes applied to opposite surfaces thereof. As an alternative to the piezo-electric element, there may be employed a material exhibiting different indexes of refraction with different electric or magnetic field without changing size.

The light control system of the invention is described above mainly in application with microscopes wherein images, magnified from 10 to 2,000 times from the object, are viewed by human eyes through eyepieces. However, the light control system is equally applicable to other viewing systems where the images is viewed by a video camera, by an array of light detectors, by a single or plurality of light detectors. Also the image need not be magnified but can be reduced or the same size as the object.

Figure 81:
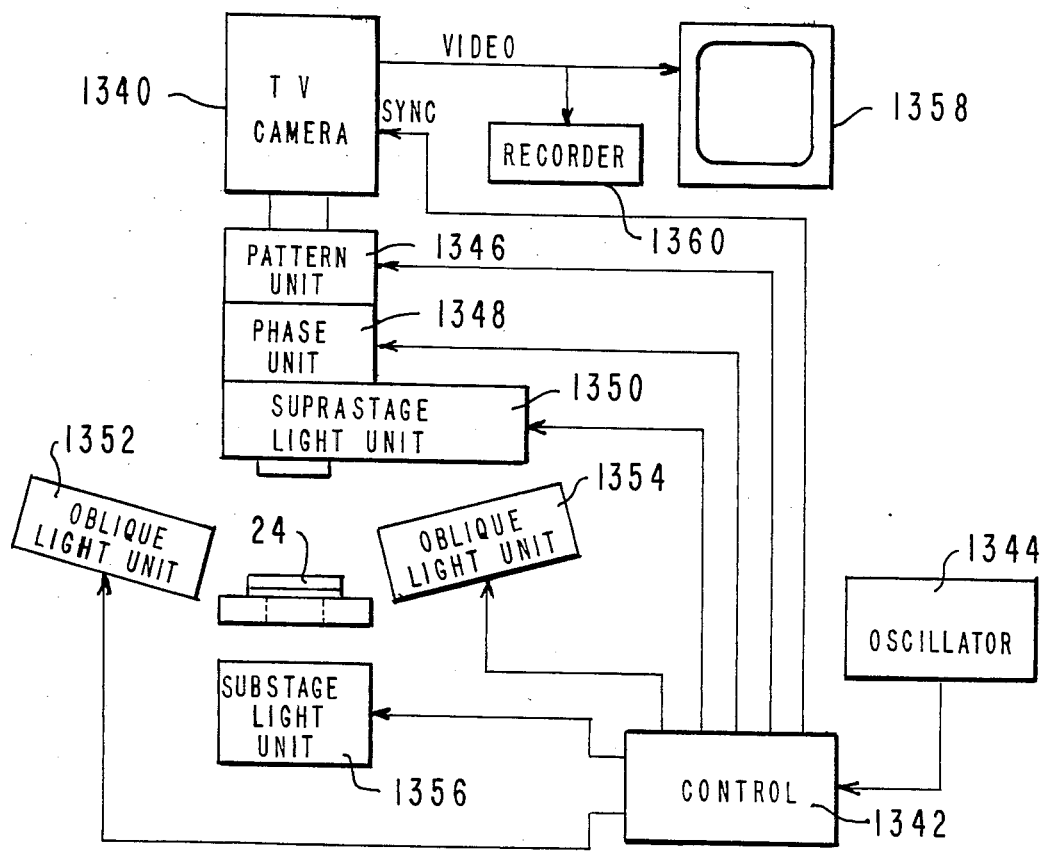
FIG. 81 is block diagram of a video camera system employing a composite electrically controlled illumination system in accordance with the invention.

Utilization of the electronic illumination control with an electronic image or light detector such as a video camera 1340, is illustrated in FIG. 81. The composite arrangement of FIG. 81 illustrates that all of the variations and modifications of illumination control described above in connection with a microscope are generally applicable to video systems or systems wherein an electronic signal is generated indicative of the object being viewed. The video system of FIG. 81 includes an electronic control 1342 responsive to an oscillator 1344 to control the sync of the camera 1340 and to control a pattern unit 1346, a phase unit 1348, a suprastage light unit 1350, oblique light units 1352 and 1354, and a substage light unit 1356. In a practical system, less than all of the units 1346, 1348, 1350, 1352, 1354 and 1356 can be employed, and additional units such as additional oblique light units from still additional angles can be added. One or both of the pattern and phase units 1346 and 1348 are positioned in the diffraction plane and utilized in a manner similar to that described above in connection with the microscope to produce phase contrast, and/or to select or filter spacial frequencies. Alternatively the pattern unit 1346 and/or phase unit 1348, or additional units, can be positioned at the real image plane for use in measuring relative heights between separate portions of the object, or in measuring relative phase shift or refraction between separate portions of the object 24. The suprastage light unit 1350, oblique light unit 1352, oblique light unit 1354 and substage light unit 1356 may be selectively operated to produce dark field lighting, bright field lighting, and lighting from different selected angles. Additional oblique light units similar to the units 1352 and 1354 may be utilized to provide additional oblique lighting angles. The video output of the television camera may be used to display a picture on a monitor 1358, and the images can be recorded on a recorder 1360 for subsequent use.

Figure 82:
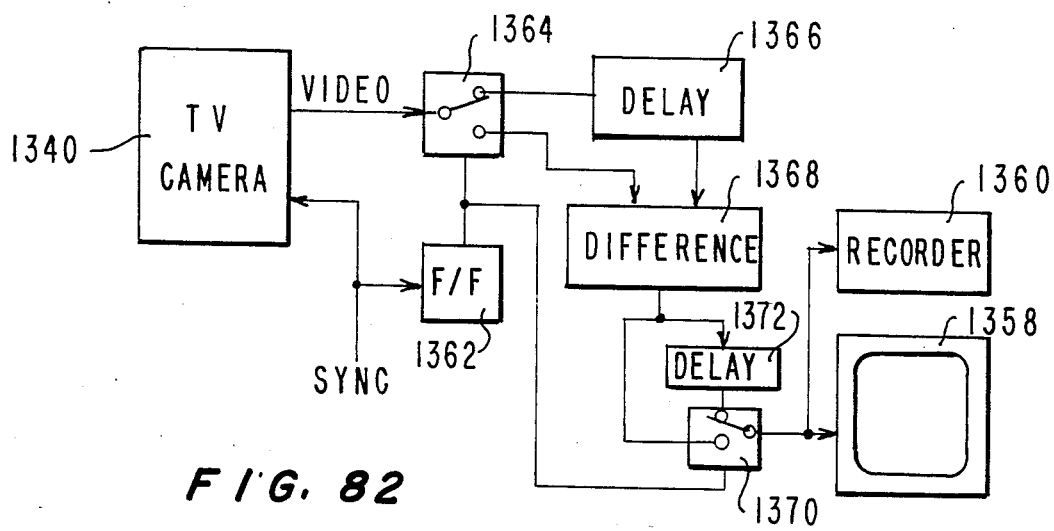
FIG. 82 is block diagram of an electronic circuit for differentiating successive electronic video signals in a modification of the system of FIG. 81.

In a modification shown in FIG. 82, successive frames in the video signal output, which correspond to alternately switched lighting conditions, are differentiated to obtain a video signal containing the difference in the images under the different lighting conditions for display on the monitor 1358. In this circuit the horizontal sync signal operates a flip-flop 1362 which in turn operates a double throw, analog electronic switch 1364 to apply the video output of the camera 34 during successive scans to a delay circuit 1366 and a difference circuit 1368 wherein the output of the delay circuit 1366 is applied to the difference circuit 1368. The delay 1366 is set to correspond to the time between the successive scans so that the difference circuit 1368 generates an output corresponding to the difference between the successive video frames. Successive frames of the output difference signal can be regenerated by double throw switch 1370 operated in synchronism with the switch 1364 for alternately applying the output of the difference circuit 1368 and a delayed output, delayed by delay circuit 1372 corresponding to the time between scans, to generate the successive scans in the video signal applied to the monitor 1358 and the recorder 1360. One or more of the units 1346, 1348, 1350, 1352, 1354 and 1356 can be operated during the alternate successive scans to produce differential images indicating differences in the images produced by different angles of illumination by different polarities of illumination, different phases of illumination, different colors of illumination, different phase changes of portions of the illumination, or different patterns of operation of the phase of illumination.

Figure 83:
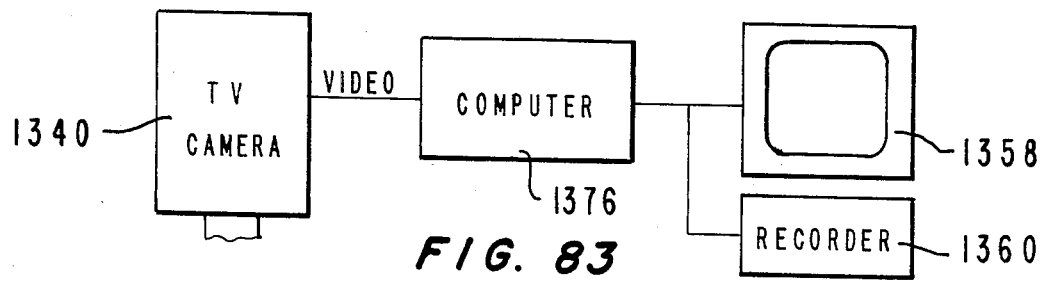
FIG. 83 is a block diagram of another modification of the system of FIG. 81.

In a variation illustrated in FIG. 83, a computer 1376 samples and processes the video signal from the television camera 1340 and displays processed video signals on monitor 1358. The computer 1376 is programmed to form differential images by digital techniques from successive frames of the video signal from television camera 1340.

Figure 84:
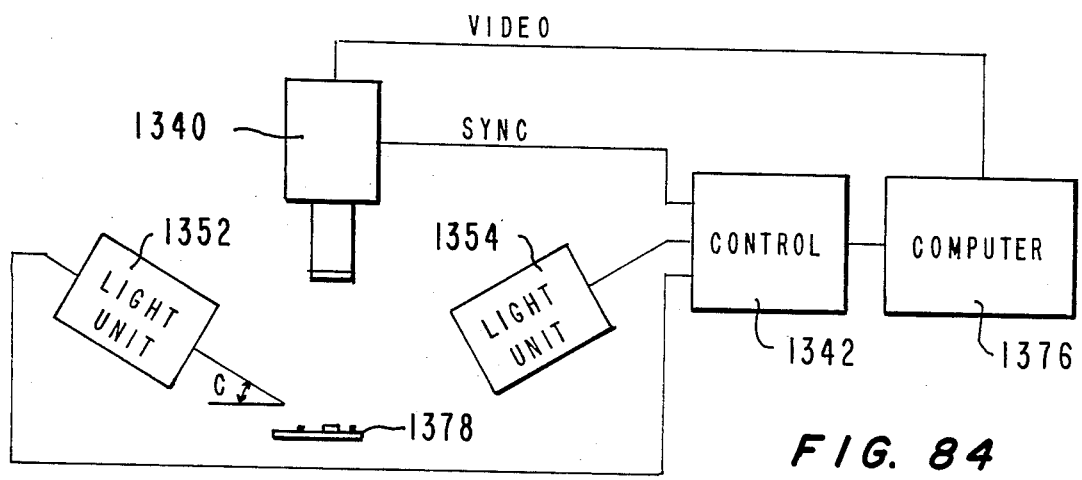
FIG. 84 is a block diagram illustrating one application of the video system of FIGS. 81 and 83.
Figure 85:
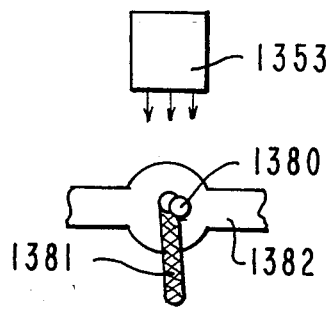
FIG. 85 is an illustration of a portion of an object illuminated by a first light unit in a system in accordance with FIG. 84.
Figure 86:
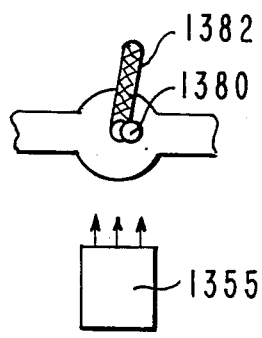
FIG. 86 is an illustration similar to FIG. 85 but with illumination from a second light unit.
Figure 87:
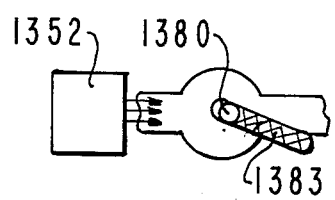
FIG. 87 is an illustration similar to FIG. 85 but with illumination from a third light unit.
Figure 88:
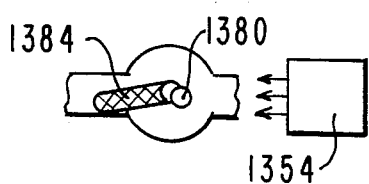
FIG. 88 is an illustration similar to FIG. 85 but with illumination from a fourth light unit.
Figure 89:
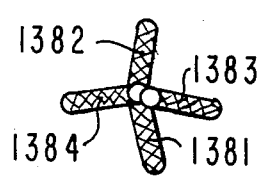
FIG. 89 is an illustration of a differential image formed by the system of FIG. 84 from successive electronic video images taken during the respective illumination conditions of FIGS. 85, 86, 87 and 88.
Figure 90:
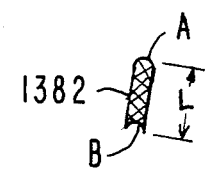
FIG. 90 is an illustration of another possible differential image of the object of FIGS. 85-88.

One particular application of the electronic illumination control employing oblique light units 1352 and 1354 to illuminate an object such as a printed circuit board 1378 is shown in FIG. 84. The use of alternate light units wherein at least one of the units is oblique, produces differential images which contain information regarding the height of the structures of the object in addition to the normal two-dimensional information concerning width and length of structure in the object being viewed. For example, as shown in FIGS. 85, 86, 87 and 88, the printed circuit board 1378 includes a lead 1380 which projects upward from a hole through a conductor 1382 on the circuit board. In this example, four oblique light units 1353, 1355, 1352 and 1354, directed from respective four sides of the object, are sequentially turned off and on to illuminate the circuit board 1378. The light units 1353, 1355, 1352 and 1354 produce collimated light and either contain respective light switches to turn the light on and off, or the light sources themselves may be turned off and on by the control 1342. Successive operation of the light units 1353, 1355, 1352 and 1354 results in respective shadows 1381, 1382, 1383 and 1384 being cast by the projecting lead 1380. The computer 1374, from stored digital representations of the images generated by the successive oblique illumination, can form a differential image wherein only one or more the shadows 1381, 1382, 1383 and 1384 are displayed, see FIGS. 89 and 90. The remaining structural or pictorial detail which appears the same in the images of FIGS. 85-88 is eliminated. From the differential image, the computer can calculate the height of the lead 1380. For example the coordinate points XA and YA of end point A and the coordinate points XB and YB of end point B of one of the shadows can be determined, and these end point coordinates can be used to calculate the length L of the shadow wherein $L = (XA - XB)^2 + (YA - YB)^2$. The height H of the lead 1380 is then given by L tan C wherein C is the angle of illumination. As shown in FIG. 90 the measurement of the points A and B are best made by taking a first frame with two or more of the light units on and then taking the difference with the exposure in FIG. 86. In another possible alternative, a differential image containing two of the shadows 1381-1384 can be used to determine the height of the lead 1380 where the height and distance between the light sources are known. The distance between the two distal end points of the pair of images is determined in the manner similarly determined in the length of a single shadow length, and then the height of the lead will be equal to the height of the light sources times the ratio of the distance between the end points to the distance between the light sources.

Figure 91:
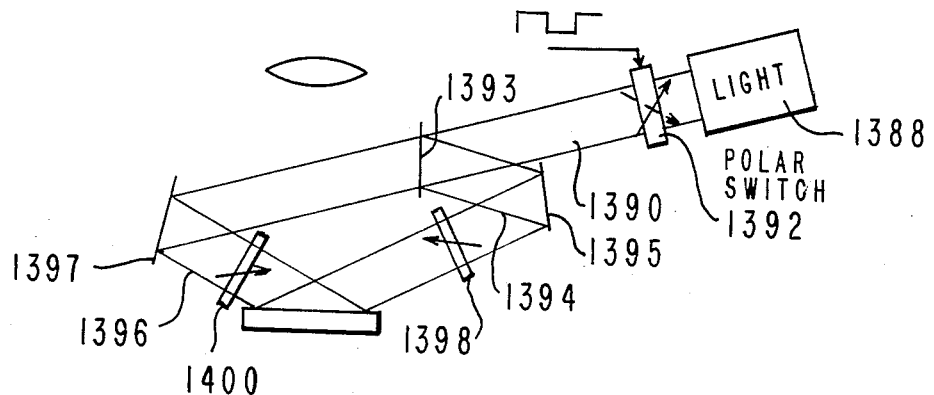
FIG. 91 is a diagram of variations of the oblique-illumination of an object in the illustrated microscope or camera system.

As shown in FIG. 91, a variation of the electrically-controlled illumination system for illuminating an object from different oblique angles includes a single light source 1388 producing a light beam 1390 which passes through an electrically-controlled polarity switch 1392 to a beam splitter or half silvered mirror 1393 which divides the beam 1390 into separate beams 1394 and 1396. These separate beams 1394 and 1396 are then reflected by mirrors 1395 and 1397 into paths directed at oblique angles from different directions at the object to be illuminated. Polarizers 1398 and 1400 are interposed in the paths of the light beams 1394 and 1396 for alternately blocking and passing light in accordance with the alternate operation of the polarity switch 1392. In operation of the electrically-controlled illumination system of FIG. 91, an alternating voltage signal is applied to the polar switch 1392 to alternately switch the polarity of light in beam 1390 so as to alternately pass light beams through polarizers 1398 and 1400 to thus alternately illuminate the object at oblique angles from different directions. Viewing of the alternately illuminated object can be utilized by a microscope system for pseudo-stereoscopic viewing or can be utilized by a video camera system for determining three-dimensional information about the object.

Figure 92:
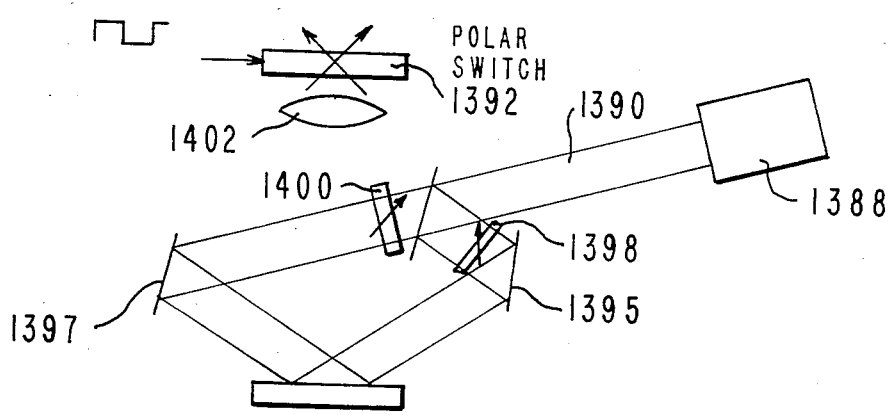
FIG. 92 is a diagram similar to FIG. 91 of another variation of the oblique illumination.

In a variation shown in FIG. 92 of the electrically-controlled illumination system of FIG. 91, the polarity switch 1392 is positioned in the path of light through the objective 1402. In this variation the differently polarized light in the light beams 1394 and 1396 continuously illuminates the object. The alternate operation of the polarity switch 1392 alternately passes the respective polarized light to the microscope eye pieces or video camera.

Figure 93:
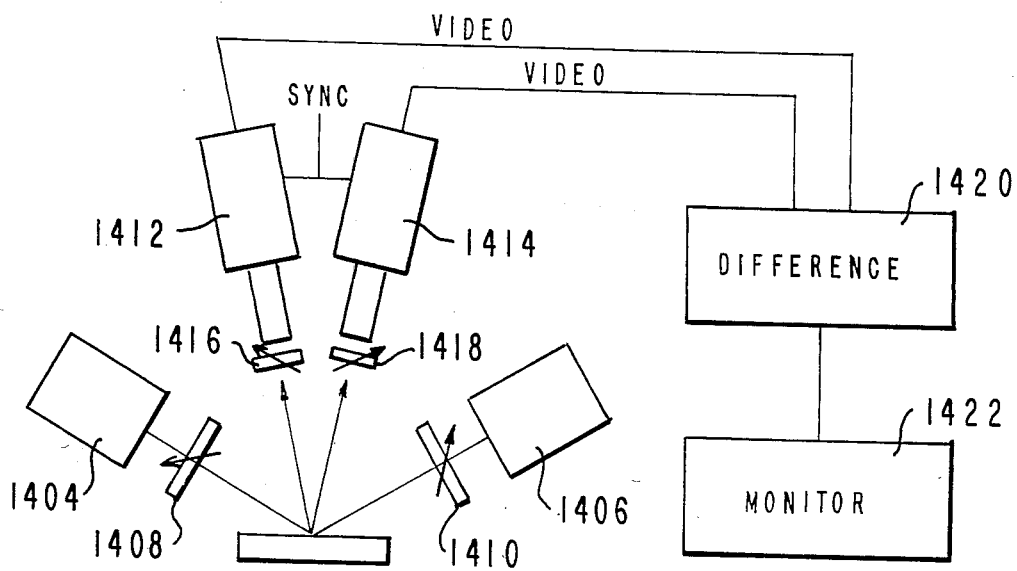
FIG. 93 is a diagram of still another variation of the differentiating circuit for video signals for a modified illumination system.

A further variation of the video camera system for forming differential electronic images is illustrated in FIG. 93 wherein light from light sources 1404 and 1406 is directed through respective differently oriented polarizers 1408 and 1410 at oblique angles from respective different directions onto the object being illuminated. A pair of video cameras 1412 and 1414 are positioned for viewing the object. Respective polarizers 1416 and 1418 are positioned in front of the objectives of the cameras 1412 and 1414 for passing light from the respective polarizers 1408 and 1410. The cameras 1412 and 1414 are operated in synchronism and their video signals are applied to a difference circuit 1420 which produces a differential video image signal applied to the monitor 1422. The relative viewing angles of the cameras 1412 and 1414 can be adjusted to produce varying effects on the differential image.

Figure 94:
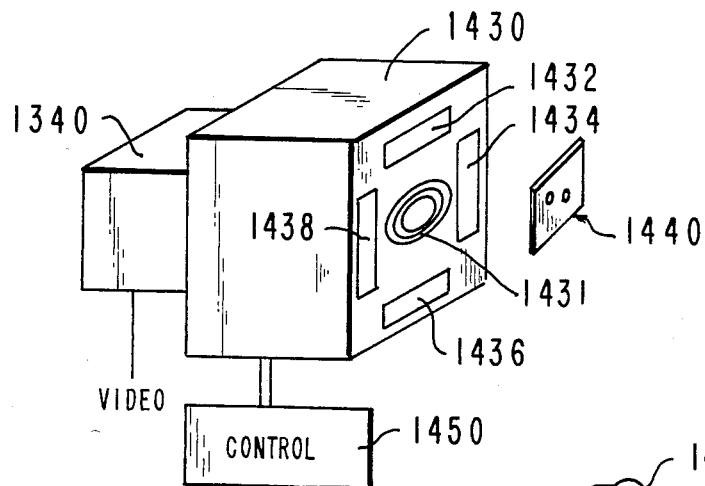
FIG. 94 is a perspective view of a video camera with an electronic illumination system in accordance with the invention.
Figure 95:
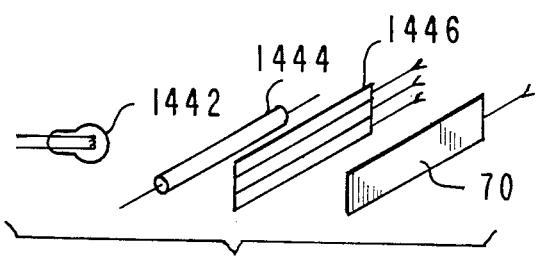
FIG. 95 is a diagrammatic exploded prospective view of an illumination module in the illumination system of FIG. 94.
Figure 96:
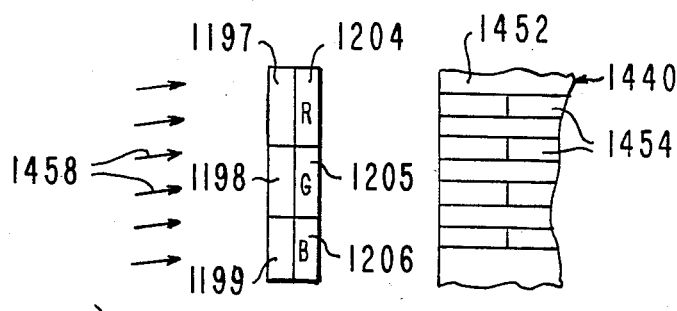
FIG. 96 is a sketch showing illumination of an object by electronic spectrum control.

In a variation of an illumination control for a camera, illustrated in FIG. 94, a housing 1430 is designed to receive the camera 1340 with the objective of the camera 1340 exposed through a central opening in the face of the housing 1430. Conveniently the housing 1430 may be suitably mounted on the housing of the camera 1340. Four light control modules 1432, 1434, 1436 and 1438 are mounted in the housing 1430 and are disposed in respective quadrants around the opening 1431 for illuminating an object, such as a printed circuit board 1440 from respective oblique angles for viewing by the camera 1340. Each of the modules contain, as shown in FIG. 95, a tungsten or tungsten halogen lamp 1442, a strobe or flash lamp 1444, a color control cell 1446, and a polarity control cell 70. The color control cell 1446 may be of any type such as those shown in FIGS. 68, 69, and 70; but the illustrated preferred cell, as shown in FIG. 96 includes an electro-optic cell with three electrodes 1197, 1198 and 1199 defining corresponding electro-optic shutters with respective red, green and blue filters 1204, 1205 and 1206. An electrical control 1450 selectively operates the lamps 1442, 1444 and the cells 1446 and 70 in the modules 1432, 1434, 1436 and 1438. The control 1440 may be simple switching circuitry, or may be timing circuitry and/or computerized circuitry for selectively operating the modules.

In alternative embodiments the color control unit 1446 can have additional frequency band pass filters, or can have band pass filters for non-visible frequencies such as infrared or ultraviolet light where the camera 1340 is sensitive to such radiation. The modules 1432, 1434, 1436 and 1438 may be selectively operated to illuminate the object 1440 with differential oblique illuminations suitable for displaying three-dimensional aspects of the object or one or more of the modules may be operated simultaneously to illuminate the object 1440 with different colors and/or polarities of light.

Figure 97:
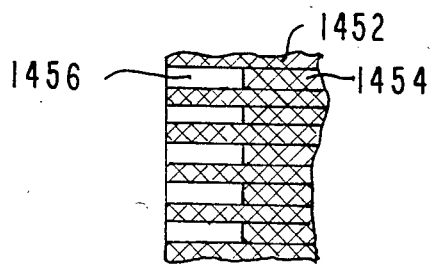
FIG. 97 is a representation of an image of the object of FIG. 96 illuminated with light of one spectral content.
Figure 98:
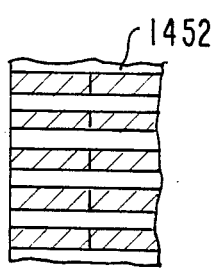
FIG. 98 is a representation similar to FIG. 97 but with the object illuminated with light of a second spectral content.
Figure 99:
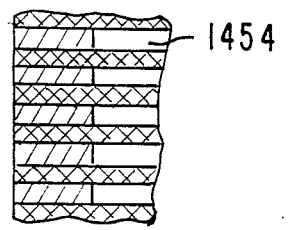
FIG. 99 is a representation similar to FIGS. 97 and 98 but with the object illuminated with light of a third spectral content.

One possible application for the use of different colors or other spectral frequencies of light, for illumination is illustrated in FIGS. 96-99. In this application it is seen that the object 1440 includes a base of plastic or other insulating material with conductor patterns 1454 deposited therein and terminating in edge connector elements 1456. For this example it is assumed that the base material 1440 has a green tint, the conductors 1454 have a red tint, and the connectors 1456 are bluish. Thus as shown in FIG. 97, when the object is bathed with blue light, the connector patterns 1456 will appear bright in the image generated upon a monitor by the video signal from camera 1340 whereas the base 1452 and conductors 1454 will appear dark. Similarly, application of green light and red light produces images, as shown in FIGS. 98 and 99 respectively, wherein the bright portions of the image are the base 1452 and the conductors 1454, respectively. Simultaneous illumination with green and red light would produce an image wherein only the connector patterns 1456 are dark. Thus it is possible by controlling the color of the illumination of the object to particularly expose features which have different spectral or color responses.

In another application of the use of color selective illumination, a portion of the object 1440 may have a particular characteristic hue or color which indicates proper, or alternatively improper, processing or manufacture thereof. For example, the contact fingers 1456 can be manufactured by a plating process wherein proper plating produces a white metal deposit which contrasts with a redish color of the conductors 1454 and a greenish tint of the base 1440. If the object is illuminated with white light, the image generated by the camera 1340 has a low contrast between the areas 1442, 1444 and 1446. However, in accordance with the present invention, the object 1440 can be illuminated with blue light and the contact fingers 1456 will be substantially brighter in the video image from the regions 1452 and 1454. Improper plating of the fingers 1456 will result in dark regions on the fingers which can be more readily discerned either by human eye or by electronic processing of the video signal.

Figure 100:
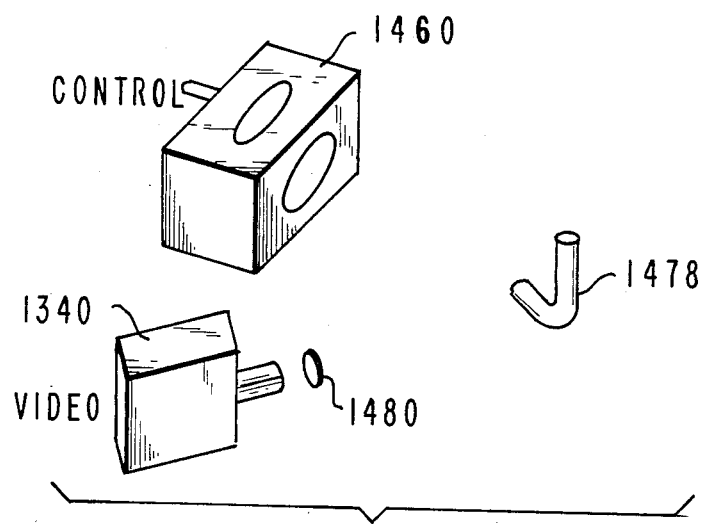
FIG. 100 is a perspective view of a modification of the video camera with electronic illumination control in accordance with the invention.
Figure 101:
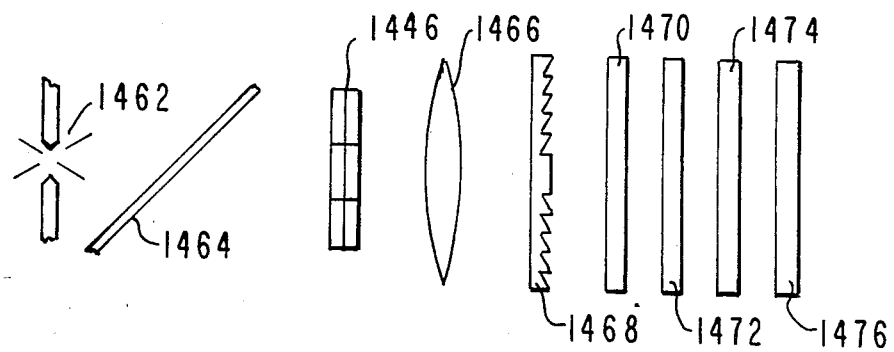
FIG. 101 is an exploded side elevational view of the light control devices in an illuminating control module of FIG. 100.
Figure 102:
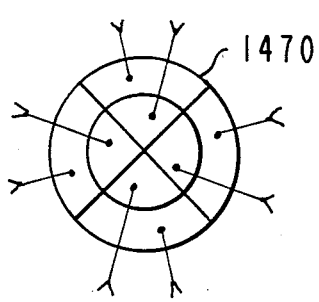
FIG. 102 is a front diagrammatic view of one pattern control cell in the module of FIG. 101.
Figure 103:
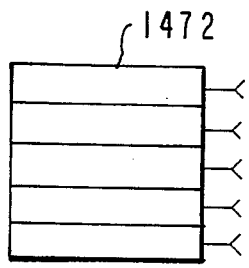
FIG. 103 is a front diagrammatic view of a second pattern control cell in the module of FIG. 101.
Figure 104:
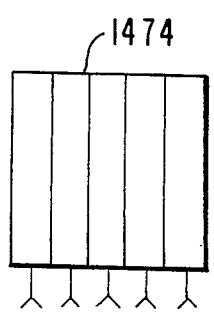
FIG. 104 is a front diagrammatic view of a third pattern control cell in the module of FIG. 101.

In a modified illumination control 1460 as shown in FIG. 100, there is contained, as shown in FIG. 101, an arc lamp 1462, a cold mirror 1464 for diverting the long infrared and heat radiation out of the main beam and housing, frequency selection unit 1446, a field lens 1466, a fresnel lens 1468 having inner and outer portions formed with different focal lengths, pattern control cells 1470, 1472 and 1474, and a polarization control cell 1476. The pattern control cell 1470 as shown in FIG. 102 includes quadrant sector patterns which are divided into inner and outer rings for selecting the corresponding focus or dispersion of the light from the dual focal point lens 1468. Each of the inner and outer patterns may be individually selected to controllably select the light for illuminating an object 1478. The pattern selection unit 1472 as shown in FIG. 3 includes horizontal striped selection patterns, and the pattern selection unit 1474 as shown in FIG. 104 contains vertical stripe selecting electrodes or patterns. By selecting various combinations of vertical and horizontal stripes, various patterns or shadows can be cast upon the object 1478 to produce varying effects as viewed by the video camera. Optionally, a polarizer 1480 is positioned in front of the objective of the camera 1340 to further view polarization effects of the object 1478 on light emitted by the unit 1460.

Figure 105:
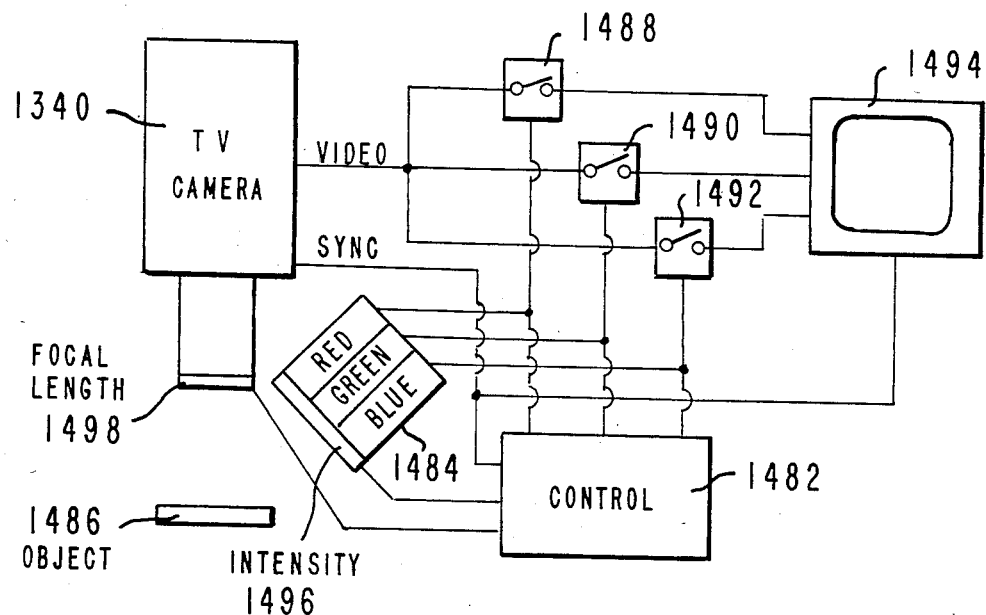
FIG. 105 is a block diagram illustrating a color video system employing a conventional black and white camera.

It is commonly known that it is extremly difficult to obtain high resolution color electronic images utilizing conventional lower priced color cameras. This is due primarily to the low sensitivity and low spacial resolution of such cameras. However, relatively low cost black and white electronic cameras are available with relatively high resolution and sensitivity. In FIG. 105 there is shown a video system utilizing such a black and white camera 1340 with the illumination control of the present invention for generating an improved color image. The system includes a control 1482 which operates a light color control 1484 to sequentially illuminate the object 1486 with red, green and blue light in synchronism with the scan of the camera 1340. Simultaneously with operation of the corresponding red, green and blue selection, the control 1482 operates respective electronic switches 1488, 1490 and 1492 to pass the video signal to corresponding red, green and blue controls of a color monitor 1494. Thus there is produced a color image from the black and white camera 1340 by the sequential illumination of the object by red, green and blue light. Optionally, the control 1482 can operate an intensity control 1496 to adjust the intensity of the illuminating light in correspondence to the sensitivity of the camera 1340 to the selected frequency, and/or to emphasize one or more of the selected colors. Also, the control 1482 may operate a focal length changing unit 1498, such as the above-described piezo-electric crystal with electrodes thereon, for adjusting the focus of the camera 1340 in synchronism with the red, green and blue illumination so that the image produced on the target of the camera 1340 will be in focus despite chromatic variation in the focal length of the camera 1340.

Figure 106:
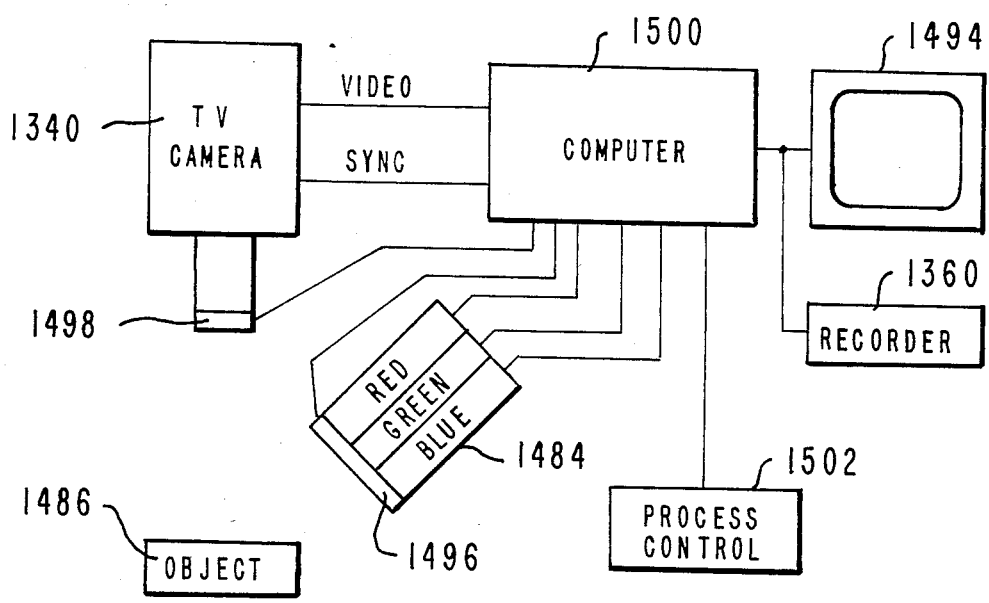
FIG. 106 is a variation of the video system of FIG. 105.

In a variation shown in FIG. 106, a computer 1500 replaces the control 1482 and switches 1488, 1490 and 1492. The computer 1500 samples the video signal and operates the red, green and blue selectors of the color control 1484. Illumination of the object 1486 by each color selected by unit 1484 may occur over two or more scan times by the television camera 1340. The computer 1500 can utilize the video information produced by the illumination by the respective red, green and blue light to operate a process control device 1502 or to generate a color video signal.

Figure 107:
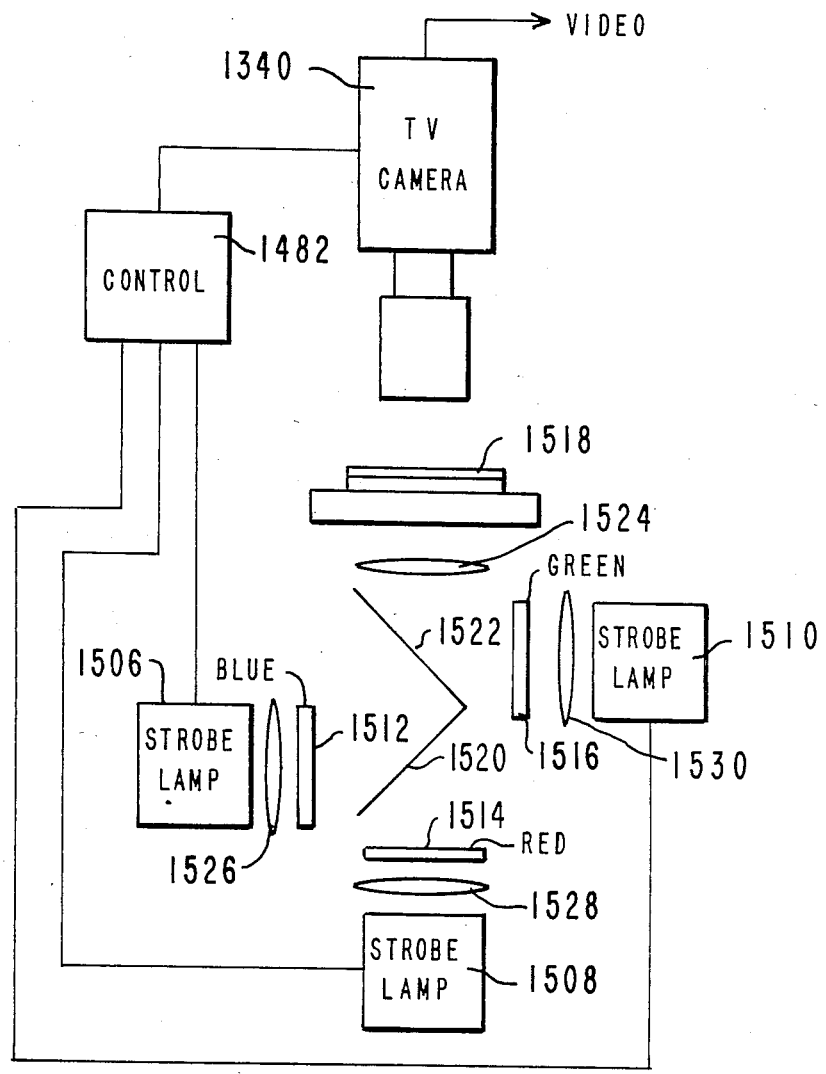
FIG. 107 is a diagram of further modification of a color video system.

In a further variation illustrated in FIG. 107, the control 1482 operates strobe lamps 1506, 1508 and 1510 passing light through respective blue, red and green filters 1512, 1514 and 1516 to illuminate an object 1518 with blue, red and green light during sequential scans of the camera 1340. The particular illumination apparatus of FIG. 107 is substage and includes reflectors 1520 and 1522 for reflecting light from the corresponding strobes 1506 and 1510 through the condenser lens 1524. The mirrors 1520 and 1522 are selected to pass the light from the strobe lamp 1508. Additionally, field lenses 1526, 1528 and 1530 are located between the respective strobe lamps 1506, 1508, 1510 and their filters 1512, 1514 and 1516.

The illumination system in accordance with the present invention can also be utilized with one or more discreet detectors, or an array such as a linear array of charged coupled devices (CCD) 1540, shown in FIG. 108, suitably connected to inputs of a computer 1542. The computer 1542 is connected to one or more light control units such as light control units 1544 and 1546 for selectively illuminating objects 1548. A lens system 1550 is provided for presenting an image of the object 1448 on the array 1540. The light units 1544 and 1546 can be disposed, as illustrated, at oblique angles so that alternate operation thereof produces shadows which can be detected by the linear array 1540 to determine height and different span information of the article 1548 in addition to sensing the presence or position of the object 1548. For example, operation of the light unit 1548 casts a shadow 1552 on a conveyor 1554 carrying the object 1548. This shadow is detected by one or more of the detectors 1540 to indicate height dimension of the object 1548. When the detectors 1540 have a plurality of detectors within the region for detecting shadows, the number of detectors detecting the dark or shadow condition will be proportional to the height of the object 1548. Similarly, the detectors sensing bright regions in both of two oblique illuminations from opposite sides indicate the distance between two switched shadows to determine the width of a surface. Successive linear sections or stripes of illumination across the top surface, as the object moves on the conveyor or by successively scanned stripe patterns from one or more of the units 1544 and 1546, determine the edges and the length on the third dimension of the object either by detecting the absence of a shadow or by a contrast in the reflectivity of the conveyor relative to the object surface. Alternatively, a two-dimensional array of detectors 1556 shown in FIG. 109 can be utilized to detect all three dimensions of the object 1548.

Additionally, the relative position of reflected light in successive images from different patterns of light, such as stripes or spots on the object 1548 can be used to determine information. For example as shown in FIG. 111, a narrow beam or spot of light 1560 results in a detector element 1562 of the array 1540 detecting a light condition. In the absence of the article 1548, the narrow stripe or spot 1560 of light will strike the conveyor 1554 at a spot which will cause detector element 1564 to be activated indicating that the object 1548 is not present. Further, the system can detect the height of the article 1548; for example as shown by the long and short dashed lines 1566, an article of different height would operate a different detector element 1568 indicating the different height of the article 1548.

In a variation illustrated in FIG. 111, pattern control of the light emitted by unit 1544 can enable a linear array 1540 to read three dimensional information from the object 1548. In this embodiment there is included a cylindrical lens 1570 for focusing all of the light along the width dimension W of the object into a line passing through the detector array 1540. A spot of illumination 1572 on the object 1548 is focused on one detector element 1562 to indicate height of the article 1548. By projecting illumination in successive spots in a line along the width dimension W of the article 1548, the width dimension of the object 1548 can be determined; for example when the spot passes the right edge of the article 1548 it will strike a point 1574 which will result in the detector 1564 detecting light to indicate that the right edge of the article has been found, and the left edge may be similarly detected. Further, illumination of the object 1548 by means of successive stripes, is shown by stripe 1576, running the length dimension L of the object 1548, wherein the successive stripes are indexed across the width W of the object, can produce a complete three-dimensional picture of the object, particularly where a second light unit 1546, FIG. 108, is utilized at a second oblique angle in a similar manner. The object 1548 may include identifying indicia, such as the common bar code, and the stripe 1576 can be utilized in conjunction with the array 1540 to detect the bar code; addition of another linear array perpendicular to the array 1540 together with another optical system with a cylindrical lens perpendicular to the lens 1570 could read bar data in a direction parallel to W.

A detector array indicated generally at 1580 in FIGS. 112 and 113 is mounted on a concave support 1582, shown with exaggerated curvature, or the array can be convex as shown by dashed lines 1581. The array may be linear or may be two-dimensional as shown. The concavity or convexity is selected to correspond to the circle of best focus for the optical system employed. This enables relatively sharper images to be formed on the array and more accuracy in measurement and detection. As an example, a silicon substrate or disk can be configured with a curved surface such as spherical, parabolic, etc. by grinding techniques similar to that employed for lenses, and then detectors may be formed on the curved surface using conventional techniques, such as those presently used for two-dimensional array structures, except that the optical systems for mask projection or circuit preparation are changed to produce sharp images on the curved surface.

Color selective illumination can also be employed with the detector systems of FIGS. 108–112. For example, the articles 1548 may have a color, or have one or more colored portions thereon, which can be detected by illuminating a selected frequency or frequencies of illumination, the reflected illumination being utilized to determine the identity of a property of the object. For example, the object 1548 may have a marking of one or more colors thereon which can be detected by illuminating the object with light from a light unit 1544 of one or more selected frequencies. Additionally, the object 1548, or a portion thereof, may have a characteristic hue or color which indicates a proper or improper state of processing.

The computer 1542 can control subsequent processing or handling of the object 1548. For example, a process control 1558, such as a sorter, may be located downstream on the conveyor 1554 for sorting or otherwise effecting the product 1548 in accordance with the optical property which has been sensed or detected utilizing the illumination control in accordance with the invention.

Since many variations, modifications and changes in detail may be made to the above described embodiments, it is intended that all matter in the foregoing description and shown in the accompanying drawings be interpreted as illustrative and not in a limiting sense.

What is claimed is:

1. An illumination apparatus for a viewing system having an object station for receiving an object to be viewed comprising
a light source,
condenser lens means for directing light from the light source in a cone of light toward the object station,
an electrically controlled light transmission unit in the path of light from the light source through the condenser lens means,
said electrically controlled light transmission unit including a layer of electro-optic material extending in a plane transverse to the path of light, and transparent electrode means disposed on opposite sides of the layer of electro-optic material for defining a plurality of different patterns for exciting the electro-optic material, and
electrical control means for selectively applying voltages to the electrode means of the light transmission unit to selectively excite the different patterns and the corresponding portions of the layer of electro-optic material to alter light conditions in selected portions of the cone of light.

2. An apparatus as claimed in claim 1 wherein the electrically controlled light transmission unit includes means for producing a plurality of different transverse light and dark patterns in the light passing through the condenser lens means in response to the excitation of the selected portions of electro-optic material by the electrical control means.

3. A viewing system as claimed in claim 2 wherein the electro-optic material is such that the excitation of a portion thereof changes the phase of light passing through the excited portion relative to light passing through the non-excited portion, and the electrical control means includes means for variably adjusting the magnitude of the voltages to produce different selected voltages resulting in different phase contrast conditions.

4. An apparatus as claimed in claim 1 including a polarizer positioned to polarize light from the light source on an entrance side of the electrically controlled light transmission unit, and wherein the electro-optic material rotates the polarization of the light transmitted through one of the excited or the non-excited portions thereof.

5. An apparatus as claimed in claim 4 including a second polarizer positioned to polarize light on an exit side of the electrically controlled light transmission unit.

6. An apparatus as claimed in claim 5 including at least two superimposed cells each cell including a layer of liquid crystal material and respective electrode patterns connected to the electrical control means for energizing selected portions of the liquid crystal layers, said liquid crystal material being such that the polarization of light passing therethrough is rotated only when the liquid crystal material is energized.

7. An apparatus as claimed in claim 1 wherein the plurality of different patterns includes at least one pair of patterns which are spaced apart and entirely positioned in respective opposite sides of the light path.

8. An apparatus as claimed in claim 1 wherein the electro-optic material is such that the excitation of a portion thereof changes the phase of light passing through the excited portion relative to light passing through a non-excited portion.

9. An apparatus as claimed in claim 8 wherein the electrical control means includes means for variably adjusting the magnitude of the voltage to produce different selected voltages resulting in different phase contrast lighting conditions.

10. An apparatus as claimed in claim 1 including slot means in the condenser lens means, and wherein electrical control light transmission unit includes holder means supporting and containing the electro-optic material and electrode means, said holder means adapted for being removably inserted into said slot means.

11. An apparatus as claimed in claim 1 wherein the electrical control means includes an oscillator and variable timing means operated thereby for alternately applying and removing the voltages to the electrode means at a rate equal or greater than the flickes rate for a duty cycle selected by the timing means to correspondingly select the integral of the intensity of light.

12. An illumination apparatus as for a viewing system having an object station for receiving an object to be viewed comprising
a light source,
condenser lens means for directing light from the light source toward the object station,
an electrically controlled light transmission unit interposed in the path of light from the light source through the condenser lens means,
said electrically controlled light transmission unit including a layer of electro-optic material extending in a plane transverse to the path of light, and transparent electrode means disposed on opposite sides of the layer of electro-optic material for defining a plurality of different patterns for exciting the electro-optic material, and
electrical control means for selectively operating the electrode means of the light transmission unit to selectively excite the different patterns and the corresponding portions of the layer of electro-optic material,
said electrically controlled light transmission unit including means responsive to the electrical control means for producing a different polarization characteristic in one selected pattern of the light transmitted through the electrically controlled light transmission unit relative to a second selected pattern of light transmitted through the electrically controlled light transmission unit.

13. An apparatus as claimed in claim 12 including birefringent means positioned between the electrically controlled light transmission unit and the object station, said birefringent means capable of directing light of different polarities in respective different paths.

14. An apparatus as claimed in claim 13 wherein the different paths are in different directions.

15. An illumination apparatus for a viewing system having an object station for receiving an object to be viewed comprising
a light source,
condenser lens means for directing light from the light source toward the object station,
an electrically controlled light transmission unit interposed in the path of light from the light source through the condenser lens means,
said electrically controlled light transmission unit including at least two superimposed cells each including a layer of liquid crystal material extending in a plane transverse to the path of light, and transparent electrode means disposed on opposite sides of the layer of liquid crystal material for defining a plurality of different patterns for exciting the liquid crystal material,
said liquid crystal material being such that the polarization of light passing therethrough is rotated only when the liquid crystal material is energized,
electrical control means for selectively operating the electrode means of the light transmission unit to selectively excite the different patterns and the corresponding portions of the layers of liquid crystal material,
a polarizer positioned to polarize light from the light source on an entrance side of the electrically controlled light transmission unit,
a second polarizer positioned to polarize light on an exit side of the electrically controlled light transmission unit,
said electrically controlled light transmission unit including a third cell superimposed on an exit side of the second polarizer and the first and second cells, said third cell having a layer of liquid crystal material and electrodes connected to the electrical control means for energizing the liquid crystal layer to change the polarization of light passing through the electrically controlled light transmission unit when the liquid crystal material is energized.

16. An apparatus as claimed in claim 15 wherein the electrode patterns of the superimposed cells include respective complementary arcuate electrodes for forming concentric annular and semiannular patterns.

17. An illumination apparatus for a viewing system having an object station for receiving an object to be viewed, comprising
a light source,
a condenser lens means for directing light from the light source toward the object station,
an electrically controlled light transmission unit interposed in the path of light from the light source through the condenser lens means,
electrical control means for selectively operating the light transmission unit,
a polarizer position to polarize light from the light source on an entrance side of the electrically controlled light transmission unit,
said electrically controlled light transmission unit including cell means responsive to the electrical control means for rotating the polarization of at least a portion of the light transmitted through the electrically controlled light transmission unit,
a second polarizer positioned to polarize light on an exit side of the cell means,
said cell means including at least three superimposed cells each including a layer of liquid crystal material and respective electrode patterns connected to the electrical control means for energizing selected portions of the liquid crystal layers, said liquid crystal material being such that the polarization of light passing therethrough is different when the liquid crystal material is energized compared to when the liquid crystal material is unenergized,
said electrode patterns of the first and second cells including respective complementary arcuate electrodes for forming annular patterns, and the electrode pattern of the third cell including a radial array of electrodes.

18. An apparatus as claimed in claim 17 wherein the polarization orientation of the first polarizer is perpendicular to the polarization orientation of the second polarizer.

19. A viewing apparatus comprising
a stage having an object station for receiving an object to be viewed,
a single objective positioned to receive and pass light from the object station,
left and right eyepieces,
a light source,
condenser lens means for directing light from the light source toward the object station,
means for splitting and directing light passing through the objective from the object station to the eyepieces,
means for limiting light passing through the left and right eyepieces to light of first and second polarities, respectively, which are mutually perpendicular,
electrically controlled light transmission means interposed in the path of light from the light source through the condenser lens means for selectively transmitting light of the first and second polarities, and
electrical control means including oscillator means for operating the electrically controlled light transmission means to alternately pass light of the first and second polarities to the object station.

20. An apparatus as claimed in claim 19 wherein the electrically controlled light transmission means includes means responsive to the oscillator means for passing a pair of different transverse light patterns of the respective first and second polarities to the object station.

21. An apparatus as claimed in claim 19 including a birefringent plate positioned between the object station and the objective for laterally shifting light rays of the first polarity relative to light rays of the second polarity 22. An apparatus as claim in claim 21 wherein the light source, the condenser lens means, and the electrically controlled light transmission means are positioned on a side of the object station opposite to the objective; and including a second birefringent plate oppositely oriented relative to the first birefringent plate, and positioned between the condenser lens means and the object station.

23. An apparatus as claimed in claim 19 including birefringent means positioned between the object station and the electrically controlled light transmission means, said birefringent means capable of directing light of different polarities in respective different directions.

24. An apparatus as claimed in claim 19 wherein the elctrically controlled light transmission means includes a polarizer positioned to polarize light from the light source to the first polarity, and cell means on an exit side of the polarizer and responsive to the electrical control means for rotating the polarization of light from the first polarity to the second polarity.

25. An apparatus as claimed in claim 24 wherein the cell means includes a layer of liquid crystal material and a pair of electrodes connected to the electrical control means for energizing the layer of liquid crystal material, said liquid crystal material being such that the polarization of light passing therethrough is rotated only when liquid crystal material is energized.

26. A viewing system comprising
a stage having an object station for receiving an object to be viewed,
illumination means for illuminating the object station,
an objective positioned to receive and pass light from the object station,
an electrically controlled light transmission unit interposed in the path of light passing through the objective from the object station,
said electrically controlled light transmission unit including a layer of electro-optic material extending transverse to the path of light in a diffraction plane of the viewing system, and transparent electrode means for defining a plurality of different patterns for exciting the electro-optic material, and
electrical control means for selectively operating the electrode means of the electrically controlled light transmission unit to selectively excite the different patterns and the corresponding portions of the layer of electro-optic material to alter light conditions of light passing through the excited portions of electro-optic material.

27. A viewing system as claimed in claim 26 including eyepiece means for receiving light from the electrically controlled light transmission unit.

28. A viewing system as claimed in claim 26 including light sensing means for receiving light from the electrically controlled light unit and for detecting interference between delayed light and non-delayed light.

29. A viewing system as claimed in claim 26 wherein the electrode means of the electrically controlled light transmission unit includes means for producing a plurality of different spatial light filtering patterns in the light passing through the objective in response to the electrical control means.

30. A viewing system as claimed in claim 26 wherein the electrically controlled light transmission unit includes means responsive to the electrical control means for selectively changing a polarization characteristic of at least a portion of the light transmitted through the electrically controlled light transmission unit.

31. A viewing system as claimed in claim 26 including a polarizer positioned to polarize light on an entrance side of the electrically controlled light transmission unit, and wherein the electro-optic material rotates the polarization of the light transmitted through one of the excited or the non-excited portions thereof.

32. A viewing system as claimed in claim 31 including a second polarizer positioned to polarize light on an exit side of the electrically controlled light transmission unit.

33. A viewing system as claimed in claim 26 wherein the plurality of different patterns includes at least one pair of patterns which are spaced apart and entirely positioned in respective opposite sides of the light path.

34. A viewing system as claimed in claim 26 wherein the electrode means defines a fourier filter pattern.

35. A viewing system as claimed in claim 26 wherein the electro-optic material is such that the excitation of a portion thereof changes the phase of light passing through the excited portion relative to light passing through a non-excited portion.

36. A viewing system as claimed in claim 35 wherein the electrical control means includes means for variably adjusting the magnitude of the voltages to produce different selected voltages resulting in different phase contrast conditions.

37. A viewing system as claimed in claim 26 wherein the electrically controlled light transmission unit includes means responsive to the electrical control means for selectively changing a polarization characteristic of at least a portion of the light transmitted through the electrically controlled light transmission unit.

38. A viewing system comprising
a stage having an object station for receiving an object to be viewed,
illumination means for illuminating the object station,
an objective positioned to receive and pass light from the object station,
an electrically controlled light transmission unit interposed in the path of light after passing through the objective from the object station, and
electrical control means for selectively operating the electrically controlled light transmission unit,
said electrically controlled light transmission unit including:
a phase adjusting unit positioned to receive light passing through the objective from the object station,
said phase adjusting unit including adjustable birefringent delay means for selectively delaying light of one of the first and second polarities relative to light of the other of the first and second polarities,
a pair of electrically controlled pattern selecting and polarization rotating means on respective opposite sides of the adjustable birefringent delay means each for selectively rotating the polarity perpendicular thereto, and
polarizer means for passing light of a first polarity and for blocking light of a second polarity perpendicular to the first polarity on an exit side of the series arrangement of the pair of rotating means and the phase adjusting unit.

39. A viewing system as claimed in claim 38 wherein the adjustable birefringent delay means includes piezoelectric birefringent plate means, a pair of electrodes on respective opposite sides of the plate means, and electrical means for applying an adjustable voltage across the pair of electrodes to selectively delay light of the one polarity relative to the other polarity.

40. A viewing system as claimed in claim 39 wherein the piezoelectric birefringent plate means includes a pair of oppositely oriented and superimposed piezoelectric birefringent plates.

41. A viewing system comprising
a stage having an object station for receiving an object to be viewed,
an objective positioned to receive and pass light from the object station,
a light source;
condenser lens means for directing light from the light source toward the object station,
condenser light transmission means interposed in the path of light from the light source through the condenser lens means,
said condenser light transmission means including electrically controlled pattern selecting means for selectively passing a plurality of light patterns, and polarizer means for passing light of a first polarity and for blocking light of a second polarity perpendicular to the first polarity, a phase adjusting unit positioned to receive light passing through the objective from the object station, said phase adjusting unit including adjustable birefringent delay means for selectively delaying light of one of the first and second polarities relative to light of the other of the first and second polarities, and a pair of electrically controlled pattern selecting and polarization rotating means on respective opposite sides of the adjustable birefringent delay means each for selectively rotating the polarity of selected portions of light patterns to a polarity perpendicular thereto, and electrical control means for operating the electrically controlled pattern selecting means of the condenser light transmission means and for operating the pair of electrically controlled pattern selecting and polarization rotating means of the phase adjusting unit.

42. A viewing system as claimed in claim 41 including eyepiece means for receiving light from the phase adjusting unit.

43. A viewing system as claimed in claim 41 including light sensing means for receiving light from the phase adjusting unit and for detecting interference between delayed light and non-delayed light.

44. A viewing system as claimed in claim 41 wherein the adjustable birefringent delay means includes piezoelectric birefringent plate means, a pair of electrodes on respective opposite sides of the plate means, and electrical means for applying an adjustable voltage across the pair of electrodes to selectively delay light of the one polarity relative to the other polarity.

45. A viewing system as claimed in claim 44 wherein the piezoelectric birefringent plate means includes a pair of oppositely oriented and superimposed piezoelectric birefringent plates.

46. A viewing system as claimed in claim 41 wherein the electrically controlled pattern selecting means of the condenser light transmission means and the pair of electrically controlled pattern selecting and polarization rotating means of the phase adjusting unit each includes cell means having a layer of liquid crystal material and electrodes on opposite sides of the layer of liquid crystal material and connected to the electrical control means for energizing selected portions of the liquid crystal layers, said liquid crystal material being such that the polarization of light passing therethrough is rotated only when the liquid crystal material is energized, and said polarizer means of said condenser light transmission means including a pair of polarizers one on each side of the cell means of the light transmission means.

47. An illumination apparatus for a viewing system having an object station for receiving an object to be viewed comprising a light source, means for directing light from the light source toward the object station, an electrically controlled light transmission unit interposed in the path of light from the light source through the light directing means, said electrically controlled light transmission unit including a layer of electro-optic material extending in a plane transverse to the path of light, and transparent electrode means disposed on opposite sides of the layer of electro-optic material for defining a plurality of different patterns for exciting the electro-optic material, electrical control means for selectively applying voltages to the electrode means of the light transmission unit to selectively excite the different patterns and the corresponding portions of the layer of electro-optic material, a polarizer positioned to polarize light from the light source on an entrance side of the electrically controlled light transmission unit, said electro-optic material being such that the polarization of the light transmitted therethrough is rotated by an angle which varies with varying magnitudes of voltage applied thereacross, and said electrical control means including means for selectively changing the magnitude of voltage applied to the electrode means to selectively change the angle of rotation of light passing through excited portions of the electro-optic material.

48. An apparatus as claimed in claim 47 including a second polarizer positioned to polarize light on an exit side of the electrically controlled light transmission unit such that changing the angle of rotation of light passing through the excited portions of the electro-optic material changes the intensity of light passing through the light transmission unit.

49. An apparatus as claimed in claim 41 including a second polarizer positioned to polarize light on an exit side of the electrically controlled light transmission unit such that changing the angle of rotation of light passing through the excited portions of the electro-optic material changes the color of light passing through the light transmission unit.

50. An apparatus as claimed in claim 49 including a retarder upstream from the second polarizer.

51. An illumination apparatus for a viewing system having an object station for receiving an object to be viewed comprising a light source;

a condenser lens means for directing light from the light source toward the object station;

an electrically controlled light transmission unit interposed in the path of light from the light source through the condenser lens means;

said electrically controlled light transmission unit including a pattern cell and a polarization cell wherein each cell includes a layer of electro-optic material extending in a plane transverse to the path of light, and transparent electrode means disposed on opposite sides of the layer of electro-optic material, said electrode means of said pattern cell defining a plurality of different patterns for exciting the electro-optic material thereof;

electrical control means for selectively operating the electrode means of the cells of the light transmission unit to selectively excite the different patterns and the corresponding portions of the layer of electro-optic material of pattern cell and to selectively excite the layer of electro-optic material of the polarization cell;

a polarizer positioned to polarize light from the light source on an entrance side of the electrically controlled light transmission unit;

said electro-optic material of said cells being such that the polarization of the light transmitted through one of the excited or the non-excited portions thereof is rotated;

said electrically controlled transmission unit including a second polarizer positioned between the pattern cell and the polarization cell; and the polarization orientation of the second polarizer being such as to block light from one of the excited or the non-excited portions of the electro-optic material of the pattern cell and to pass light from the other portions thereof.

52. An illumination apparatus for a viewing system having an object station for receiving an object to be viewed comprising
a light source,
a condenser lens means for directing light from the light source toward the object station,
an electrically controlled light transmission unit interposed in the path of light from the light source through the condenser lens means,
said electrically controlled light transmission unit including a layer of electro-optic material extending in a plane transverse to the path of light, and transparent electrode means disposed on opposite sides of the layer of electro-optic material for defining a plurality of different patterns, including at least one ring-like pattern and at least one sector-like pattern, for exciting the electro-optic material, and
electrical control means for selectively operating the electrode means of the light transmission unit to selectively excite the different patterns and the corresponding portions of the layer of electro-optic material.

53. An illumination apparatus as claimed in claim 52 wherein the transparent electrode means includes one electrode arrangement comprising
a center conductor,
a plurality of sector-like planar resistive members connected to and extending radially from the center conductor, and
a plurality of arcuate conductors connected to outer portions of the respective resistive members for producing ring-like patterns when all the arcuate conductors are energized with the same voltage and for producing sector-like patterns when the arcuate conductors are energized with at least two different voltages.

54. A viewing system comprising
a stage having an object station for receiving an object to be viewed,
illumination means for illuminating the object station,
an objective positioned to receive and pass light from the object station,
an electrically controlled light transmission means interposed in the path of light passing through the objective from the object station,
said electrically controlled light transmission means including an electro-optic material and electrode means for defining at least two different patterns in the electro-optic material,
electrical control means for selectvely operating the electrode means of the electrically controlled light transmission means to simultaneously excite at least two different patterns and the corresponding portions of the electro-optic material, and
adjustable birefringent delay means for selectively delaying light in one of the at least two different patterns.

55. A viewing system as claimed in claim 54 including means for separating light passing through the objective into two separate paths, means for recombining light from the two separate paths, and detector means for detecting light in the recombined light; and wherein the electrically controlled light tranmission means includes a pair of electrically controlled light transmission units in the respective separate paths for defining respective patterns, and the adjustable birefringent means is disposed in one of the two separate paths.

56. A system as claimed in claim 55 wherein the illumination means comprises substage lighting means whereby the detector means can be utilized to measure relative phase shift in the object between two points thereof.

57. A system as claimed in claim 55 wherein the illumination means comprises suprastage lighting means whereby the detector means can be utilized to measure relative height of two points in an object viewed by the microscopic system.

58. A system as claimed in claim 55 including a pair of oculars, means for passing light from the paths to the respective oculars downstream from the respective electrically controlled light transmission units, means for generating indications of the position of the two points selected in the object as viewed through the oculars.

59. A system as claimed in claim 58 wherein each of the electrically controlled light transmission units includes a pair of optical cells for producing respective crossing lines wherein polarity is reversed relative to background, a first polarizer between the cells to block background polarization, and a second polarizer in the recombination path to block background polarization; each means for generating indications includes a third polarizer between the downstream cell and the respective ocular to pass only background polarization, and a selectively operable polarization cell between the upstream cell and the first polarizer to reverse the polarities of the background and the line whereby crosshairs can be presented in the image viewed through the oculars.

60. A viewing system comprising
a stage having an object station for receiving an object to be viewed;
illumination means for illuminating the object station;
an objective positioned to receive and pass light from the object station;
an electrically controlled light transmission unit interposed in the path of light passing through the objective from the object station;
said electrically controlled light transmission unit including a layer of electro-optic material extending in a plane transverse to the path of light in an image plane of the viewing system, and transparent electrode means for defining a plurality of different patterns for exciting the electro-optic material; and
electrical control means for selectively operating the electrode means of the electrically controlled light transmission unit to selectively excite the different patterns and the corresponding portions of the layer of electro-optic material to alter light conditions of the light through the excited portions of electro-optic material.

61. A viewing system as claimed in claim 60 including eyepiece means for receiving light from the electrically controlled light transmission unit.

62. A viewing system as claimed in claim 60 including light sensing means for receiving light from the electrically controlled light unit and for detecting interference between delayed light and non-delayed light.

63. A viewing system as claimed in claim 60 wherein the electrode means of the electrically controlled light transmission unit includes means for producing a plurality of different spatial light filtering patterns in the light passing through the objective in response to the electrical control means.

64. A viewing system as claimed in claim 60 including a polarizer positioned to polarize light on an entrance side of the electrically controlled light transmission unit, and wherein the electro-optic material rotates the polarization of the light transmitted through one of the excited or the non-excited portions thereof.

65. A viewing system as claimed in claim 64 including a second polarizer positioned to polarize light on an exit side of the electrically controlled light transmission unit.

66. A viewing system as claimed in claim 60 wherein the electro-optic material is such that the excitation of a portion thereof changes the phase of light passing through the excited portions relative to light passing through the non-excited portions, and the electrical control means includes means for variably adjusting the magnitude of the voltages resulting in different phase contrast conditions.

67. An illumination apparatus for a viewing system having an object station for receiving an object to be viewed comprising
a light source,
condenser lens means for directing light from the light source toward the object station,
an electrically controlled light transmission unit interposed in the path of light from the light source through the condenser lens means,
said electrically controlled light transmission unit including a layer of electro-optic material extending in a plane transverse to the path of light, and transparent electrode means disposed on opposite sides of the layer of electro-optic material for defining a plurality of different patterns for exciting the electro-optic material,
electrical control means for selectively operating the electrode means of the light transmission unit to selectively excite the different patterns and the corresponding portions of the layer of electro-optic material, and
said electrical control means including oscillator means for periodically exciting selected different electrode patterns.

68. An apparatus as claimed in claim 67 wherein the electrically controlled light transmission unit includes means responsive to the electrical control means for producing a different polarization characteristic in one selected pattern of the light transmitted through the electrically controlled light transmission unit relative to a second selected pattern of light transmitted through the electrically controlled light transmission unit.

69. An illumination apparatus for a viewing system having an object station for receiving an object to be viewed comprising
a light source;
utilization means;
means for directing light from the light source toward the object station;
an objective for directing light from the object station to the utilization means;
an electrically controlled light transmission unit in the path of light between the light source and the utilization means;
said electrically controlled light transmission unit including a layer of electro-optic material extending in a plane transverse to the path of light, transparent electrode means disposed on opposite sides of the layer of electro-optic material for exciting the electro-optic material, and spectrum selecting means responsive to corresponding electro-optic material excitation conditions for passing respective selected spectral portions of the light and blocking non-selected spectral portions; and
electrical control means for selectively operating the electrode means of the light transmission unit to selectively excite the layer of electro-optic material to pass only the selected spectral portions of light.

70. An apparatus as claimed in claim 69 wherein the electrical control means includes oscillator means for continuously cycling the electrodes through a sequence of operations selecting a plurality of difference spectral frequencies.

71. An apparatus as claimed in claim 69 wherein the electrically controlled light transmission unit is positioned between the light source and the object station.

72. An illumination apparatus as claimed in claim 69, including pattern selecting means between the light source and object station and operated by the electrical control means for selectively illuminating the object station with selected patterns of light.

73. An illumination apparatus for a viewing system having an object station for receiving an object to be viewed comprising:
a light source;
utilization means;
means for directing light from the light source toward the object station;
an objective for directing light from the object station to the utilization means;
an electrically controlled light transmission unit in the path of light between the light source and the utilization means;
said electrically controlled light transmission unit including a layer of electro-optic material extending in a plane transverse to the path of light, transparent electrode means disposed on opposite sides of the layer of electro-optic material for exciting the electro-optic material, and phase changing means responsive to corresponding electro-optic material excitation conditions for changing the phase of selected portions of the light relative to the phase of non-selected portions of the light; and
electrical control means for selectively operating the electrode means of the light transmission unit to selectively excite the layer of electro-optic material.

74. An apparatus as claimed in claim 73 wherein the electrical control means includes oscillator means for continuously cycling the electrodes through a sequence of operations selecting a plurality of difference phase changes of light.

75. An apparatus as claimed in claim 73 wherein the electrically controlled light transmission unit is positioned between the light source and the object station.

76. An illumination apparatus for a viewing system having an object station for receiving an object to be viewed comprising
a light source;
utilization means;
means for directing light from the light source toward the object station;
an objective for directing light from the object station to the utilization means;

an electrically controlled light transmission unit in the path of light between the light source and the utilization means;

said electrically controlled light transmission unit including a layer of electro-optic material extending in a plane transverse to the path of light, transparent electrode means disposed on opposite sides of the layer of electro-optic material for exciting the electro-optic material, and polarity selecting means responsive to corresponding electro-optic material excitation conditions for passing respective selected polarities of the light; and electrical control means for selectively operating the electrode means of the light transmission unit to selectively excite the layer of electro-optic material.

77. An apparatus as claimed in claim 76 wherein the electrical control means includes oscillator means for continuously cycling the electrodes through a sequence of operations selecting a plurality of difference polarities of light.

78. An apparatus as claimed in claim 76 wherein the electrically controlled light transmission unit is positioned between the light source and the object station.

* * * * *